US011010054B1

(12) United States Patent
Himelstein et al.

(10) Patent No.: US 11,010,054 B1
(45) Date of Patent: May 18, 2021

(54) EXABYTE-SCALE DATA PROCESSING SYSTEM

(71) Applicant: EMC Corporation, Hopkinton, MA (US)

(72) Inventors: Mark Himelstein, Emerald Hills, CA (US); Bruce Wilford, Los Altos, CA (US); Richard Van Gaasbeck, Mountain View, CA (US); Todd Wilde, Mountain View, CA (US); Rick Carlson, Pacific Palisades, CA (US); Vikram Venkataraghavan, Saratoga, CA (US); Vishwas Durai, Los Altos, CA (US); James Yarbrough, Fremont, CA (US); Blair Barnett, Mountain View, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 187 days.

(21) Appl. No.: 15/179,120

(22) Filed: Jun. 10, 2016

Related U.S. Application Data

(60) Provisional application No. 62/173,832, filed on Jun. 10, 2015, provisional application No. 62/186,284, filed on Jun. 29, 2015.

(51) Int. Cl.
*G06F 3/06* (2006.01)
*G06F 15/82* (2006.01)

(52) U.S. Cl.
CPC .......... *G06F 3/0607* (2013.01); *G06F 3/0644* (2013.01); *G06F 3/0685* (2013.01); *G06F 15/82* (2013.01)

(58) Field of Classification Search
CPC .............. G06F 17/30327; G06F 3/067; G06F 17/30961; G06F 3/0644; G06F 3/0683;
(Continued)

(56) References Cited

U.S. PATENT DOCUMENTS 6,658,539 B2  12/2003  Arimilli et al.
7,171,521 B2  1/2007  Rowlands et al.
(Continued)

OTHER PUBLICATIONS

Basu, A., Gandhi, J., Chang, J., Hill, M. D., & Swift, M. M. (2013). Efficient Virtual Memory for Big Memory Servers (vol. ISCA '13). Tel-Aviv, Israel: Association for Computing Machinery.
(Continued)

*Primary Examiner* — Gautam Sain
(74) *Attorney, Agent, or Firm* — Womble Bond Dickinson (US) LLP

(57) ABSTRACT

According to one embodiment, a data processing system includes a plurality of processing units, each processing unit having one or more processor cores. The system further includes a plurality of memory roots, each memory root being associated with one of the processing units. Each memory root includes one or more branches and a plurality of memory leaves to store data. Each of the branches is associated with one or more of the memory leaves and to provide access to the data stored therein. The system further includes a memory fabric coupled to each of the branches of each memory root to allow each branch to access data stored in any of the memory leaves associated with any one of remaining branches.

9 Claims, 50 Drawing Sheets

(58) Field of Classification Search
CPC ...... G06F 3/064; G06F 3/0689; G06F 3/0659; G06F 13/4282; G06F 13/28; G06F 2213/0026; G06F 12/00; G06F 3/0607; G06F 3/0685; G06F 15/82
USPC .......................................................... 711/105
See application file for complete search history.

(56) References Cited

U.S. PATENT DOCUMENTS

| | | | |
|---|---|---|---|
| 7,240,143 B1* | 7/2007 | Scheffler | G06F 12/0284 711/121 |
| 7,613,882 B1 | 11/2009 | Akkawi et al. | |
| 8,656,115 B2 | 2/2014 | Kottapalli et al. | |
| 9,244,732 B2 | 1/2016 | West et al. | |
| 10,169,237 B2 | 1/2019 | Ohba et al. | |
| 2003/0174708 A1* | 9/2003 | Van Asten | H04L 12/5601 370/395.7 |
| 2010/0095054 A1 | 4/2010 | Terasaki | |
| 2011/0179109 A1 | 7/2011 | Golbourn et al. | |
| 2012/0017037 A1 | 1/2012 | Riddle et al. | |
| 2012/0117322 A1 | 5/2012 | Satran et al. | |
| 2013/0311817 A1 | 11/2013 | Kim et al. | |
| 2013/0343229 A1 | 12/2013 | Gasparakis | |
| 2014/0032796 A1* | 1/2014 | Krause | G06F 12/0831 710/29 |
| 2014/0122776 A1 | 5/2014 | El Maghraoui et al. | |
| 2014/0173149 A1* | 6/2014 | Walker | G06F 9/45533 710/263 |
| 2014/0237175 A1* | 8/2014 | Felch | G06F 9/3851 711/105 |
| 2014/0237609 A1* | 8/2014 | Sharp | G06F 21/53 726/26 |
| 2014/0244687 A1 | 8/2014 | Shmueli et al. | |
| 2014/0245444 A1 | 8/2014 | Lutas et al. | |
| 2014/0310441 A1 | 10/2014 | Klughart | |
| 2014/0331001 A1* | 11/2014 | Liu | G06F 3/0659 711/103 |
| 2015/0052267 A1* | 2/2015 | Egi | G06F 13/28 710/22 |
| 2015/0234612 A1* | 8/2015 | Himelstein | G06F 3/0619 714/6.21 |
| 2015/0261434 A1* | 9/2015 | Kagan | G06F 13/28 711/103 |
| 2016/0246540 A1* | 8/2016 | Blagodurov | G06F 3/0647 |
| 2016/0350012 A1 | 12/2016 | Tamma et al. | |
| 2016/0357695 A1* | 12/2016 | Johnston | G06F 13/4027 |

OTHER PUBLICATIONS

Bernstein, P. A., Reid, C. W., & Das, S. (2011). Ryder—A Transactional Record Manager for Shared Flash. Asilomar, California, USA: CIDR '11.

Bhadauria, M., & Mckee, S. A. (2008). Optimizing Thread Throughput for Multithreaded.

Boukhobza, J., Olivier, P., & Rubin', S. (2013). CACH-FTL: A Cache-Aware Configurable Hybrid Flash Translation Layer (vol. EICPDNP '13). USA: 21st Euromicro International Conference on Parallel, Distributed, and Network-Based Processing.

Huang, S., Wei, Q., Chen, J., Chen, C., & Feng, D. (2013). Improving Flash-based Disk Cache with Lazy Adaptive Replacement (vols. 978-1-4799-0218-7/13). Singapore, Singapore: IEEE.

Iliadis, I. (2010). Performance of the Greedy Garbage-Collection Scheme in Flash-Based Solid-State Drives. IBM, IBM Research—Zurich. IBM.

Jiang, A., Mateeseu, R., Yaakobi, E., Bruck, J., Siegel, P. H., Vardy, A., et al. (2010). Storage Coding for Wear Leveling in Flash Memories (vol. 16). USA: IEEE Transactions on Information Theory.

Narayanan, D., Thereska, E., Donnelly, A., Elnikety, S., & Rowstron, A. (2009). Migrating Server Storage to SSDs: Analysis and Tradeoffs (vol. EuroSys '09). Nuremberg, Germany: Association for Computing Machinery.

Polte, M., Simsa, J., & Gibson, G. (2009). Enabling Enterprise Solid State Disks Performance. Eashington, DC, USA: 1st Workshop on Integrating Solid-state Memory into the Storage Hierarchy.

Rodrigues, R., Liskov, B., Chen, K., Liskov, M., & Schultz, D. (2010). Automatic Reconfiguration for Large-Scale Reliable Storage Systems (vol. 9). USA: IEEE Transactions on Dependable and Secure Computing.

Saxena, M., & Swift, M. M. (2010). FlashVM: Virtual Memory Management on Flash. Boston, Massachusetts, USA: Usenix.

Sun, C., Miyaki, K., Johguchi, K., & Takeuchi, K. (2013). SCM Capacity and NAND Over-Provisioning Requirements for SCM/NAND Flash Hybrid Enterprise SSD. Tokyo, Japan: IEEE.

Welch, B., & Noer, G. (2013). Optimizing a hybrid SSD/HDD HPC storage system based on file size distributions. Mass Storage Systems and Technologies (MSST), 2013 IEEE 29th Symposium on. MSST '13. Long Beach: IEEE.

Non-Final Office Action dated Aug. 28, 2018 for U.S. Appl. No. 15/629,218.

Non-Final Office Action dated Aug. 28, 2018 for U.S. Appl. No. 15/629,229.

Non-Final Office Action dated Sep. 21, 2018 for U.S. Appl. No. 15/629,247.

Non-Final Office Action dated Aug. 28, 2018 for U.S. Appl. No. 15/629,276.

Design and Analysis of Update-Based Cache Coherence Protocols for Scalable Shaped-Memory, Jun. 1995, Technical Report No. CSL-TR-95-670.

Reducing cache coherence traffic with hierarchical directory cache and NU MA-aware runtime scheduling; Caheny et al.; 2016 International Conference on Parallel Architecture and Compilation Techniques; Sep. 11-15, 2016 (Year: 2016).

* cited by examiner

See Guide/Legend Below the table    v2

| command | size in linux pages | Arguments | | | | | complete core | modifier | return | description |
|---|---|---|---|---|---|---|---|---|---|---|
| | | source | destination | mcfpga staging buffer | mcfpga parity accum buffer | meta data location | | | | |
| e1 | 1 blk | fpa | n/a | n/a | n/a | n/a | n/a | n/a | read complete | erase 1 block |
| e4 | 4 blks | fpa | n/a | n/a | n/a | n/a | n/a | n/a | read complete | erase 4 block |
| p | | fpa | | | | | | | ping complete | ping a target fc who serves the fpa |
| rfb1 | 1 | 1 fpa | bufid | n/a | | n/a | n/a | n/a | read complete | read 1 linux page from flash to amcfpga buffer with metadata returned & stored |
| rfd1 | 1 | fpa | bufid | n/a | | n/a | core | n/a | read complete | read 1 linux page from flash to dram. complete on core |
| rfdr1 | 1 | fpa | bufid | n/a | | n/a | n/a | offset | read complete | read 1 raw flash page to dram at "offset" in the flash page |
| wbd1 | 1 | bufid | dram addr | n/a | | n/a | n/a | n/a | write complete | write 1 pages from mcfpga dram buffer to 1 dram buffers |
| wbd15 | 16 | bufid | dram addr | n/a | | n/a | n/a | offset | write complete | write 16 pages from mcfpga dram buffer to 16 dram buffers |
| wmd1 | 1 | mcfpga dram bufid | dram addr | n/a | | n/a | n/a | offset | write complete | write 1 pages from mcfpga buffer to 1 dram buffers |
| wmd16 | 16 | mcfpga dram bufid | dram addr | n/a | | n/a | n/a | n/a | write complete | write 16 pages from mcfpga buffer to 16 buffers |
| wbf16 | 16 | bufid | fpa, block1, block2, block3 | bufid | n/a | dram addr | n/a | n/a | 1. page complete, 2. write complete | write 16 linux pages to flash from mcfpga buffers. Dest addr is any four blocks in a lun that are on different planes |
| wbf4 | 4 | bufid | fpa | bufid | n/a | in mb | n/a | n/a | 1. page complete, 2. write complete | write 4 linux pages to flash from mcfpga buffers |
| wbfx16 | 16 | bufid | fpa, block1, block2, block3 | bufid | n/a | dram addr | n/a | xor | 1. page complete, 2. write complete | write 16 linux pages to flash from mcfpga dram buffers and xor to parity buffer. Dest addr is any 4 blocks in a lun that are on different planes |
| wmf16 | 16 | mcfpga dram | | n/a | n/a | dram addr | n/a | n/a | 1. page complete, 2. write complete | write 16 linux pages to flash from mcfpga dram buffers. Dest addr is any 4 blocks in a lun that are on different planes |

See Guide/Legend Below the table    v2

| command | size in linux pages | Arguments | | | | | | return | description |
|---|---|---|---|---|---|---|---|---|---|
| | | source | destination | mcfpga staging buffer | mcfpga parity accum buffer | meta data location | complete core | modifier | | |
| wm4 | 4 | mcfpga dram bufid | fpa | bufid | n/a | in mb | n/a | n/a | 1. page complete, 2. write complete | write 4 linux pages to flash from mcfpga dram buffers |
| wmfx16 | 16 | mcfpga dram bufid | fpa, block1, block2, block3 | bufid | bufid | dram addr | n/a | xor | 1. page complete, 2. write complete | write 16 linux pages to flash from mcfpga buffers and xor to parity buffer. Destaddr is any 4 blocks in a lun that are on different planes |
| wbfx4 | 4 | bufid | fpa | bufid | bufid | in mb | n/a | xor | 1. page complete, 2. write complete | write 4 linux pages to flash from mcfpga buffers and xor to parity buffer |
| wdb1 | 1 | dram addr | bufid | n/a | n/a | n/a | n/a | n/a | write complete | write a pg. from dram to amcfpga buffer |
| wdb16 | 16 | dram addr | bufid | n/a | n/a | n/a | n/a | n/a | write complete | write 16 pgs. from dram to a mcfpga buffer |
| wdb4 | 4 | dram addr | bufid | n/a | n/a | n/a | n/a | n/a | write complete | write 4 pgs. from dram to a mcfpga buffer |
| wdm1 | 1 | dram addr | mcfpga dram bufid | n/a | n/a | n/a | n/a | n/a | write complete | write a page from dram to amcfpga dram buffer |
| wdm16 | 16 | dram addr | mcfpga dram bufid | n/a | n/a | n/a | n/a | n/a | write complete | write 16 pages from dram to amcfpga dram buffer |
| wdm4 | 4 | dram addr | mcfpga dram bufid | n/a | n/a | n/a | n/a | n/a | write complete | write 4 pages from dram to amcfpga dram buffer |
| wdff16 | 16 | dram addr | fpa, block1, block2, block3 | bufid | n/a | dram addr | n/a | n/a | 1. page complete, 2. write complete | write 16 linux pages to flash from dram into flash staging them through buffers on the mcfpga. Dest addr is any 4 blocks in a lun that are on different planes |
| wdfx16 | 4 | dram addr | fpa, block1, block2, block3 | bufid | bufid | dram addr | n/a | xor | 1. page complete, 2. write complete | write 16 linux pages to flash from dram into flash staging them through buffers on the mcfpga and xor to parity buffer. Dest addr is any 4 blocks in a lun that are on different planes |

See Guide/Legend Below the table    v2

| command | size in linux pages | Arguments | | | | | complete core | modifier | return | description |
| --- | --- | --- | --- | --- | --- | --- | --- | --- | --- | --- |
| | | source | destination | mcfpga staging buffer | mcfpga parity accum buffer | meta data location | | | | |
| wdfx4 | 4 | dram addr | fpa | bufid | bufid | in mb | | xor | 1. page complete 2. write complete | write 4 linux pages to flash from dram into flash staging them through buffers on the mcfpga and xor to parity buffer |
| xb1 | 1 | bufid | bufid | n/a | n/a | n/a | | n/a | xor complete | xor 1 mcfpga buffer to 1 mcfpga buffer |
| xb16 | 16 | bufid | bufid | n/a | n/a | n/a | | n/a | xor complete | xor 4 mcfpga buffer to 4 mcfpga buffer |
| xb4 | 4 | bufid | bufid | n/a | n/a | n/a | | n/a | xor complete | xor 16 mcfpga buffer to 16 mcfpga buffer |

Guide/Legend legend   arg letter           source/destination   d      dram on the CPU
legend   arg letter           source/destination   m      dram on the MCFPGA
legend   arg letter           source/destination   b      buffer on MCFPGA
legend   arg letter           source/destination   f      flash
legend   arg letter           modifier             x      xor
legend   arg letter           modifier             r      raw
legend   command letter                            e      erase
legend   command letter                            p      ping
legend   command letter                            r      read
legend   command letter                            w      write
legend   command letter                            x      xor
guide    All page complete and write completes return the the core that executed it
guide    All reads from flash to dram complete on the core specified
guide    All buffers in dram, mcfpga, flash are expected to be contiguous unless otherwise specified
guide    Linux pages and MCFPGA pages are 4k
guide    All pages completes are done with bits in dram, all other returns by mb/interrupt
guide    All operations can a) timeout or b) return error

| | plane 0 | | plane 1 | | | | plane 2 | | | | plane 3 | | | |
|---|---|---|---|---|---|---|---|---|---|---|---|---|---|---|
| | offset 0 | offset 4k | offset 8k | off. 12k | offset 0k | offset 4k | offset 8k | off. 12k | offset 0k | offset 4k | offset 8k | off. 12k | offset 0k | offset 4k | offset 8k | off. 12k |
| page 0 | 0 | 1 | 2 | 3 | 4 | 5 | 6 | 7 | 8 | 9 | 10 | 11 | 12 | 13 | 14 | 15 |
| page 1 | 16 | 17 | 18 | 19 | 20 | 21 | 22 | 23 | 24 | 25 | 26 | 27 | 28 | 29 | 30 | 31 |
| page 2 | | | | | | | | | | | | | | | | |
| page 3 | | | | | | | | | | | | | | | | |
| page 4 | | | | | | | | | | | | | | | | |
| page 5 | | | | | | | | | | | | | | | | |
| page 6 | | | | | | | | | | | | | | | | |
| page 7 | | | | | | | | | | | | | | | | |
| page 8 | | | | | | | | | | | | | | | | |
| page 9 | | | | | | | | | | | | | | | | |
| page 10 | | | | | | | | | | | | | | | | |
| page 11 | | | | | | | | | | | | | | | | |
| page 12 | | | | | | | | | | | | | | | | |
| page 13 | | | | | | | | | | | | | | | | |
| page 14 | | | | | | | | | | | | | | | | |
| page 15 | | | | | | | | | | | | | | | | |
| page 16 | | | | | | | | | | | | | | | | |
| page 17 | | | | | | | | | | | | | | | | |
| page 25 | 4080 | 4081 | 4082 | 4083 | 4084 | 4085 | 4086 | 4087 | 4088 | 4089 | 4090 | 4091 | 4092 | 4093 | 4094 | 4095 |

EXABYTE-SCALE DATA PROCESSING SYSTEM

RELATED APPLICATIONS

This application claims the benefit of U.S. Provisional Patent Application No. 62/173,832, filed Jun. 10, 2015 and U.S. Provisional Application No. 62/186,84, filed Jun. 29, 2015. The disclosure of the above provisional applications is incorporated by reference herein in its entirety.

FIELD OF THE INVENTION

Embodiments of the present invention relate generally to data processing systems. More particularly, embodiments of the invention relate to scalable multi-processing systems.

BACKGROUND

As increasingly larger data sets become available for analysis, organizations such as businesses and governments need to be able to exploit that data for faster, more accurate decision-making and more efficient operation. Furthermore, processing such data sets may involve solving certain classes of problems that are both data intensive and computationally intensive. Certain such data sets may reach petabyte-scale in size and require a high degree of parallel processing throughput. However, conventional data processing systems fail to provide efficient or even tenable high bandwidth access to petabyte-scale data sets. Consequently, analysis performed by conventional data processing systems on such petabyte-scale data sets is typically inefficient and sometimes impossible given practical system constraints.

BRIEF DESCRIPTION OF THE DRAWINGS

Embodiments of the invention are illustrated by way of example and not limitation in the figures of the accompanying drawings in which like references indicate similar elements.

FIG. 39 shows protection groups according to one embodiment.

FIG. 41 shows a page number ordering scheme according to one embodiment.

DETAILED DESCRIPTION

Figure 1A:
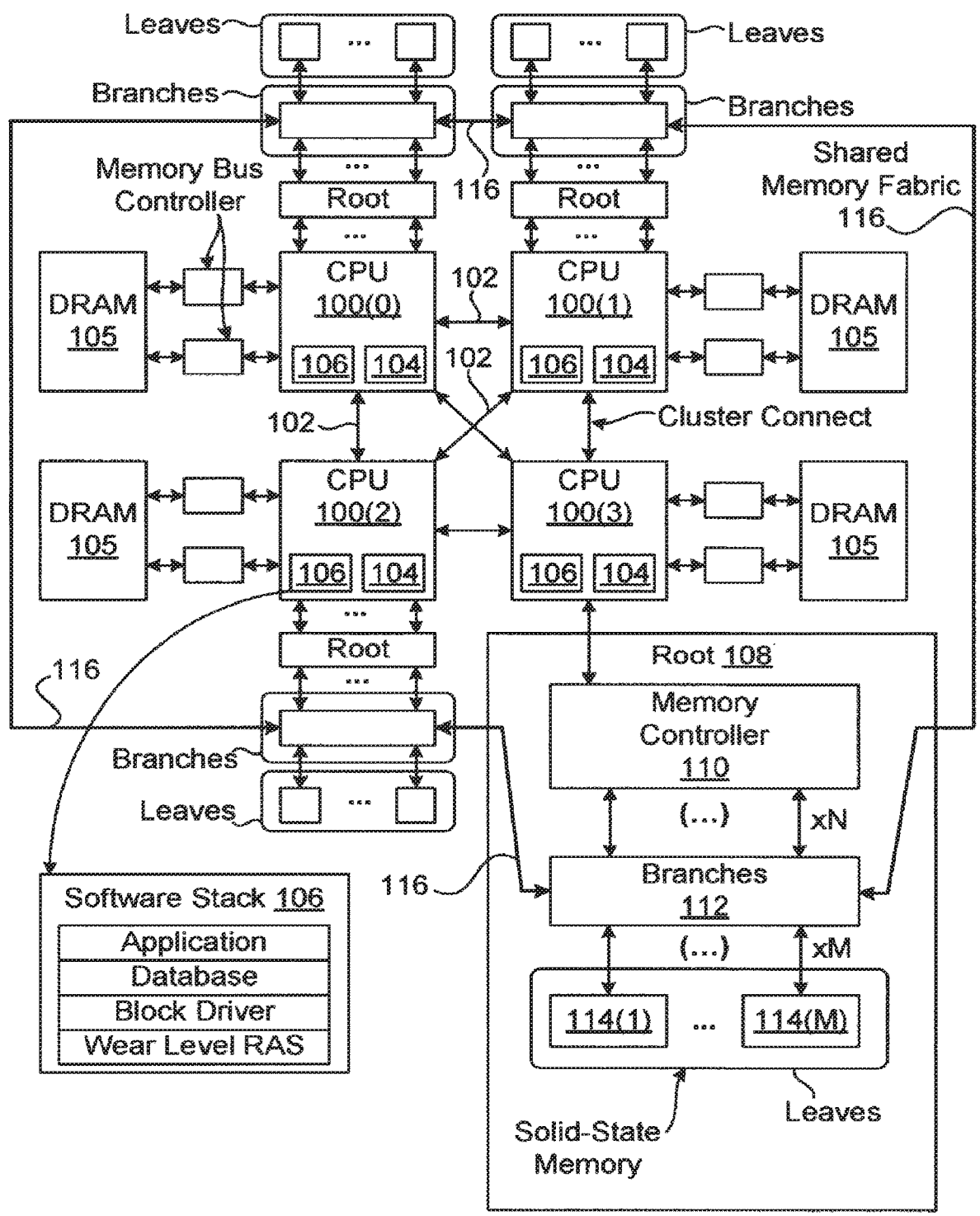
FIG. 1A illustrates an exemplary system architecture of a data processing system, according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments described herein of a petabyte-scale data processing system advantageously enable previously unsolvable data processing problems to be solved by providing highly-efficient access to petabyte-scale data sets in multiprocessor data processing systems. In particular, certain embodiments enable multiprocessing applications to efficiently access a shared petabyte-scale data space. A data processing system enables the solution of these previously unsolvable data processing problems. A computing appliance is a dedicated hardware device incorporating integrated software, designed to provide a specific computing function.

A petabyte-scale data processing system is essentially a computing appliance capable of running a very broad range of applications and, in this sense, may be considered to be a general-purpose computing machine. A petabyte-scale data processing system implements a cost-effective architecture that efficiently creates a very large, shared data space. Application programs gain access to this data through multiple application programming interfaces (APIs).

Present application describes the architecture and mechanism of systems computing appliances. These systems are designed to exploit low cost, solid-state devices thereby providing many computing units (cores) with parallel access to the entire data capacity of the system. This means that the solid-state devices (e.g., flash memory devices) may have addresses in the processor's memory space, may have varying sizes and granularities, and may appear as multiple objects of varying types through multiple APIs, all simultaneously. This data space is on a very large scale, e.g. tens of terabytes to many Exabytes.

The designs and techniques disclosed in conjunction with the data processing system include a number of interconnected components comprising both hardware and software. Each component may have unique characteristics and functions that are required for the operation of the complete system. When interconnected, these components advantageously create the desired computational, throughput, bandwidth, latency, and storage scale capabilities of the data processing system. In order to function correctly, the interconnections must function in complimentary fashion. Consequently, many of the components must be designed and programmed according to the required function of the overall system and adhere to interface behavior of other system components.

Embodiments of the present invention process large volumes of data in short time periods by combining many computing cores into a single computing system. In certain configurations the computing cores may be independent, while in certain other configurations the computing cores may include tightly-coupled multi-threaded processors such as those found in a modern graphics processing unit (GPU). A software application configured to utilize the many computing cores to achieve high computational throughput typically instantiates may substantially simultaneously-executing threads. The threads may be components of one or more different sub-programs or thread programs. An application program that has many instances of a program thread simultaneously executing on the aforementioned computing cores is said to be "concurrently programmed". In other words, the program has been written in a way that allows the substantially simultaneous execution of the instances to achieve a correct result. Computing systems that are able to execute concurrent, parallel, or multi-threaded programs are often described as parallel processing machines (or just parallel processors).

Some embodiments of the invention described herein implement a parallel processing machine, invented and implemented to address problems associated with processing extremely large amounts of data. The number of simultaneous data accesses that can be serviced by a computer limits the performance of many data driven applications. Increasing the number of computing cores further limits performance rather than increasing performance because the increased number of computing cores conventionally generates increased contention for data residing within the same memory system. The data processing system provides a large number of memory chips with a multi-rooted interconnection to the CPUs housing the computing cores. In particular, the data processing system provides efficient, parallel, application access to data residing within the large number of memory chips. Specialized system software manages efficient scheduling of the computation within the computing cores and data access to the memory chips.

Working models of embodiments of the invention have been implemented utilizing existing, commercially available multicore CPUs, but embodiments of the present invention extend to machines that utilize different memory management techniques, both hardware and software, in order to achieve the above mentioned application concurrency required to efficiently utilize the parallel processing capabilities of multicore machines.

According to some embodiments, a data processing system includes a number of processing units, each processing unit having one or more processor cores. The system further includes a number of memory roots, each memory root being associated with one of the processing units. Each memory root includes one or more branches and a number of memory leaves to store data. Each of the branches is associated with one or more of the memory leaves and to provide access to the data stored therein. The system further includes a memory fabric (e.g., as a communications fabric or mesh) coupled to each of the branches of each memory root to allow each branch to access data stored in any of the memory leaves associated with any one of remaining branches.

According to one aspect of the invention, a data processing system includes a number of processing units (e.g., CPUs), a number of memory roots, and a memory fabric coupled to each of the memory roots. Each of the processing units include one or more processor cores and each memory root is associated with one of the processing units. Each processor core may execute instructions of a particular thread, where a processor core is also referred to as a thread processor. Each of the memory roots includes one or more branches and a number of memory leaves. Each branch is associated with one or more memory leaves to provide access of the corresponding memory leaves. Each leaf includes one or more memory devices (e.g., solid state memory devices). The memory fabric allows each of the branches to access (e.g., read and write) data stored in any of the memory leaves associated with any one of the remaining branches.

According to another aspect of the invention, each of the branches includes one or more sets of queues to buffer commands and data of accessing memory leaves, either locally or remotely. Each set of queues is associated with one of the processor cores of the corresponding processing unit. In one embodiment, each set of queues includes a submission queue (also referred to as a command queue) and a completion queue (also referred to as a done queue). A submission queue is to store commands received from a corresponding processor core for accessing data of a particular memory leaf of a particular branch. A completion queue is to store a result (e.g., status, acknowledgement) of executing a command dispatched from a corresponding submission queue.

FIG. 1A illustrates an exemplary system architecture of a data processing system, according to one embodiment. The system architecture comprises several processing units such as central processing units (CPUs) 100, each with many computing "cores", interconnected internally by a high-speed interface. The CPUs 100 may be interconnected externally through a cluster connect 102, which may provide transport for cache coherence messages. In this way, each of the cores in each of the CPUs 100 may be presented with a coherent memory model. In certain embodiments, each CPU possesses local memory 105, in this case dynamic random access memory (DRAM), or another similar type of memory. Each CPU also possesses local "memory root(s)" 108 to an extended memory, such as, for example, a solid-state memory. As noted below, this block diagram pictures one of many possible configurations of the invention. In particular, the memory controller might use one of several interconnection protocols, for example JEDEC Double Data Rate 3 (DDR3), JEDEC Double Data Rate 4 (DDR4) or Intel Peripheral Component Interconnect Express (PCIe).

Each CPU may include a cache 104 configured to operate with the local memory. The computing cores within the CPUs may each be configured to execute a software stack 106 resident either in local memory 105 or in memory comprising a memory root 108. The memory root may be configured to include branches 112 connected through the memory controllers 110 to one or more associated CPUs. In one embodiment, the software stack includes application programs, a database, block drivers, and wear level Reliability Availability Serviceability (RAS) modules, as discussed below.

The number of simultaneous data accesses that can be serviced by a computer in general limits the performance of many data driven applications. The disclosed system provides a large number of memory devices having a large net cross-sectional interconnect bandwidth coupled to a multi-rooted interconnection coupled to multiple CPUs housing the computing cores. The multi-rooted interconnection provides efficient parallel access to the data, thereby enabling concurrent, parallel, and multi-threaded application programs to operate efficiently. As stated previously, specialized system software manages the efficient scheduling of the computation and data access.

In one embodiment, a root memory controller 110 connects to a complex of interconnected CPUs 100, each consisting of multiple cores (e.g., processor cores), and drives a hierarchy of branches 112 and leaves 114. In one embodiment, there may be 15 processor cores within a CPU and each of the processor cores can execute instructions of a particular thread. Observe that each branch is attached either to another branch or a number of leaves or a mix of both. A leaf 114 is composed of flash memory or other solid-state or digital memory. In particular, there may be 1024 or more memory chips attached to a single root (e.g., FPGA(s) or ASIC(s)) through branches. Each CPU complex can be connected to one or more roots (e.g., eight or more roots). Consequently, if FIG. 1A was accurate and to scale, the number of solid-state memory leaves would overwhelm the figure. In this architecture the CPUs have thousands of memory targets that may be accessed in parallel. The number of CPUs in the CPU complex and the size and number of memory trees can also increase to very large numbers. The balance reflects the need(s) of a particular use (application).

The components in this architecture are composed of both hardware and software. Some of the components may include: (1) a data management system, the database or data management system may be (a) multithreaded, (b) configured to utilize a single shared memory model, or a distributed memory model, or a combination of both, in order to achieve a high degree of parallelism; (2) a memory management system, the memory management system may be (a) multithreaded to exploit large multi-cored systems, (b) highly parallel, (c) configured to access and manage a very large capacity (e.g.,»100 TB); (3) a cache management system, the cache management system may be configured to maintain data coherency across individual processing nodes (computing cores); and (4) a memory system comprising roots, branches and leaves.

Some embodiments may implement a cache coherent memory model in which each CPU thread caches its state in the memory. In one embodiment, there are four roots sometimes referred to herein as Memory Modules (MMs). Conceptually, each root replaces a memory riser card in the computer's chassis. The MMs connect to a distribution network, providing an interface to a number of branches, each of which connects to a number of leaves.

Conceptually, moving down the memory management system encompasses greater parallelism, effectively multiplying the concurrent operations at each level as memory access moves from the root to the branch to the leaves.

The disclosed system may be built in a variety of configurations that are suited to particular usage patterns. The invention may be optimized for a large number of specific uses such as these large memory consumption applications: Business Intelligence, Business Analytics, Geo-Seismic, Medical Imaging, Molecular and Biopharmaceutical Modeling (e.g. protein-protein interaction simulation), Social Networking and Patient Management.

Figure 18:
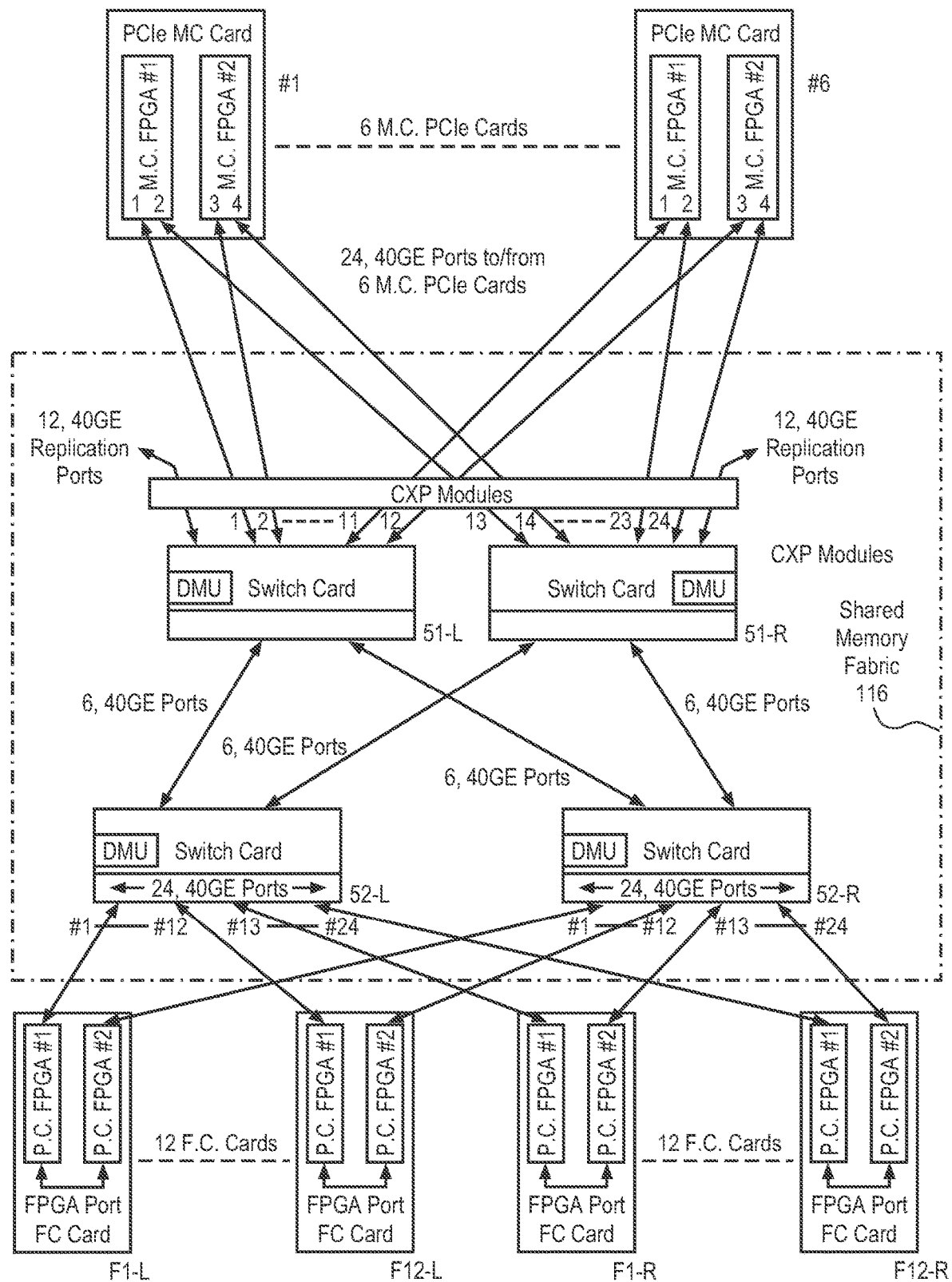
FIG. 18 illustrates a working model implementation of a memory subsystem, according to one embodiment.

In one embodiment, a shared memory fabric 116 implements a data network for transmitting messages between branches 112 in the system. The data network may be an Ethernet, in which branches may communicate with each other using Ethernet protocols. While depicted here in conceptual form, any technically feasible network structure or topology may be implemented, including non-blocking cross-bar and mesh topologies. FIG. 18 shows an exemplary implementation of shared memory fabric 116.

In one embodiment, since memory fabric 116 couple all of the branches 112, each of branches 112 can communicate with any one of the remaining branches for accessing any one of leaves 114 of the branch, without having to invoke an associated processing unit. According to one embodiment, each of the processing unit is coupled to any one of DRAMs 105 of all the processing units (e.g., CPUs 100(0) to 100(3)), for example, via a shared memory bus, interconnect, or network, without having to invoke a corresponding processing unit. Thus, a particular processor core of a particular processing unit can access any one of DRAMs 105 or any one of memory leaves 114 of any one of the remaining processing units, without having to invoke the associated processing unit. By coupling all branches together via a shared memory fabric (or interconnect, bus, or any kind of communication fabrics), a processor core can access data stored in any of the memory leaves using a number of access paths, which are represented by various branches. If one path (e.g., via a first branch) fails, a processor core can access the same data via another path (e.g., via a second branch).

Figure 1B:
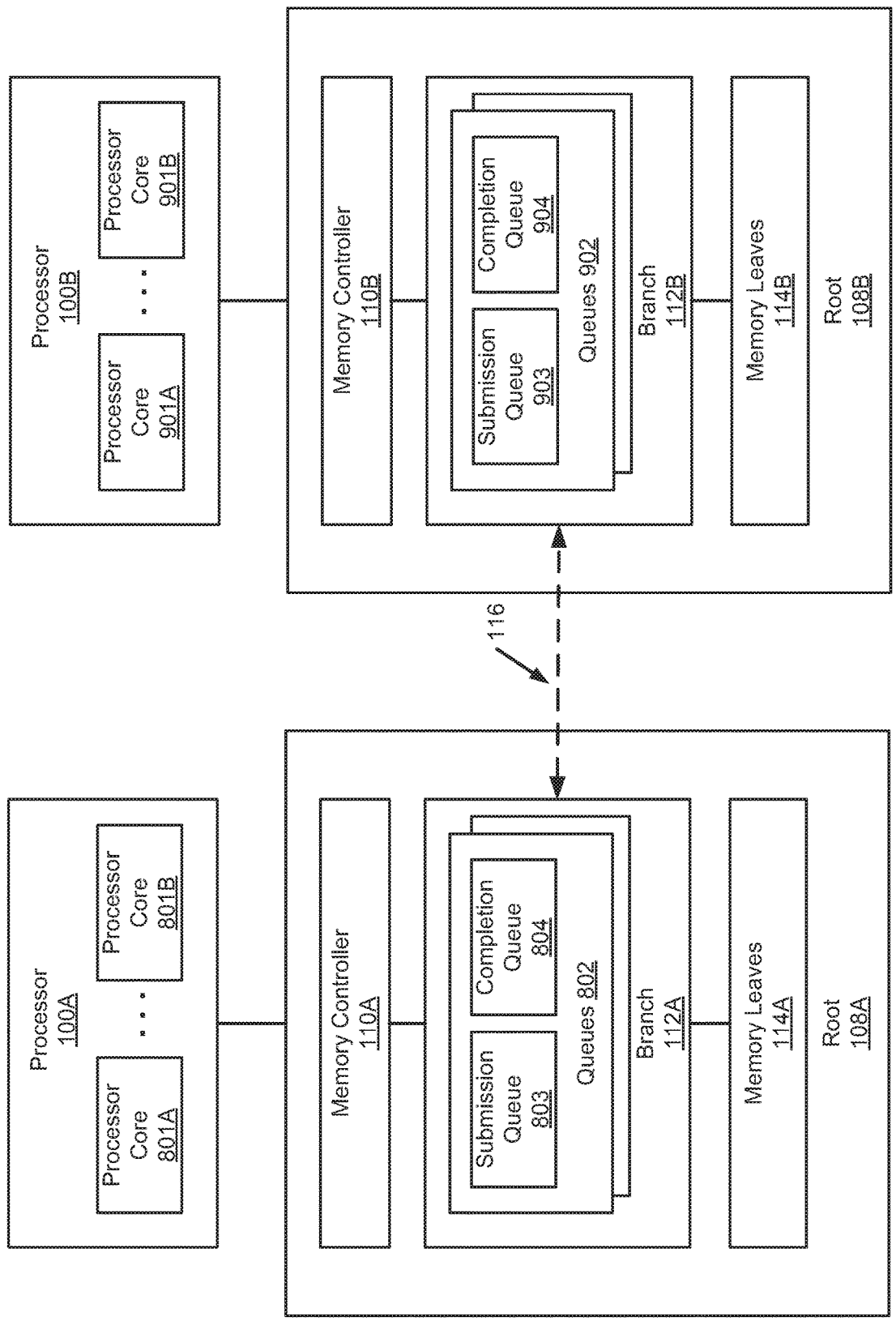
FIG. 1B illustrates an exemplary system architecture of a data processing system, according to another embodiment.

FIG. 1B is a block diagram illustrating an example of a system architecture according to an alternatively embodiment. The system architecture as shown in FIG. 1B may be implemented as part of the system architecture as shown in FIG. 1A. Referring to FIG. 1B, although there are only two processing units and their respective roots shown, more or fewer processing units and their roots can also be applicable. For the purpose of illustration, in order not to unnecessarily obscure embodiments of the invention, certain components having the same or similar functionalities are shown with the same or similar reference numbers. The corresponding description throughout this application with respect to the same or similar reference numbers are applicable herein without duplication.

In one embodiment, as described above, a data processing system includes a number of processing units or processors (e.g., CPUs) 100A-100B, a number of memory roots 108A-108B, and shared memory fabric or communication fabric 116 coupled to each of the memory roots. Each of the processing units 100A-100B include one or more processor cores (e.g., processor cores 801A-801B and 901A-901B), and each memory root is associated with one of the processing units. In this example, memory root 108A is associated with processor 100A and memory root 108B is associated with processor 100B. Each processor core may execute instructions of a particular thread, where a processor core is also referred to as a thread processor. Each of the memory roots 108A-108B includes one or more branches (e.g., branches 112A-112B) and a number of memory leaves (e.g., memory leaves 114A-114B). In this example, although there is only one branch for each processor, more branches can be implemented within the corresponding root. Each branch is associated with one or more memory leaves to provide access of the corresponding memory leaves. Each leaf includes one or more memory devices (e.g., solid state memory devices) to store data. The memory fabric 116 allows each of the branches 112A-112B to access (e.g., read and write) data stored in any of the memory leaves 114A-114B associated with any one of the remaining branches.

In one embodiment, each of branches 112A-112B includes one or more sets of queues (e.g., sets 802-803) to buffer commands and data of accessing memory leaves, either locally or remotely. Each set of queues is associated with one of the processor cores of the corresponding processing unit. In one this example, the sets of queues 802 are associated with processor cores 801A-801B of processor 100A, one set for each of processor cores 801A-801B. Similarly, the sets of queues 902 are associated with processor cores 901A-901B of processor 100B, one set for each of processor cores 901A-901B. In one embodiment, each set of queues includes a submission queue or SQ (e.g., SQs 803 and 903, also referred to as a command queue) and a completion queue or CQ (e.g., CQs 804 and 904, also referred to as a done queue). A submission queue is used by an end point to submit a command to another end point over the shared memory fabric for a particular operation. A completion queue is used by an end point to place an acknowledgment or response to a command previously submitted via a submission queue.

For example, it is assumed the set of queues 802 is associated with processor core 801A. When processor core 801A attempts to access data stored in memory leaves 114A, it will place, via memory controller 110A, one or more commands in SQ 803. Branch 112A then executes the commands from SQ 803 to perform the requested operation. Once the operation has been completed, branch 802 places a result (e.g., status, acknowledgement) of the operations in CQ 804, which will in turn notify memory controller 110A and/or processor core 801A (e.g., via interrupt).

Similarly, when processor core 801A attempts to access data stored in memory leaves 114B, it places a command in SW 803. Branch 112A then executes the command from SQ 803. Branch 112A communicates with branch 112B via memory fabric 116 based on the command to request the operation to be performed at root 108B. In response branch 112B performs the requested operation. Once the operation has been completed, branch 112B communicates the result of the operation back to branch 112A. Branch 112A places the result in CQ 804, which in turn will notify memory controller 110A and processor core 801A. Branches 112! And 112B may communicate with each other using a variety of signaling protocols or communication protocols (e.g., Ethernet protocols). Since there is one set of SQ and CQ for each of the processor cores, the above operations can be performed in parallel for multiple processor cores executing multiple threads.

Figure 2:
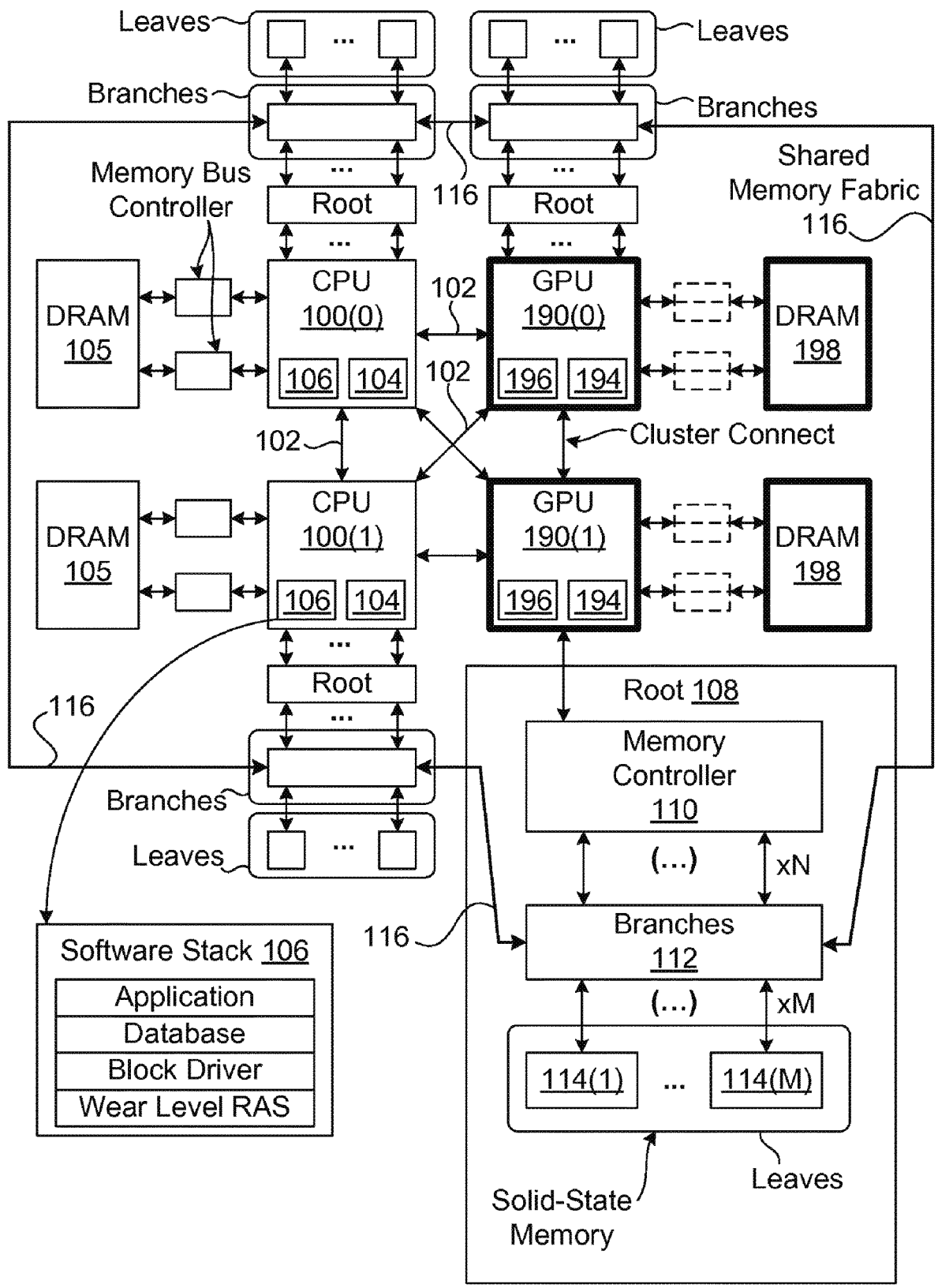
FIG. 2 illustrates an exemplary system architecture of a data processing system configured to include GPU resources, according to one embodiment.

FIG. 2 illustrates an exemplary system architecture of the data processing system configured to include GPU resources, according to one embodiment. The system architecture comprises one or more CPUs 100 and one or more GPUs 190. As shown, two CPUs 100 and two GPUs 190 are coupled together through cluster connect 102. Each GPU 190 may be coupled to a local memory subsystem. In one embodiment, the local memory subsystem comprises DRAM devices 198 and each GPU 190 is coupled to associated DRAM devices 198. The DRAM devices 198 may be coupled to a corresponding GPU 190 through an intervening subsystem such as a memory bus controller or the DRAM devices 198 may be coupled directly to a corresponding GPU 190. In one embodiment, DRAM devices 105 and DRAM devices 198 are selected to be substantially identical types of devices. In other embodiments, DRAM devices 105 and DRAM devices 198 are selected to be different types of devices.

In one embodiment, each GPU 190 includes a plurality of thread processors coupled to a cache 196. One or more thread processors may be configured to concurrently execute an instance of a thread program 194. A modern GPU may be configured to concurrently execute many thousands of instances of thread program 194 and retain execution state for yet more instances that may be scheduled for execution. In certain embodiments, different thread programs may be loaded into corresponding different GPUs or different GPU cores on the same GPU for concurrent execution.

GPUs 190 may be coupled to the cluster connect through any technically feasible interface. For example, GPUs 190 may be coupled to the cluster connect through a PCIe interface, a QPI (Intel Quick Path Interconnect) interface, or a memory bus interface.

Figure 3:
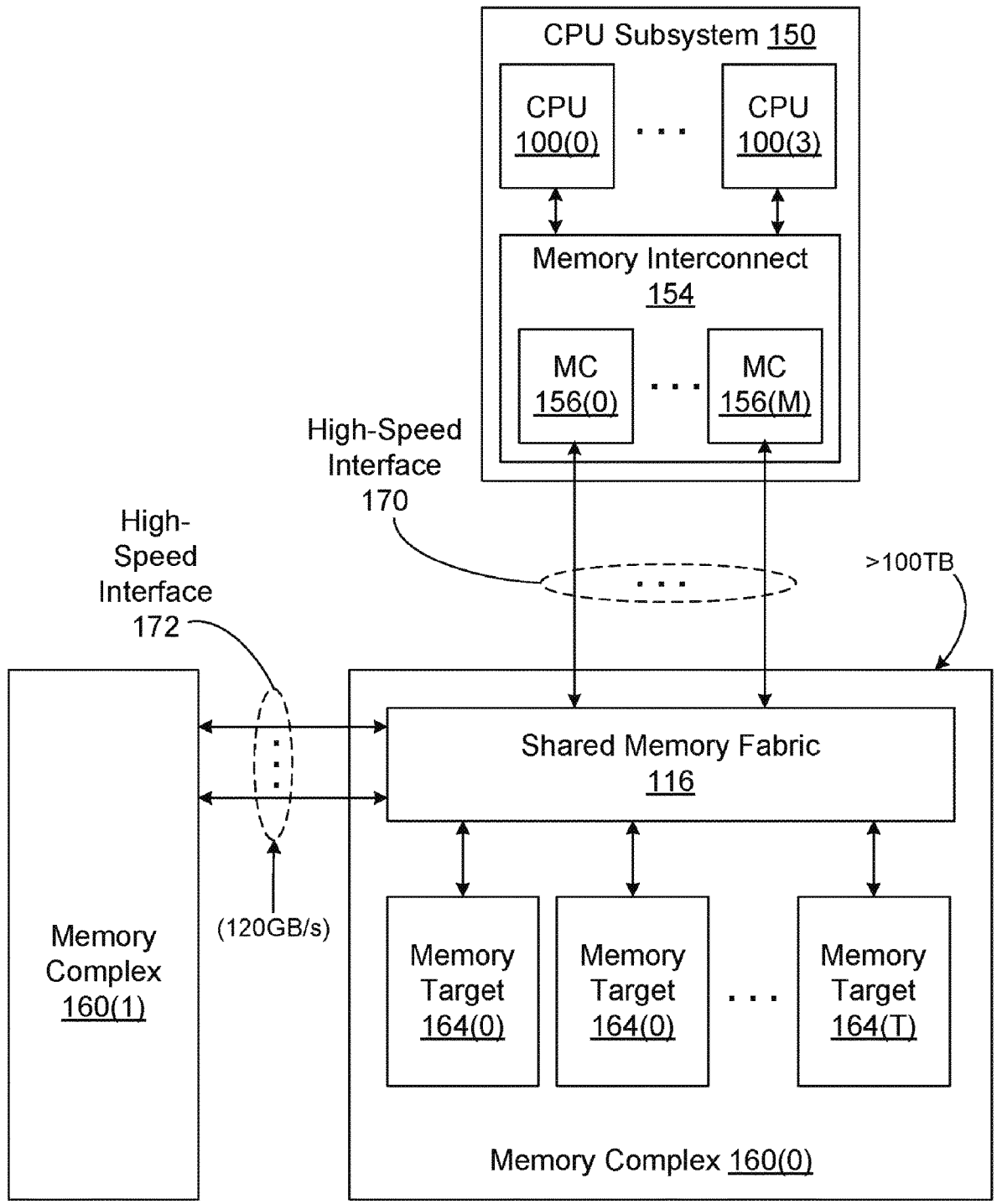
FIG. 3 illustrates a conceptual implementation comprising a single CPU subsystem, according to one embodiment.

FIG. 3 illustrates a conceptual implementation comprising a single CPU subsystem 150, according to one embodiment. CPU subsystem 150 may be implemented as a rack-mounted server box. As shown, CPU subsystem 150 comprises two or more CPUs 100 coupled together locally through a memory interconnect 154. For clarity, local memory and other components of the CPU subsystem are not shown. Memory interconnect 154 includes memory controller (Mc) 156(0) through MC 156(M). Each MC 156 may be coupled to a CPU 100 and may present memory resources to the CPUs 100. The memory resources may include memory blocks, memory pages, or groups thereof. A high-speed interface 170 is coupled between the MCs 156 of the CPU subsystem and a shared memory fabric 116 within a memory complex 160(0). High-speed interface 170 is configured to transmit data between memory controllers 156 and shared memory fabric 116. The data may include memory access requests (e.g., read and write access requests) from the CPU subsystem to target memory resources. High-speed interface 170 may include multiple independent, high-speed data links. High-speed interface 170 may be implemented using any technically feasible data transmission technology. In one embodiment, high-speed interface 170 comprises a plurality 10 GB Ethernet links, 40 GB Ethernet links, or any combination thereof.

In one embodiment, shared memory fabric 116 is configured to receive memory access requests from high-speed interface 170 and forward the requests to corresponding memory targets 164. For example, a CPU may generate a write request and post the write request to a memory controller 156. The memory controller may transmit the write request through high-speed interface 170 to shared memory fabric 116. Shared memory fabric 116 then forwards the write request to an appropriate memory target 164. Sequential chunks of memory (e.g. aligned cache lines) associated with a given CPU may be mapped to sequential units of storage within memory targets 164(0) through 164(T). Consequentially, when a given thread executing on one CPU core writes a contiguous range of memory, associated chunks of memory are distributed over the memory targets 164 rather than concentrated within on memory target. Spreading out each address range associated with each CPU core in this way statistically distributes accesses across interconnection and memory resources and reduces the probability of a resource contention where two or more CPUs are attempting to access a common resource along the path from memory interconnect 154 to stored data within memory targets 164. Shared memory fabric 116 is depicted here conceptually as a single module; however, the shared memory fabric may be implemented as a data network, such as a distributed mesh, a cross-bar, tree, and the like. Memory targets 164 may comprise branches 112, leaves 114, or a combination thereof.

A second memory complex 160(1) may be coupled to memory complex 160(0) through high-speed interface 172. In one embodiment, high-speed interface 172 is configured to transmit 120 GB/s of data in each direction, and may be implemented as twelve 10 GB Ethernet links or three 40 GB Ethernet links. Memory complex 160(1) may be configured to mirror operations of memory complex 160(0) or participate in data migration between memory complex 160(0) and 160(1).

Figure 4:
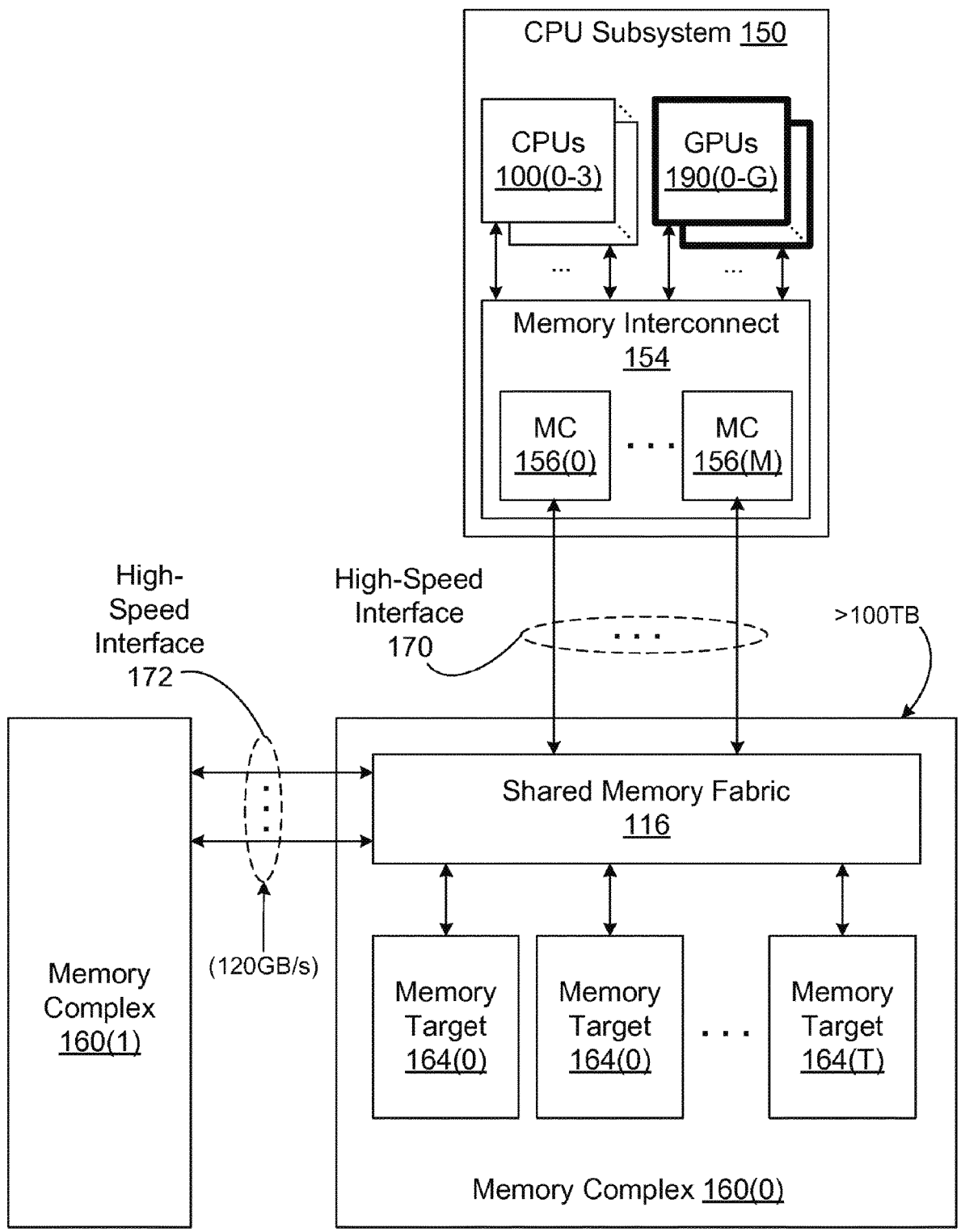
FIG. 4 illustrates a conceptual implementation comprising a single CPU subsystem configured to include GPU resources, according to one embodiment.

FIG. 4 illustrates a conceptual implementation comprising a single CPU subsystem 150 configured to include GPU resources, according to one embodiment. As shown, one or more CPUs 100 may be coupled to memory interconnect 154. Furthermore, one or more GPUs 190 are coupled to memory interconnect 154. The CPUs and the GPUs may include local memory resources such as DRAM devices 105 and 198.

Figure 5:
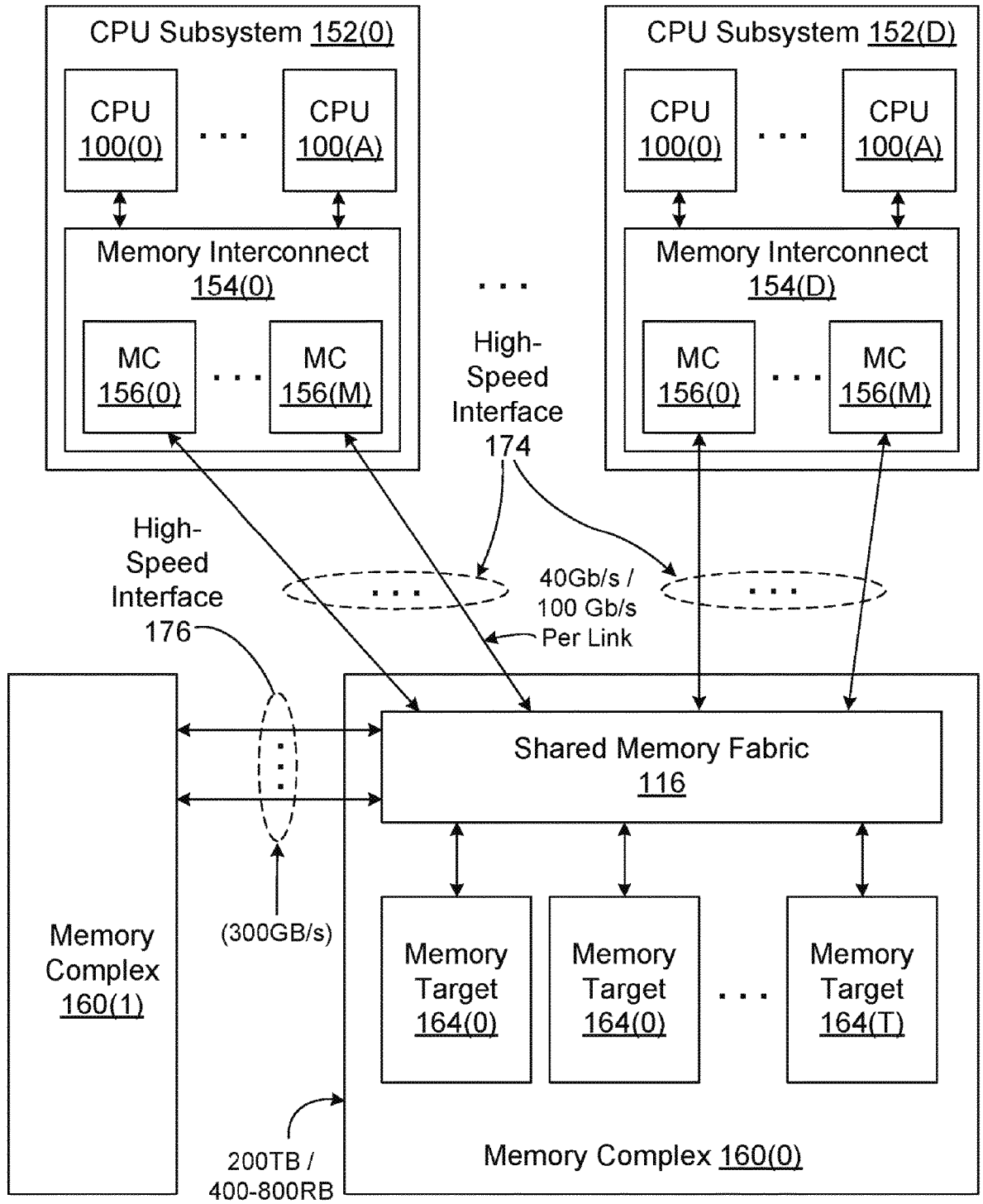
FIG. 5 illustrates a conceptual implementation comprising multiple CPU subsystems, according to one embodiment.

FIG. 5 illustrates a conceptual implementation comprising multiple CPU subsystems 152, according to one embodiment. The multiple CPU subsystems 152 may be implemented as a rack mounted server boxes. As shown, CPU subsystems 152 comprise two or more CPUs 100 coupled together locally through memory interconnect 154. For clarity, local memory and other components of the CPU subsystem are not shown. A high-speed interface 174 is coupled between the CPU subsystem and shared memory fabric 116 within a memory complex 160(0). High-speed interface 174 may include multiple, independent, high-speed data links. In one embodiment, high-speed interface 174 comprises a plurality of 40 GB or 100 GB Ethernet links. Furthermore, an access request from a CPU 100 to a memory target 164 is transmitted and acknowledged through the same Ethernet link.

Memory complex 160(1) may be coupled to memory complex 160(0) through high-speed interface 176. In one embodiment, high-speed interface 176 is configured to transmit 300 GB/s of data in each direction, and may be implemented as three 100 GB Ethernet links, or a combination of lower-rate Ethernet links.

The conceptual implementation shown here in FIG. 5 is similar to that of FIG. 1A and FIG. 3, except that CPU subsystems 152 may provide scale-out configurability. For example, the system may be implemented to provide a multi-processing computation platform using multiple independent CPU subsystems 152, each comprising a server chassis coupled to shared memory fabric 116.

Figure 6:
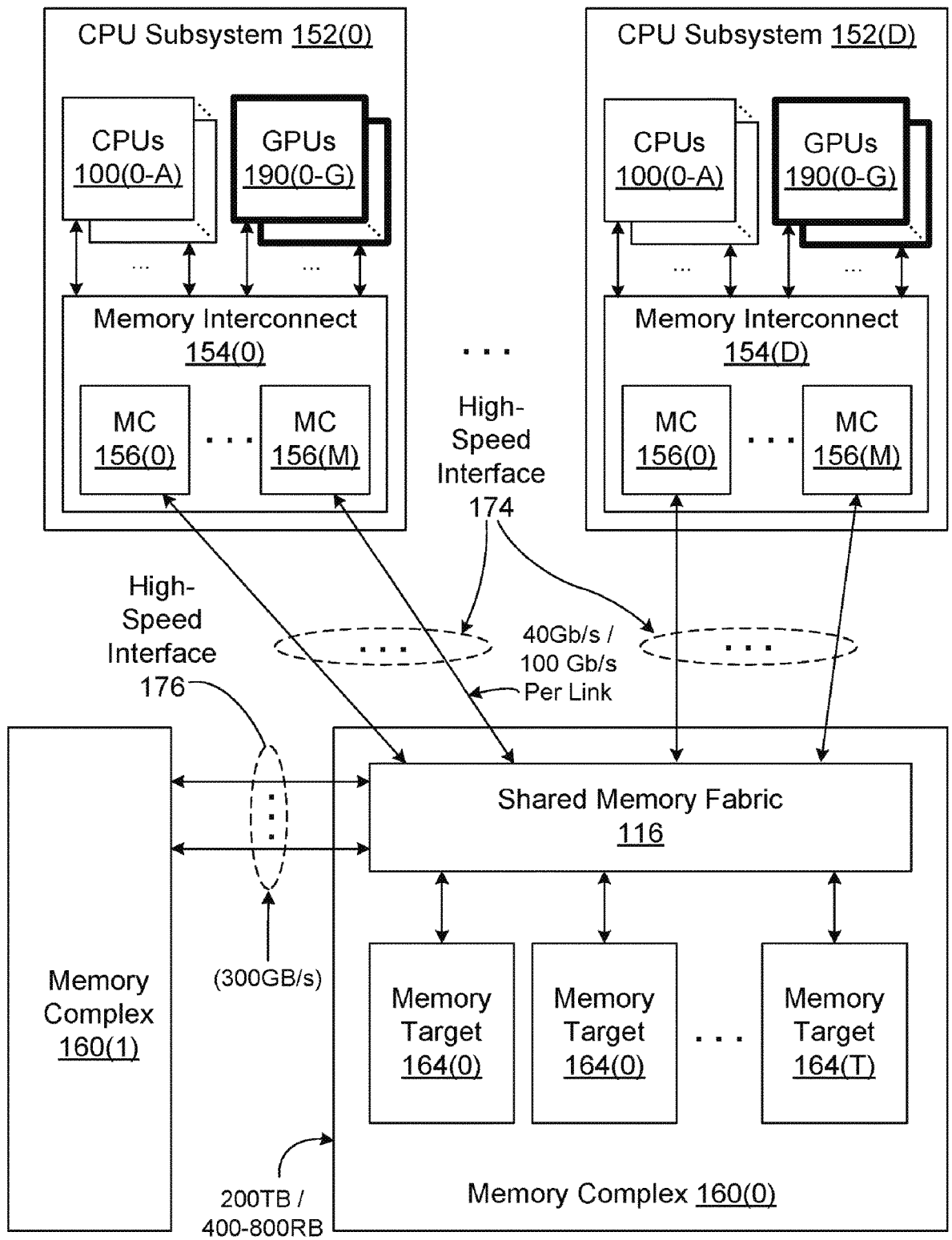
FIG. 6 illustrates a conceptual implementation comprising multiple CPU subsystems configured to include GPU resources, according to one embodiment.

FIG. 6 illustrates a conceptual implementation comprising multiple CPU subsystems 152 configured to include GPU resources, according to one embodiment. As shown, one or more CPUs 100 may be coupled to memory interconnect 154. Furthermore, one or more GPUs 190 are coupled to memory interconnect 154. The CPUs and the GPUs may include local memory resources such as DRAM devices 105, 198.

2.1 System Architecture and Variations

Embodiments of the present invention can be built in a variety of configurations that are suited to particular usage patterns. A particular configuration may be optimized for a large number of specific uses, such as these large memory consumption applications: Business Intelligence, Business Analytics, Geo-Seismic, Medical Imaging, Social Networking, Fraud Detection, Patient Management and Database and Data Warehouse Extract, Transform and Load (ETL), and protein-protein modeling.

In one embodiment, a root memory controller connects to a complex of interconnected CPUs, each consisting of multiple cores, and drives a hierarchy of branches and leaves. Observe that each branch is attached either to another branch or a number of leaves or a mix of both. Put another way, the memory controllers and branches may be interconnected. The interconnection may include the implementation of data coherence protocols utilized with and without multiple copies of the data distributed across local or remote leaves. One such implementation is realized in the working model (see Section 4. Working Model).

A leaf may include flash memory or other solid-state or digital memory. In particular, there may be 1024 or more memory chips attached to a single root (e.g., FPGA(s) or ASIC(s)) through branches. Each CPU complex can be connected to eight or more roots. Consequently, if this figure were accurate and to scale; the number of solid-state memory leaves would overwhelm the figure. In this architecture the CPUs have thousands of memory targets that may be accessed in parallel.

2.2 System Components

The components in this architecture include both hardware and software. The components include the following:

2.2.1 Data Management System

A database or data management system that may be: 1) Multithreaded; and 2) Utilizes a single shared memory model, or a distributed memory model, or a combination of both, in order to achieve a high degree of parallelism. In some embodiments, this may be a cache coherent memory model in which each CPU thread caches its state in the memory.

2.2.2 Memory Management System

A Memory Management System that may be: 1) Multithreaded to exploit large multi-cored systems; 2) Highly Parallel; 3) Very Large Capacity; and 4) As a metaphor: moving down the memory management system results in growing parallelism. Effectively multiplying the concurrent operations at each level as the memory access moves from the root to the branch to the leaves.

2.2.3 Cache Management System

A Cache Management System that, in some embodiments, maintains data coherency across individual nodes (or cores) in the computer system.

2.2.4 Memory System

Each memory system may include roots, branches and leaves, as described above. In one embodiment, there are four roots sometimes referred to herein as Memory Modules (MMs). Conceptually, one or more roots can replace one or more corresponding memory riser cards in the computer's chassis. Each root may connect to a distribution network, providing an interface to a number of branches, each of which connects to a number of leaves.

Figure 7:
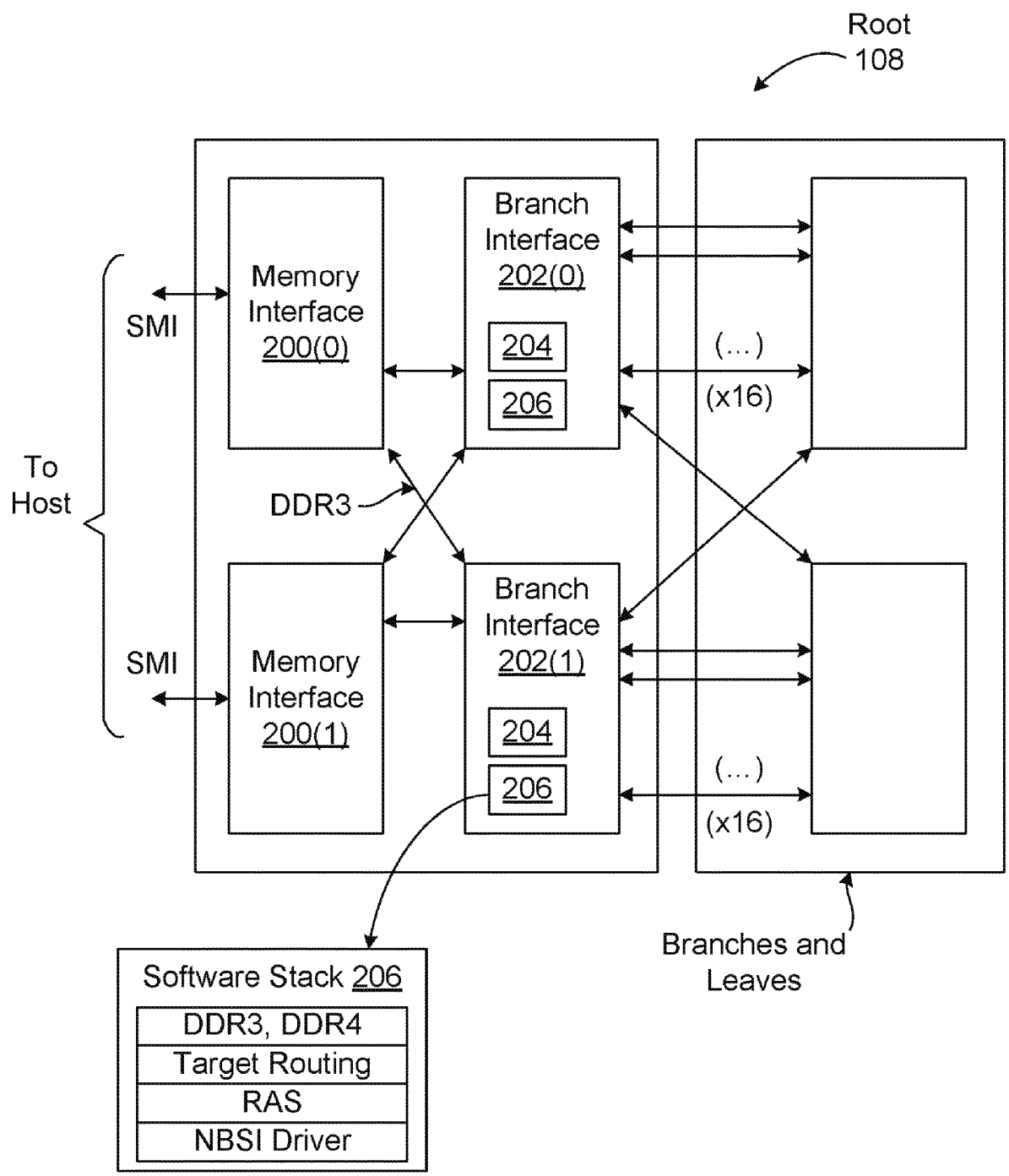
FIG. 7 shows a single Root, including two memory buffer controllers according to one embodiment.

FIG. 7 shows a single Root, including two memory buffer controllers, two Memory Master Controllers, sixteen branches, and sixteen Leaves with 16 Flash devices per leaf. Each root has a total of 8 TB of Flash for a system total of 32 TB-half of which is available to user applications and half of which is allocated to redundancy and system use. Alternatively, a Root might be connected to a CPU Complex via a PCIe or DDR4 interface. While these interfaces behave somewhat differently, the application software is able to utilize the many leaf chips in a parallel fashion in all cases.

2.2.5 Memory Interconnect and Distribution

The memory interface is connected to an inter-processor data distribution network in which all CPUs have access to all memory. Associated memory may be implemented as a multi-rooted tree composed of branches and leaves as described in detail below. Associated computing resources may be implemented as a shared-memory multiprocessor, which may be of a uniform or non-uniform type.

2.2.5.1 Memory Root

In one embodiment, the root is implemented with FPGAs that provide branch interface control. For example, an FPGA or an ASIC may execute a software stack that supports DDR3 memory accesses, target routing, Reliability Availability Serviceability (RAS) operations and various drivers e.g., a Non-Blocking Parallel Solid State Interface (NBPSI) as described in detail below. These operations may be distributed across many chips and subdivided into local processing steps.

A given root may be one of many instances, which are locally or remotely connected through an interconnect system. A specific interconnection technology may affect some of the functioning of the system, but does not necessarily change the basic architecture or its operation.

In one embodiment, a Memory Master Controller (MMC) and Memory Slave Controller (MSC) devices are implemented with dedicated hardware. A root is an MMC, while a branch is an MSC and a leaf is a solid-state memory device. For example, Altera Stratix V FPGAs may be used for both the MMC and MSC. In this case, each FPGA has 48 serial links operating at 12.8 GB/s, and three links from each MMC go to each of sixteen MSC devices. Each MSC in turn connects to 16 leaves, each a solid-state memory device, for example a 32 GB Single Level Cell (SLC) NAND Flash device. This implementation is described further in the working model of Section 4 (see FIG. 18). Many other implementations, including implementations in which the components and their interconnections are changing in real-time, are possible.

In one embodiment, a memory branch is a component with a number of leaves attached, where each leaf is a flash memory chip. The memory branch executes a software stack, which may include network drivers, RAS, error correction codes (ECC), database engines, data compression engines, encryption engines and solid-state drivers. These components provide a means of performing computational tasks on the data stored in the leaves without moving it to another processing unit.

In an alternative embodiment, a memory branch is a component with a number of further branches organized as a hierarchy of branch layers, and leaves attached where each branch executes the same or a different software stack. In heterogeneous systems, each branch may be aware of its neighbors and cooperate in the implementation of the network drivers, RAS, error correction codes, database engines, data compression engines and solid-state drivers.

2.2.5.4 Memory Leaf

Branches finally end in leaves. Each Leaf is a device that acts to read and write data pages into a physical memory device, such as a non-volatile store. The leaf may be implemented in many forms using any technically feasible memory technology. The Memory Management System controls the use of the leave's pages (see 2.2.2). Leaves may be implemented in various technologies but they must have the property that a data page that has been written can also be read. Leaves do not need to be homogeneous or heterogeneous as to either device type or operating parameters.

2.2.6 Reliability, Availability and Serviceability

2.2.6.1 Redundancy System

In some embodiments, a multi-layer architecture that overlays the root-branch-leaf structure and includes varied techniques for encoding and decoding as described below.

2.2.6.2 Replication and Disaster Recovery System

In some embodiments, memory leaves have port access to mirrored memory spaces in a redundant system.

2.2.6.3 Graceful Overprovisioning System

In one embodiment, approximately half of the memory system stores data and another half of the memory space supports rapid data access. In another, a fraction of the physical memory is reserved in order to provide adequate performance. In a further embodiment, the memory distributes data across individual leaves using specially designed methods that minimize inefficiencies. In another embodiment, the memory components themselves may be composed of individual components that together produce the desired behavior.

2.2.6.4 Data Protection and Error Correction System

In a further embodiment, a segmented system with isolated domains that remain operative in the event of the failure of individual domains. These components are interdependent. In order for the whole system to function efficiently, the interconnected components depend on each other for correct functioning and timely completion of each other's work.

3 Description of the Component Inventions

This invention is a computing system composed of several inter-related parts that may have different implementations yielding mechanisms with different uses.

3.1 Basic Data Movement Related Inventions

3.1.1 Mechanism to Slowly Onboard Data from One Persistent Store to Another.

In one embodiment a virtual memory system is used to keep track of two sources of data from which a new file may be written. If an application program accesses a portion of an original file that the new file has not copied yet, this mechanism makes a copy on use (access). This way, large original files can be slowly migrated as new files without requiring large, slow copy operations. An advanced topic includes leaving both an original file and new instance of the file in place on reads, and just making a copy of the original file in response to high usage or in response to writes. This technique should implement a detection and recovery algorithm for when the files change enough or at a sufficiently rapid rate as to disallow continuation of this mechanism.

3.1.2 Mechanism to Use a Device as a Backing Store.

In one embodiment a mechanism is implemented to allocate a buffer using a memory device as a backing store, having a file the application wants to read on the same memory device and using Copy On Write (COW) for reads from the real file into space associated with the allocated buffer, instead of making a copy at read time. In a preferred implementation, a virtual memory system is configured to can keep track of two backing files depending on whether the data from the original file has only been read or has been modified.

3.1.3 More Efficient Use of Flash Space.

The key ideas here are: 1. To fit three 6 k protected (4.5 k unprotected) pages into two 9 k pages available in the flash device, and 2. To select a protection code that keeps the protected data at or under ⅔ of the physical flash page size.

3.1.4 Mechanism to Almost Synchronize a Spare.

Almost synchronize means bounding the differences between an original and a spare. In one embodiment, a large FPGA on a slave board is configured to include a fast network interface and a switch. The slave board is coupled into a memory complex (e.g., memory complex 160), connecting it to another memory complex that receives the replicated data. We put a network connection on the same board as memory, in order to facilitate replicating data as it is written, to create a live spare or close-to-live remote spare.

3.1.5 Mechanism for Detecting and Correcting Lost Messages

3.1.5.1 Background

In order to maintain computational correctness, dropped packets need to be tolerated because these packets are often sent over unreliable links. These packets may contain memory access requests and responses. To detect a dropped packet, we match responses (CQ entries) with requests (EQ entries and Ops) using a small transaction ID that is copied from the EQ entry to the CQ entry. To save processing overhead, the transaction ID is used as an index into an array of Ops (in-process transactions). Read Ops are idempotent (can be repeated without negative side effects) and ordering between an execution queue and a flash unit or between a flash unit and a completion queue is always maintained for a given operation type (e.g. for reads).

3.1.5.2 Problems

1) A request packet can be dropped (or the data packet as part of the request can be dropped, but this only applies to writes).

2) A response packet can be dropped.

3) A software timer could be set to a time-out value that is too short such that the response packet arrives, but after the software timer routine has reacted in some way to a time-out scenario. Reacting could be completing a user read before the DMA has completed, resulting in data corruption if the physical memory has been reassigned to another use, unnecessary reissuing of an op (possibly issuing a "flood" of these), or reusing the Operation structure and mistaking the completion of one operation for another.

4) If the time-out is too long, then the variance of the latency can be very high (several orders of magnitude) due to dropped packets, resulting in the "straggler problem" for apps that don't consider a batch of I/O operations complete until all in the batch are complete.

3.1.5.3 Solution

The solution relies on the lack of reordering between EO, flash unit and CO, the idempotent-ness of reads, and the ability to identify the last retry CO entry of a retried Op. One embodiment of the solution includes the following techniques:

1) Reduce read retry timeouts to the average expected queuing plus service time plus 3 standard deviations (as measured with no timeouts). That is, set the timeouts a little above what an expected time would probably be plus additional margin (e.g. slack), assuming the packets are not dropped.

2) Mark each read operation with a transaction ID that combines an index into the Ops table with a retry count.

3) Do not consider the Operation completed until the currently processed CO entry's retry count transaction ID sub field matches the retry count in the Op structure. This includes not releasing any DMA targets or releasing Op structures for use by unrelated operations.

4) The final retry will have a long timeout such that it can be safely assumed that this CO entry or any previously associated with this Op will never come in. When this time expires it is safe to complete the operation with a failure code and free DMA targets and allow the Op structure to be re-used for an unrelated transaction.

5) Before recovering from a potential timeout in a way that violates ordering, such as doing a series of reads for a RAID reconstruction, which could cause the Op to complete before the original single target read has had a chance to timeout, the previously mentioned (point 4 immediately above) max timeout must be waited for. This applies if early retries timed out, but one attempt resulted in an uncorrectable error (or otherwise caused us to react before the "long timeout").

Figure 8:
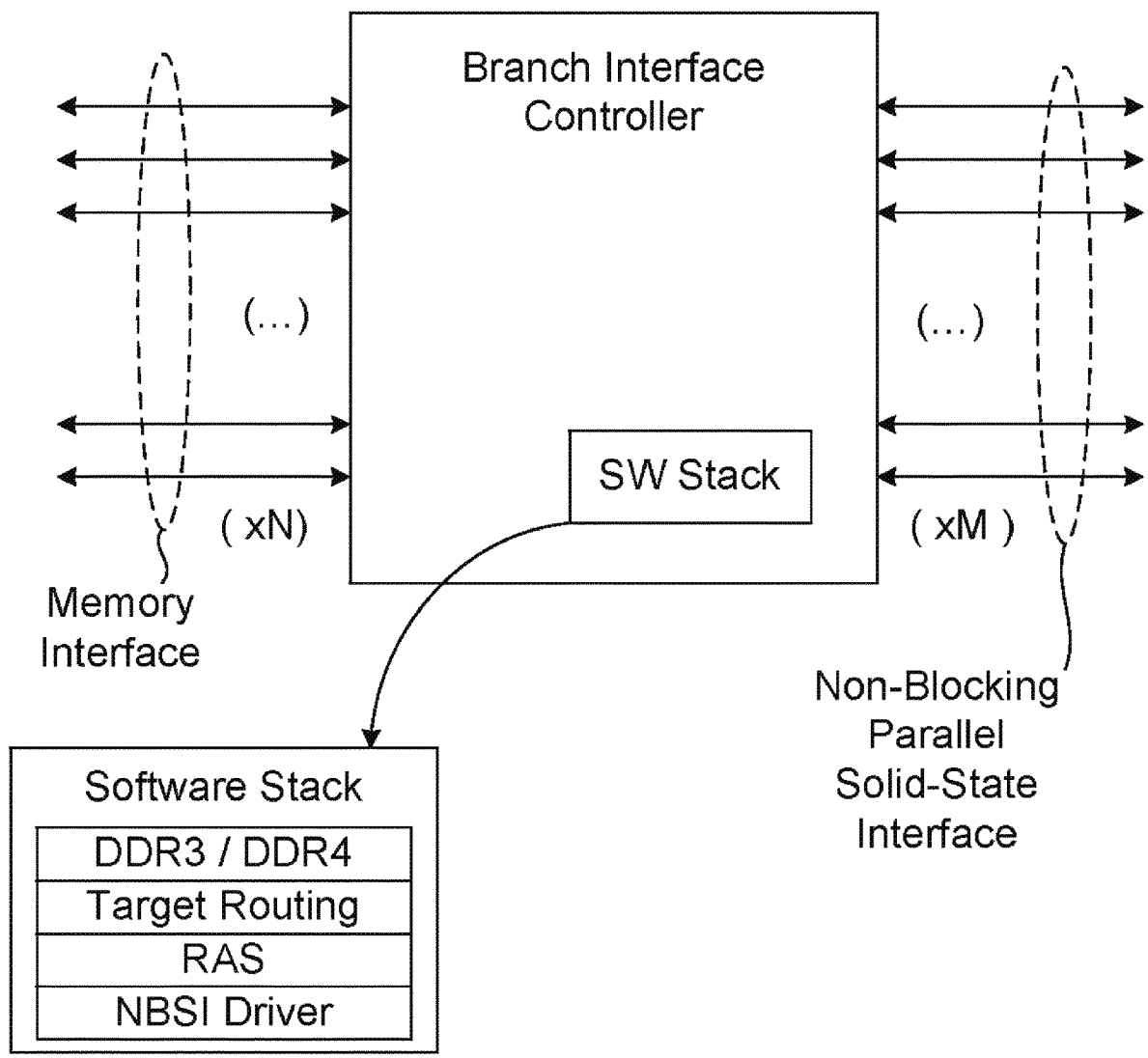
FIG. 8 shows a memory root component firmware stack according to one embodiment.
Figure 9:
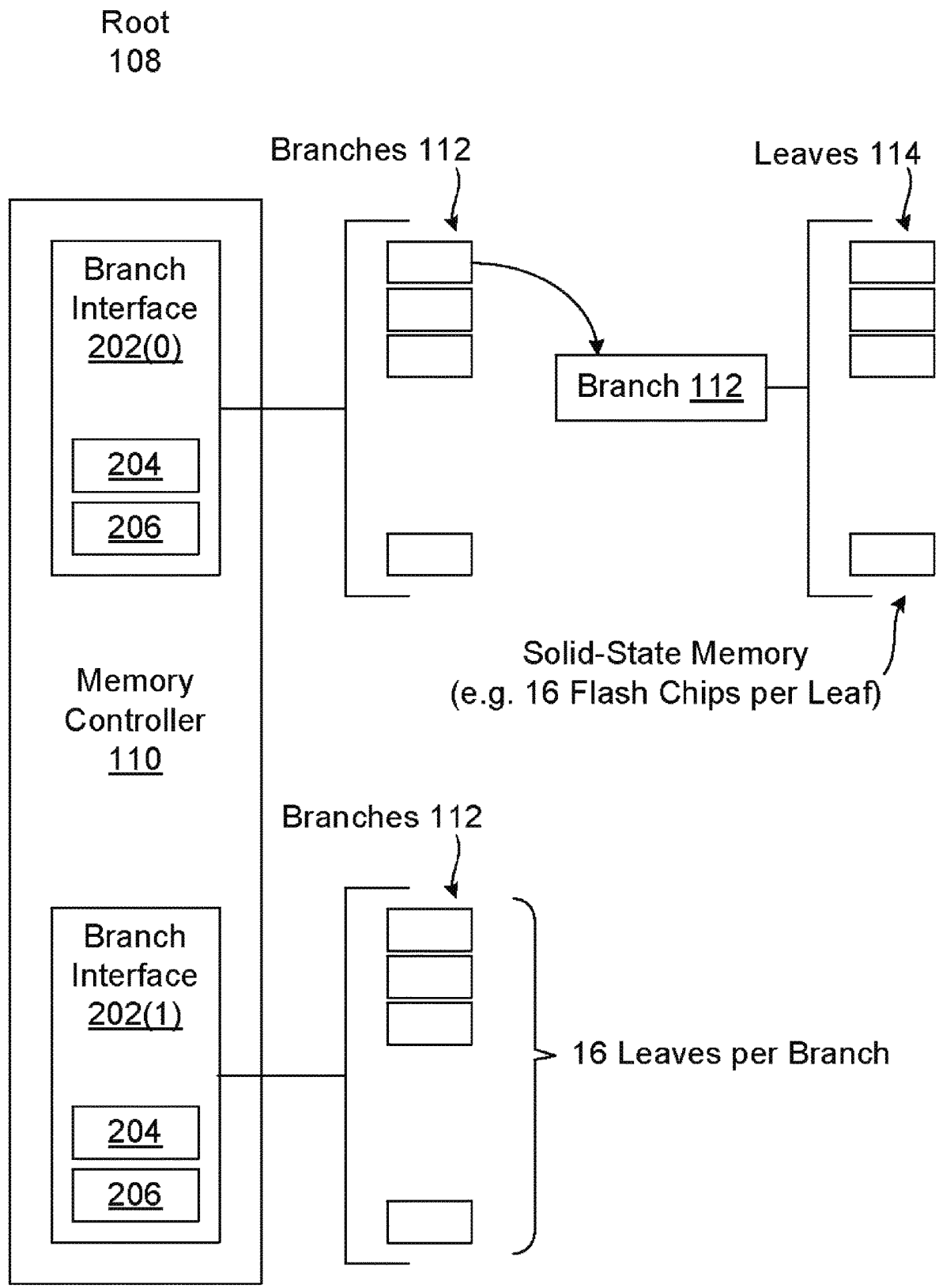
FIG. 9 shows root and leaf hardware according to one embodiment.
Figure 10:
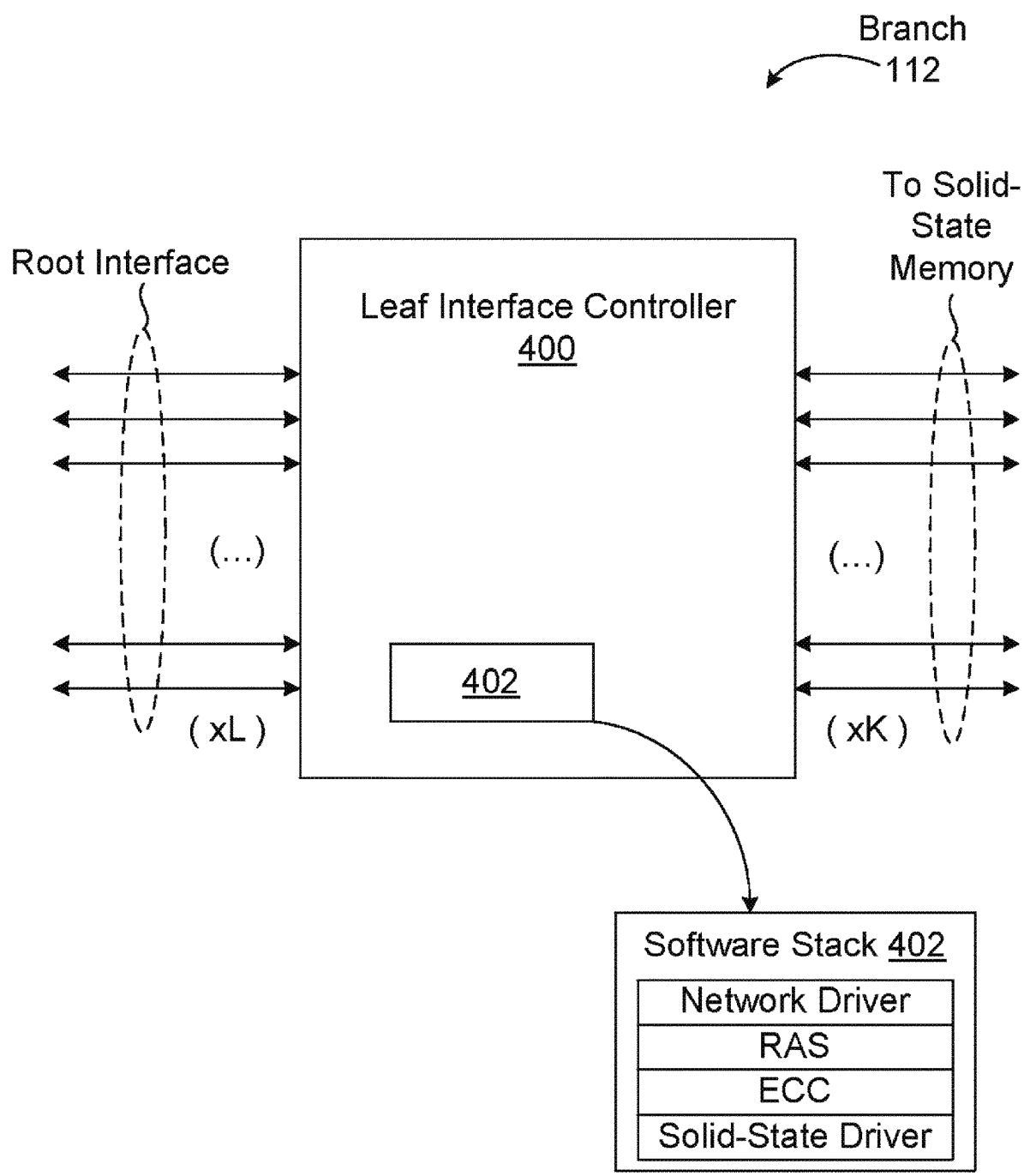
FIG. 10 shows memory branch components according to one embodiment.
Figure 11:
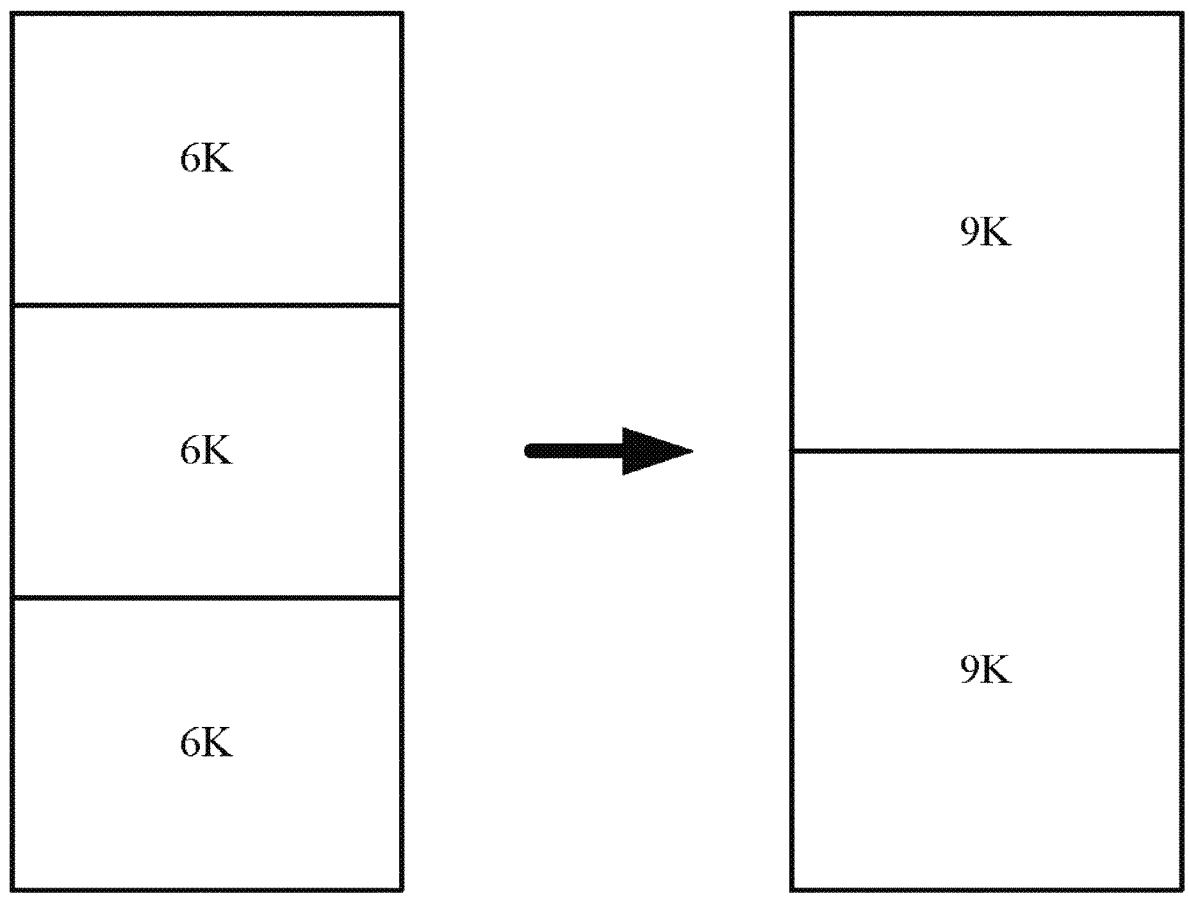
FIG. 11 shows efficient storage packing for flash storage according to one embodiment.

FIG. 8 shows a memory root component firmware stack according to one embodiment. FIG. 9 shows root and leaf hardware according to one embodiment. FIG. 10 shows memory branch components according to one embodiment. FIG. 11 shows efficient storage packing for flash storage according to one embodiment.

3.1.5.4 Conclusion

This will enable most retries to be performed with very aggressive timeouts (10s of ms), a final timeout that prevents data corruption and doesn't require hardware or FPGA changes.

3.2 Parallel Execution Related Inventions 3.2.1 Mechanism for Lockless Multi-Producer/Single Consumer History Based, Consistent, Approximate Accumulator.

Figure 12:
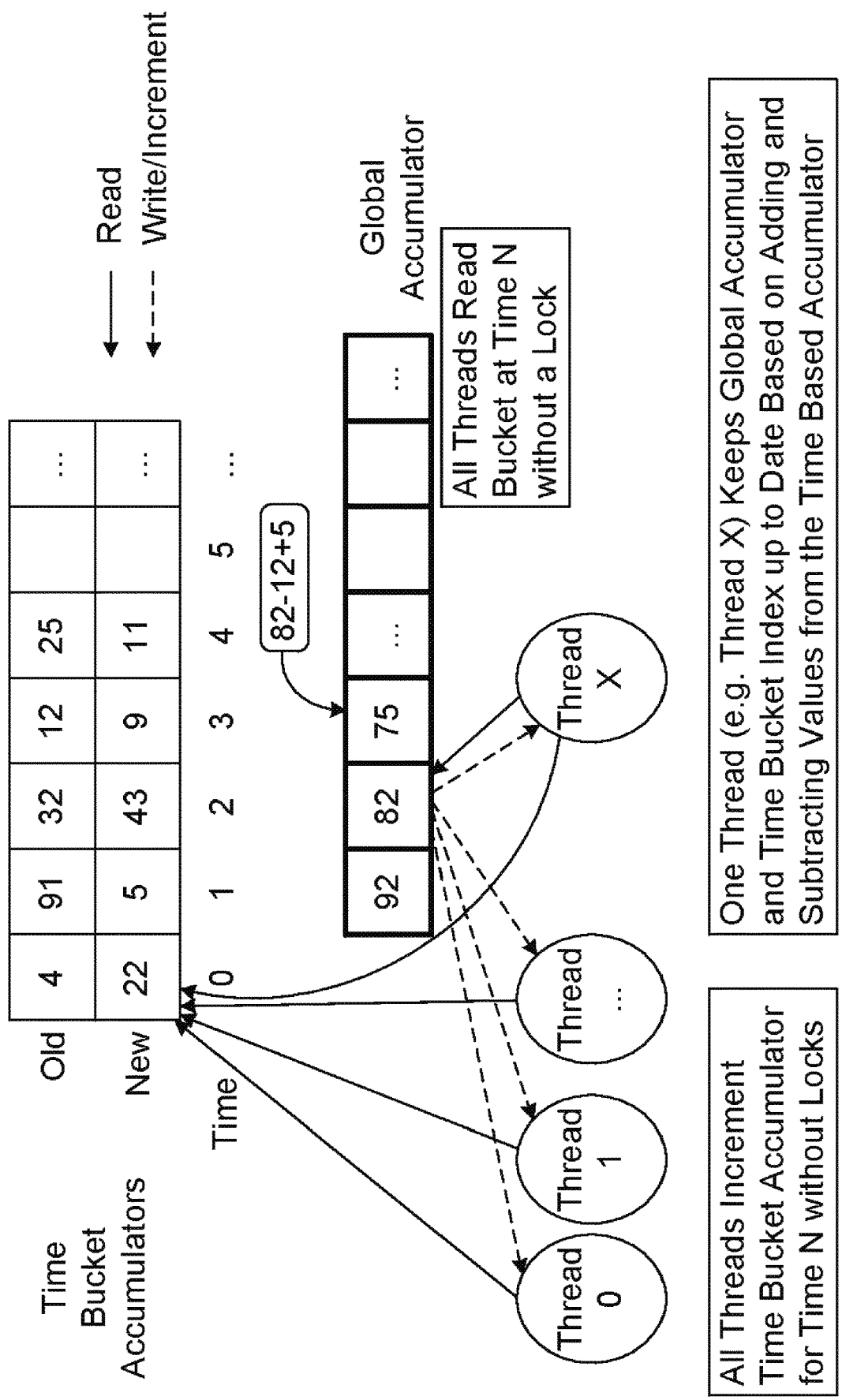
FIG. 12 illustrates an approximate accumulator configured to accumulate access statistics, in accordance with one embodiment.

FIG. 12 illustrates an approximate accumulator configured to accumulate access statistics, in accordance with one embodiment. As shown, a circular queue of accumulators where each bucket in the queue represents a time period. When in that time period, producers increment the associated accumulator and conflicts are ignored (that is why it is approximate). At time period+2, the consumer adds the accumulator at the original time-period to the consumer's global accumulator (time period+2 is chosen to avoid conflicts).

At a subsequent new time period, the new time-period's accumulator is subtracted from the global accumulator and the new time period is set to O. The consumer maintains a current time-period pointer and updates it atomically.

In this embodiment, the producer is also a consumer. An example of the usage of this accumulator is, for example, determining an approximate number of Reads in an 10 system over the prior 10 ms, where multiple threads (or processes or cores) are performing reads independently. This allows the threads to contribute to the global accumulator without using a lock. The time bucket accumulator is approximate but since a single thread uses it to update the global accumulator, the global accumulator is consistent and lock free.

3.2.2 Mechanism to Use Multi-Cast to Both Store a Data Page on a Local Device and Replicate it to a Remote Device.

Most replication techniques have the CPU send a page to a local storage and then replicate it to some remote place. This invention defines a mechanism to do so simultaneously by use Ethernet as the transport to both the local and remote device.

3.2.3 Adding Time to Error Rate to Determine Effective Wear of a Block

Embodiments of this invention measure read error-rates instead of program-erase cycles to estimate expected remaining lifetime of a block. Elapsed time (wall-clock time) may be incorporated into the expected remaining lifetime since programmed as an input into the remaining lifetime calculation. Furthermore, device die temperature during retention may be incorporated into the lifetime equation. A relationship between at least elapsed time, die temperature, and current error rate may be used to estimate expected lifetime of each block in a memory system. This relationship estimates expected lifetime of the block. The expected lifetime may then be uses to make wear decisions (e.g., mark the block bad, prefer it for future writes, place cold data on it, etc.). The reason to use elapsed time is that the error rate immediately after programming doesn't vary significantly. However, the ability of the block to retain data over extended time spans may degrade with increased wear more than the ability to retain the data short term. Hence, current retention time may be used an input along with current temperature.

3.2.4 Limiting LUNS for Writes to Reduce Read/Write Conflicts

Embodiments of this invention assume over-provisioned interconnect write bandwidth compared to the amount needed to drive (e.g. 40 GB) out to a flash memory. Reducing the number of system-wide LUNS associated with outstanding writes (for the app or for migration), or erases at one time may reduce read and/or write conflicts. In one exemplary embodiment, only half or two-thirds of system-wide LUNS may be scheduled for write operations at any one time, meaning the remaining LUNSs would not have read/write conflicts. Because pending and scheduled reads are distributed over all system-wide LUNs, the probably of read-write conflicts may be reduced by 50% without compromising write bandwidth. Scheduling which LUNs are available to be written may be implemented using a round robin scheduler in which LUNS are in read only-mode at least, for example, half the time as a forcing function of write distribution and wear leveling. No writes need to be restricted per say; however, rather than writing upon demand as would be the case in a conventional system, the writes are instead scheduled according to specific LUN availability. Pre-erase read operations may be scheduled along with other read operations, such as application read operations.

3.2.5 Mechanism to Create and Use Reliable I/O Transactions Journals

In a system that stores journals in a device that is a single point of failure, this invention implements duplication of the journals across multiple decay-sets and includes mechanisms that free the resources in both locations when appropriate. In another embodiment, multiple copies of the journals are distributed across multiple decay sets. The invention further provides a mechanism to use the journals upon system failure or system failure coupled with a device failure where the use could insure against loss of data or loss of data consistency. In another embodiment the journals could be erasure coded and distributed into multiple decay-sets.

3.3 Paging Related Inventions 3.3.1 Mechanism for Compacting Virtualized Page Table while Maintaining Temporal Page Distribution In some embodiments of this invention data stored in solid-state memory (for example flash) moves independent of the file system. Consequently, a page virtualization table may be used to move the data (stored in pages) while leaving the file system meta-data unchanged. In a large system, this table is often huge (e.g. 6 tb for a 64 bit page virtualization table in a system with 3 PBs of capacity). In order to reduce the table size, table entries are "shared." In a first entry a 64 bit quantity is stored and in subsequent "shared" entries 16 bit offsets are stored. In one embodiment with shared entries for 16 pages, the table can be a third of the unshared size and so on. The pages must be close enough to use the small (16 bit) offsets, there must not be contention for the data structures, and the data must be temporally distributed so it can be read in parallel. In one embodiment one core of a CPU has exclusive access to a subset of page table entries, and that subset is non-contiguous (table entries) so that subsequent accesses will still be distributed across the cores.

3.4 Scale-Out Related Inventions

Figure 13:
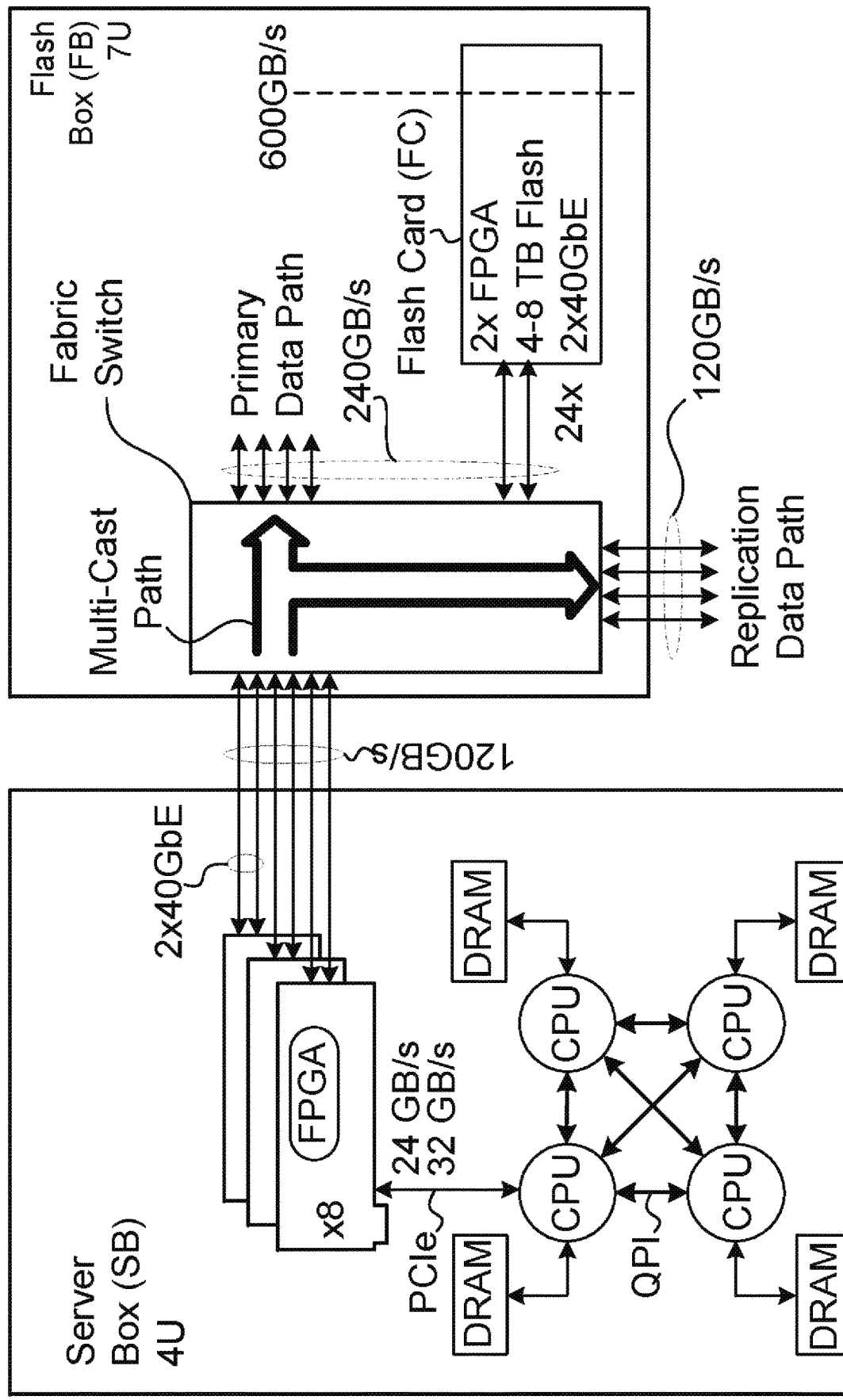
FIG. 13 shows a multi-cast path for local and remote data storage according to one embodiment.

Embodiments of the present invention enable efficient architectural scale-out of both the computational capacity and the corresponding memory capacity. One form of scale-out involves adding CPU subsystems 152 configured as independent computation-server boxes. The shared memory fabric 116 of FIG. 5 and FIG. 6 maintains cache coherence among different CPUs 100 that reside within the independent servers. In some embodiments the memory fabric transports cache coherence messages. In other embodiments the access to particular leaves is restricted to particular servers. FIG. 13 shows a multi-cast path for local and remote data storage according to one embodiment.

Figure 14:
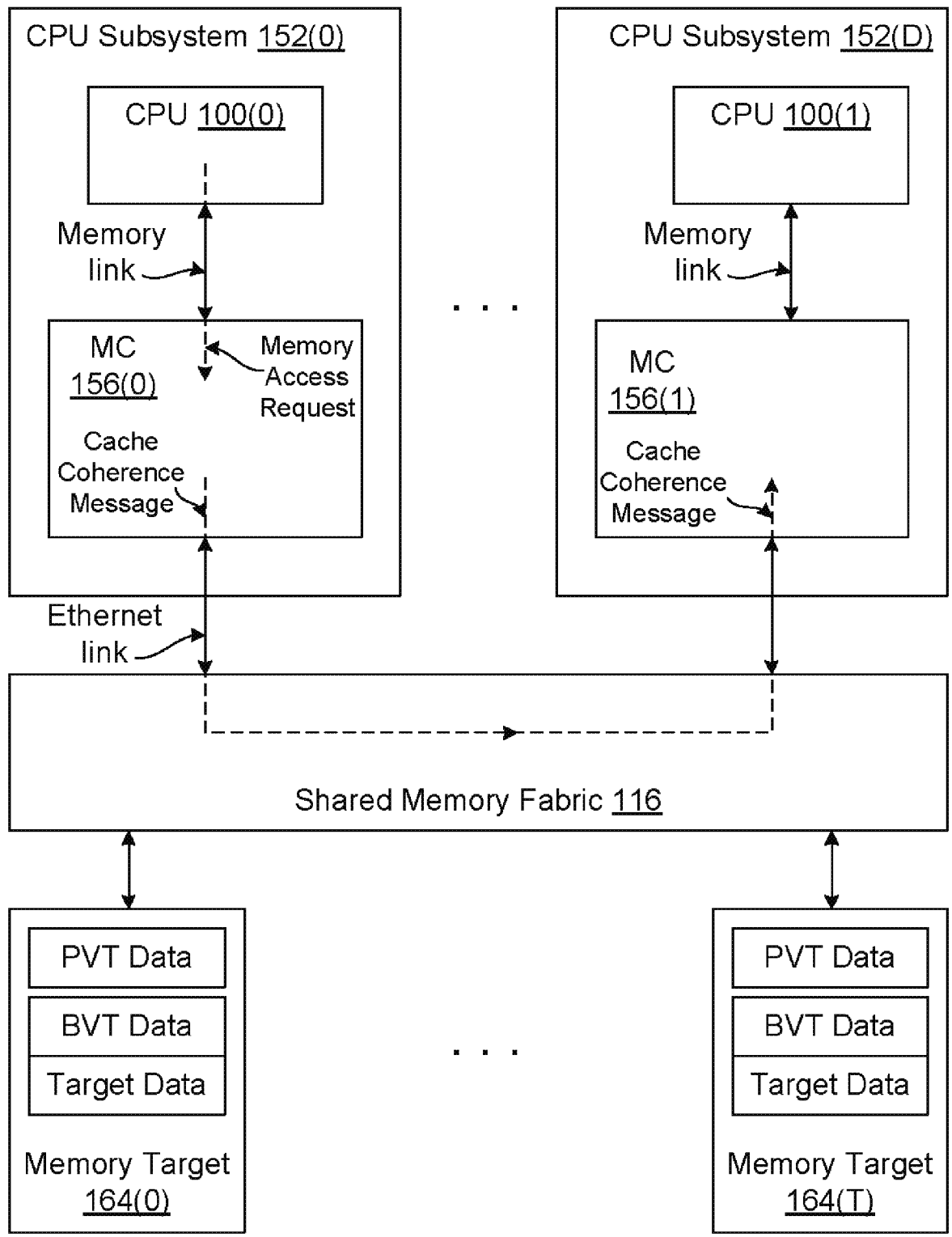
FIG. 14, illustrates an exemplary cache coherence message being generated and transmitted through shared memory fabric according to one embodiment.

FIG. 14, illustrates an exemplary cache coherence message being generated and transmitted through shared memory fabric 116. In this example, CPU 100(0) of CPU subsystem 152(0) generates a memory access request (e.g. a write request) to a page of data currently cached by CPU 100(1) residing within CPU subsystem 152(D}. In such a scenario, a cache coherence message may be transmitted from MC 156(0) of CPU subsystem 152(0) to MC 156(1) of CPU subsystem 152{D). In one scenario, CPU 100(1) then receives a cache flush request from MC 156(1).

As shown, page virtualization table (PVT) data, block virtualization table (BVT) data, and target data may reside within a memory target 164. PVT and/or BVT data may need to be managed within a cache coherence regime and may further need to be queried in conjunction with overall cache management.

Figure 15:
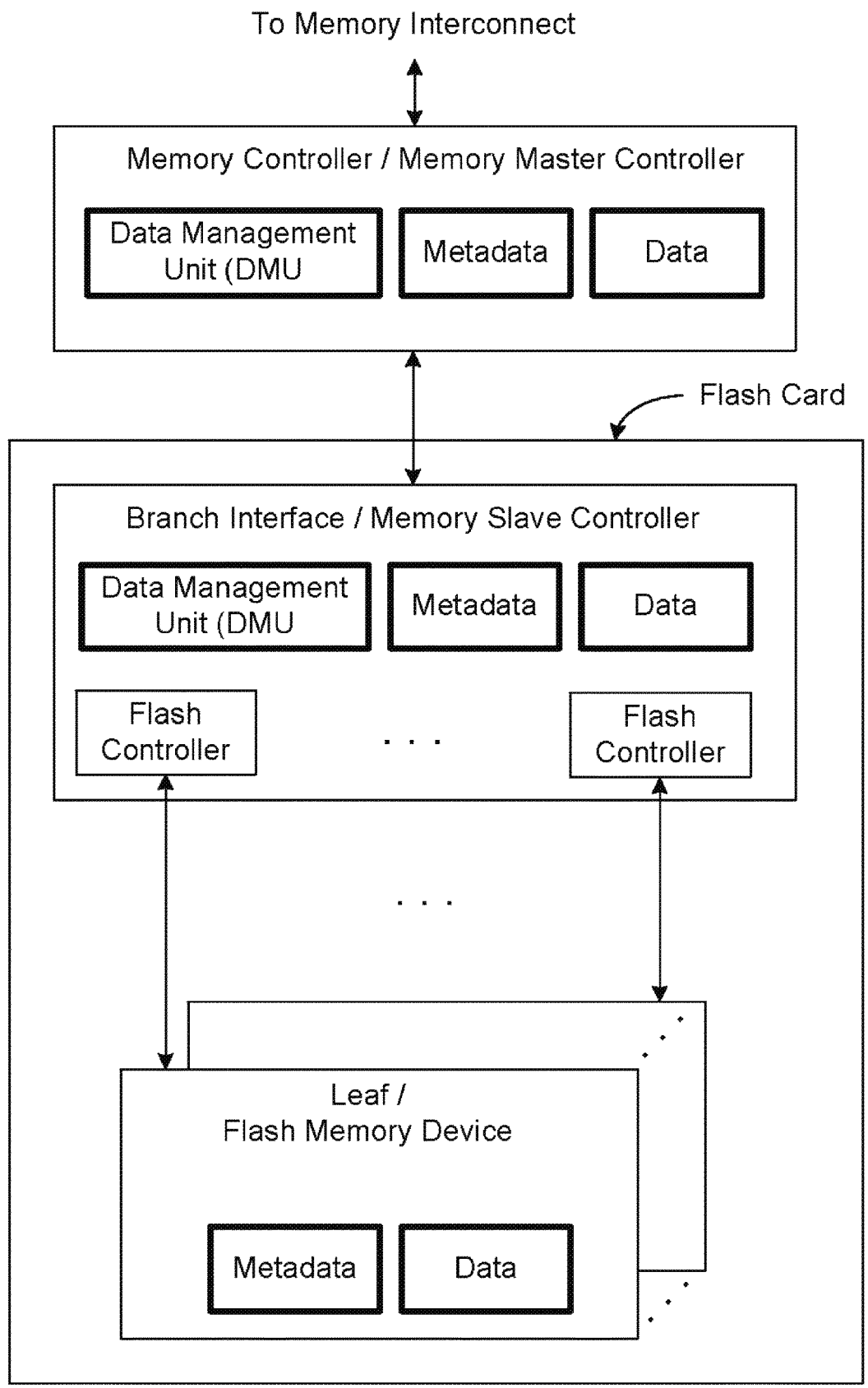
FIG. 15 illustrates a data management unit (DMU) disposed conceptually within a memory hierarchy such as a root memory hierarchy comprising a memory master controller according to one embodiment.

FIG. 15 illustrates a data management unit (DMU) disposed conceptually within a memory hierarchy such as a root memory hierarchy comprising a memory master controller (MMC or simply "memory controller"), and a memory slave controller {MSC or ({branch interface"). In one embodiment, the MSC is implemented as an FPGA, and the FPGA may have sufficient memory resources to store cache coherence data and metadata. In another embodiment, the MSC FPGA may include an external memory resource such as an external DRAM or SRAM, configured to store at least the cache coherence data and metadata. In yet another embodiment, the MSC is implemented as an FPGA with either internal memory resources or external memory resources (DRAM and/or SRAM) configured to store at least the cache coherence data and metadata. In still yet another embodiment, the cache coherence data and metadata are stored within one or more flash memory devices. In other embodiments, the cache coherence data and metadata may be stored in a combination of the above memory resources. See 3.4.3 for a discussion of the DMU.

In one embodiment, the DMU is implemented using an application-specific logic circuit. In other embodiments, the DMU is implemented as a combination of non-volatile, computer-readable microcode and an embedded processing engine, the microcode being configured to direct an embedded processing engine to perform the functions of the DMU. In alternative embodiments, the DMU may be implemented in data network components, for example data network components linking the MMC and the MSC.

3.4.1 Partitioned Memory Access

As larger and larger datasets must be handled, more and more memory capacity may be required. A mechanism for increasing the memory capacity by utilizing many interconnected memory fabrics, connected either through the processor interconnect (e.g. a Quick Path Interface (QPI), a memory interface (e.g. DDR3 or DDR4) or a high speed peripheral interconnect (e.g. PCIe or RapidIO) is required. This mechanism allows parallel access to the memory fabric through individual memory controllers connected to the appropriate interfaces in the distributed computing nodes. With a sufficient number of nodes the memory capacity can be suitably adjusted.

3.4.2 Partitioned Memory for Multi-Node Clusters

As larger and larger datasets must be handled, more and more processing power may be required. A mechanism for increasing the available computing power by utilizing many individual computing nodes connected either through the processor interconnect (e.g. a Quick Path Interface (QPI), a memory interface (e.g. DDR3 or DDR4) or a high speed peripheral interconnect (e.g. PCIe or RapidIO) is required. This mechanism allows parallel access to the memory fabric through individual memory controllers connected to the appropriate interfaces in the distributed computing nodes. With a sufficient number of computing nodes the computing power can be suitably adjusted.

3.4.3 Consistent Memory Access by Multiple Nodes

One embodiment implements a mechanism that provides a consistent memory model for multiple computing nodes that share data, in order to provide parallel processing to the shared data. This mechanism provides a consistent memory model to each node and can be implemented either at the memory controller, using the memory fabric interconnect, or in the memory fabric itself. A consistent memory model insures each computing unit that accesses the data in the memory "sees" data that was (or is) valid at the time of access. This guarantee exists because all cached data, by which we main a memory content which may be maintained in multiple locations simultaneously, is maintained in a coherent manner. In the case of multiple memory controllers attached to multiple computing nodes, copies of the same memory contents stored in multiple memory controllers or on multiple memory chips must be synchronized.

In one embodiment, the memory controller contains a cache management unit (CMU) that receives data from the leaves attached to branches. The leaves all contain a data management unit (DMU). The DMU maintains a coherent mapping of the page and block addresses of the data in the leaf. Access to the data is recorded in a directory of memory controller cache units that may modify the data. If a memory controller attempts a modification, the cached copy of the data in other memory controllers is invalidated by the leaf DMU. (see FIG. 15)

3.4.4 Consistent Metadata Access by Multiple Nodes

One embodiment implements a mechanism to provide for multiple computing nodes that share metadata, in order to provide parallel processing of the underlying shared data. Embodiments may separate the management of the data coherence from the management of the metadata coherence. This mechanism provides a consistent metadata management model to each node and can be implemented either at the memory controller, using the memory fabric interconnect, or in the memory fabric itself. A consistent metadata management model insures metadata management operations (e.g. free space recovery, error correcting code generation and decoding, etc.) that access the metadata describing the data in the memory, all access metadata that was (or is) valid at the time of access. This guarantee exists because all cached metadata, by which we mean metadata that may be maintained in multiple locations simultaneously, is maintained in a coherent manner. In the case of multiple memory controllers attached to multiple computing nodes, copies of the same metadata stored in multiple memory controllers or on multiple memory chips must be synchronized.

The management of solid-state memory devices, as described in Petabyte-Scale data processing system. April 2014, application No. 61/949,190, implements mechanisms for the remapping of memory addresses onto the underlying chips so that failed chips may be replaced or bypassed, among other eventualities. The original mapping, in the above referenced system, is accomplished by maintaining the metadata in a Page Virtualization Table (PVT). Portions of the metadata describing the mappings of the data on a particular leafs memory chip (or chips) may be divided among the memory controllers such that a particular memory controller maintains the metadata for a subset of the entire system, and all the memory controllers, taken as a group, contain the required metadata for all the chips. The division of the metadata is done in a way that enables the distribution of data on memory leaves in a way that allows for the subsequent parallel access of the data. (See Section entitled "Data Location Virtualization in Flash Devices" in Petabyte-Scale data processing system.)

3.4.5 a Massively Parallel Database Analysis and Visualization Appliance

This invention extends the mechanism for data processing to include specialized processors, for example graphics processing units (GPUs) or general-purpose graphics processing units GPGPUs). This mechanism makes possible applications that process very large amounts of data in real time or near real time and provide visual rendering of the results. The mechanism can have several embodiments, including a common cache mechanism accessing coherent data in a shared cache maintained in the memory of a processing node (see FIG. 4) or maintained in the memory of a memory controller (see FIG. 6).

In another embodiment the rendering and database search and select functions are provided on separate main processor connected (PCIe, DDR4, or QPI) graphic processing units that also have connections to the memory fabric network of branches. In a specific embodiment, CPUs comprising 60 total CPU cores may be implemented within a computational resource such as a CPU subsystem 150 or 152 of FIG. 4 or FIG. 6. Furthermore, one or more GPU devices 190 may be implemented within each CPU subsystem 150 or 152. An appropriate number of GPU devices may be selected to balance relative computational throughput between the CPUs and the GPUs.

In a further embodiment, the graphic processing units are on leaves or leaf controller cards and share cached data through the memory fabric with other data access management units (see 3.4.4).

4 Working Model

Figure 17:
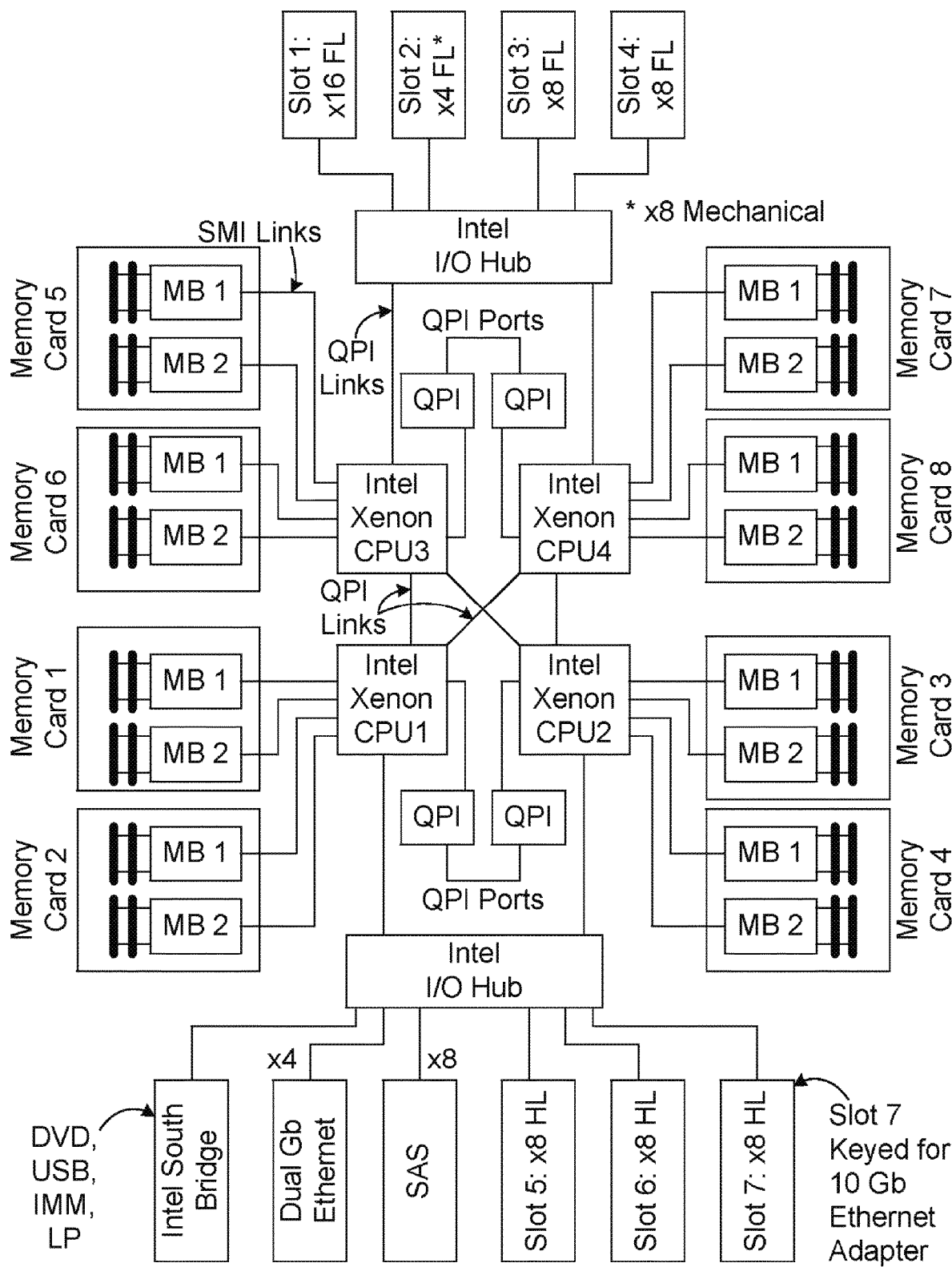
FIG. 17 shows a working model according to one embodiment of the invention.

A working model of the invention presents one possible embodiment. As indicated above, there are many other embodiments that may be created using varied implementations of the components, but the embodiment of the invention described here has been built. The hardware and software components are depicted in FIG. 17. As previously described in FIG. 1, these components have a multi-rooted tree structure. While certain working model components and features are disclosed herein, it should be noted that other working models have been constructed in accordance with certain embodiments. For example, while certain components and component configurations may be recited in conjunction with specific descriptions, this does not limit the scope or configuration of other and further working models.

4.1 System Architecture

In one embodiment a multi-core, multi-processor, server class, hardware platform is used to implement a CPU subsystem associated with the invention. As shown, the CPU subsystem is implemented within the server box (SB), packaged to mount within a 4 rack-unit (4 U) chassis. A memory complex is implemented within a flash box (FB), packaged to mount within a 7 U chassis.

Simple variations of this architecture utilize different numbers of Flash Cards (FCs). These variations have different capacities and potential bandwidths. With the above general architecture, capacities between 64 TB and 64 PB may be implemented using existing memory devices and interconnect link technologies. This is a very wide range and has many consequences, as will be seen below.

4.2 Hardware Components

Figure 16:
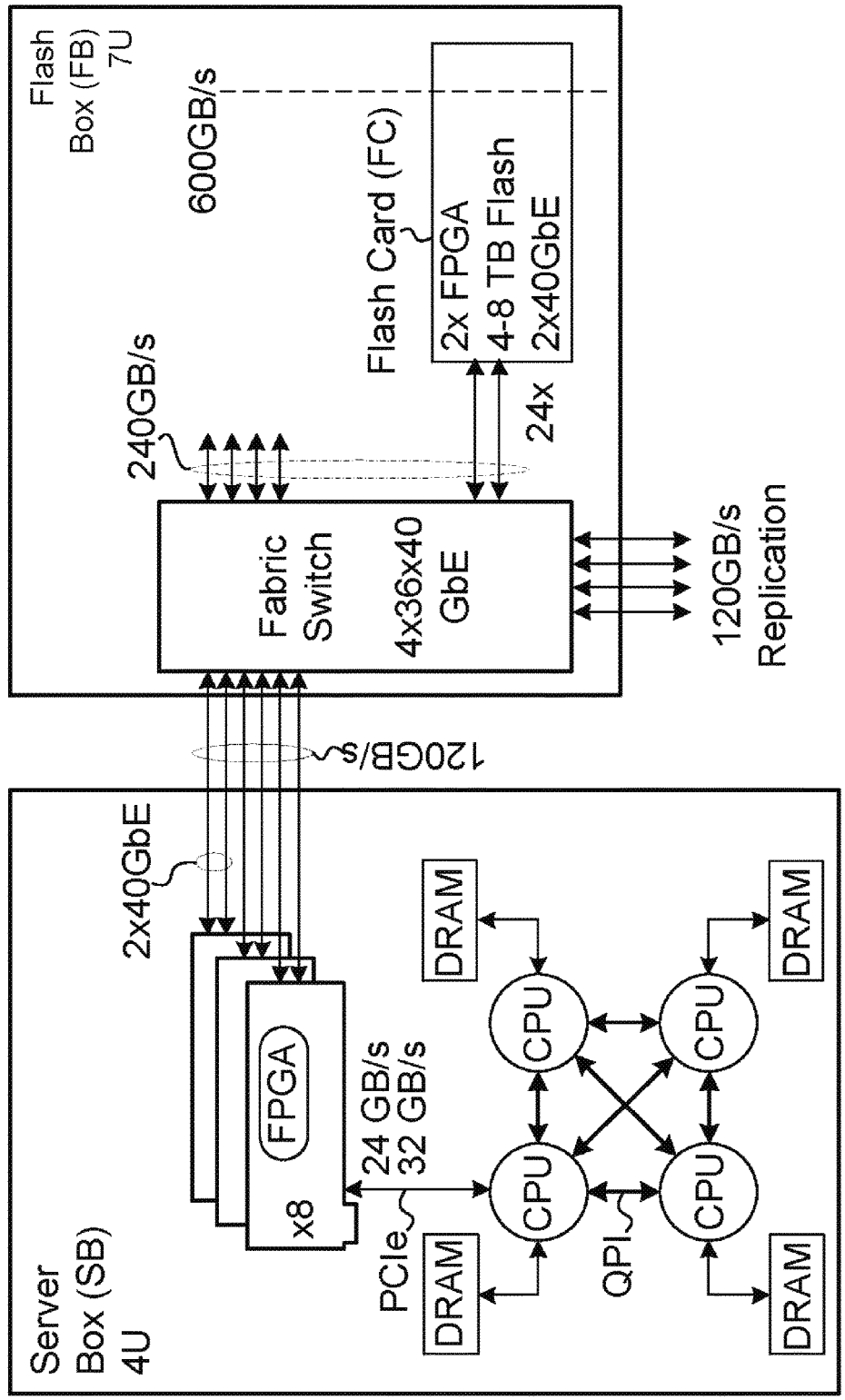
FIG. 16 shows system architecture according to one embodiment.

In one working model embodiment, a Hewlett-Packard DL580 server (based on the Intel Ivy Bridge-EX platform) provides a host CPU subsystem configured to execute a Linux operating system and incorporating Systems operating system and driver software modules supporting operation and management of the aforementioned roots and leaves. The working model contains 32 Dual-inline Memory Modules (DIMMs) and 8 Memory Controller Modules (roots), collectively containing 4 terabytes of DRAM and 256 terabytes of flash memory. Approximately half the flash memory is available to user applications. This system is representative of multiprocessor systems connected in a Non-Uniform Memory Architecture (NUMA) configuration with high-speed, point-to-point, cache-coherent memory interconnects. FIG. 16 shows system architecture according to one embodiment.

The principal hardware components are:
The System Baseboard
Dual-inline Memory Modules (DIMMs)
Memory Controller Boards
Flash Module Baseboards (Branches)
Memory Module Daughter Cards (Leaves))
Supporting mechanical, thermal and power systems
System Management and Configuration Systems 4.2.1 Hewlett Packard DL580

FIG. 17 shows a multicore, server class platform that may be used to implement a working model embodiment of the invention. In particular, the figure is a block diagram of the Hewlett Packard DL580 system. Based on the Intel's Ivy Bridge-EX platform, it includes four Xeon (Ivy Bridge) CPUs interconnected via Quick Path Interconnect (QPI) links. Each Xeon chip is coupled to two memory controllers, which provide local system memory. Each memory controller runs two Intel SMI (Scalable Memory Interconnect) links in "independent mode" in order to implement a 128-bit wide data path to two independent memory channels (144 bits each including error detection and correction bits). Each SMI link communicates with an Intel Scalable Memory Buffer 2 chip (Jordan Creek) that, in turn, converts SMI requests to double data rate type three (DDR3) synchronous DRAM transactions. There are two DDR3 links on each Scalable Memory Buffer 2 chip. The Xeon processors perform 128-bit operations and are capable of supporting DDR4 links.

4.2.2 Memory Subsystem

FIG. 18 illustrates a working model implementation of a memory subsystem, according to one embodiment. The memory subsystem implements root 108 of FIG. 1A and aspects of memory complex 160 of FIG. 3 and FIG. 5. As shown, the server hosts 6 PCIe based memory controllers (PCIe MC Cards) providing 96 PCIe Gen 3 channels of 1 GB/s each or 96 GB/s of total bandwidth. The memory controllers are connected to 40 GB Ethernet links routed through two Mellanox switches to 24 Flash Cards.

Figure 19:
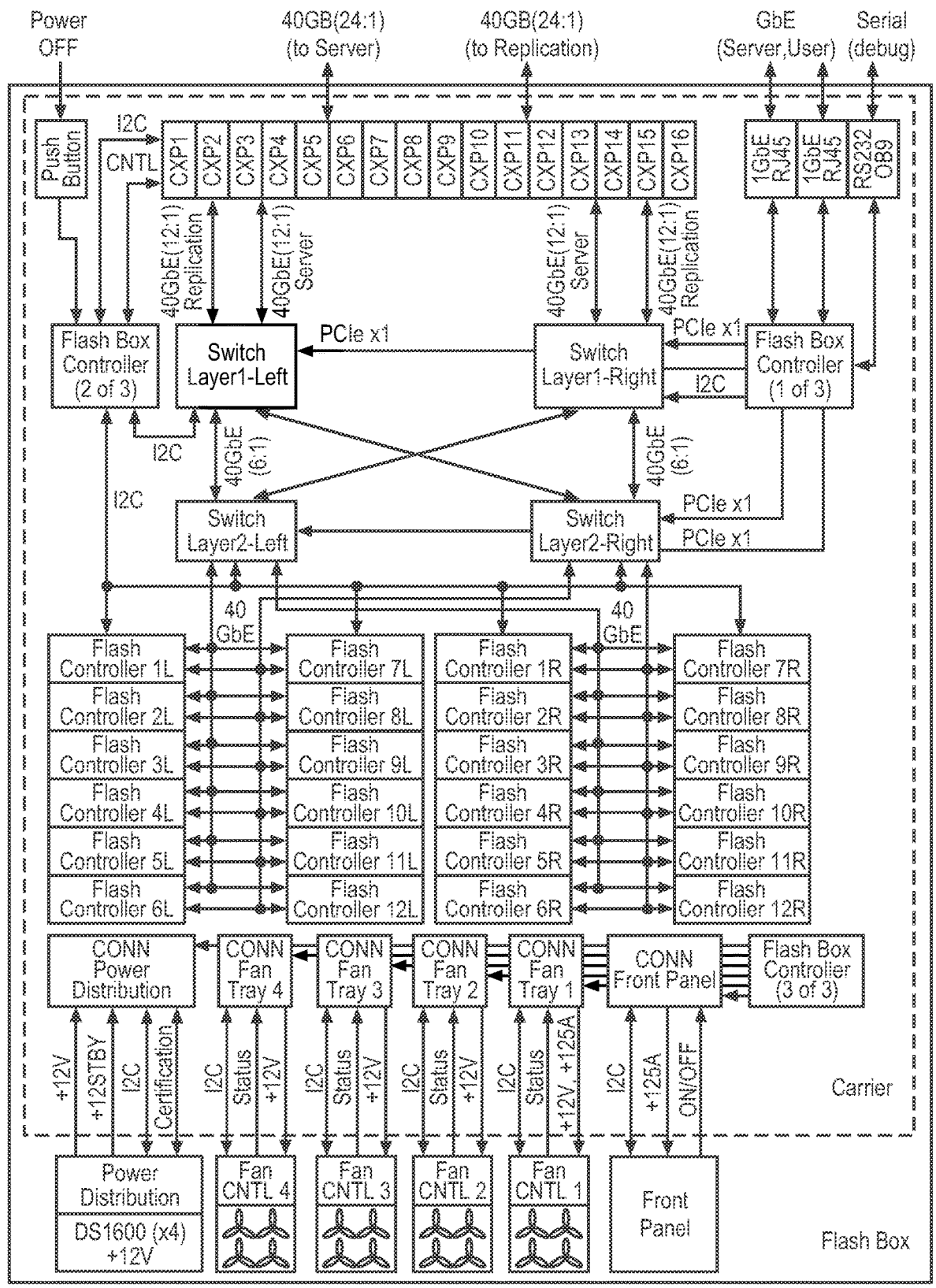
FIG. 19 shows a working model according to another embodiment of the invention.

The memory subsystem distributes data to the sold-state memory, which in this embodiment resides on 24 FC Cards each with 2 FPGAs, 2 40Ge ports and 16 Flash chips. In various embodiments the memory subsystem may support different capacities. Such embodiments might have varying physical configurations and packaging designs, including the configuration and physical partitioning illustrated in conjunction with working model of FIG. 19. In one embodiment, shared memory fabric 116 comprises interconnection components including switch cards, CXP modules, and interconnection link connections. The topology for shared memory fabric 116 is illustrative of certain working model embodiments; however, in other embodiments different interconnection topologies may be implemented without departing the scope and spirit of the present invention.

4.2.3 Memory Controller

The memory controller (i.e. PCIe MC card of FIG. 18) and crossbar form a distributed memory structure designed to transport flash pages between FPGA link interfaces and the Flash Controllers (i.e. FC Cards). The memory controller implements a branch in the system (see 2.2.5.3). Flash pages vary depending on design details of a particular flash memory chip and corresponding product designation.

In one exemplary embodiment described here, a flash page is a 64 KB unit of memory composed of 4 planes of 16 KB pages each. This configuration may be implemented using an off the shelf, standard flash memory device designed to include 4 targets*2 logical unit numbers (LUNs) per device; in other words, each device includes 8 LUNs, comprising 4 Planes per LUN and 16K (plus metadata) pages. Implementing an FC Card with this device provides 256 LUNs per Fe. In such an implementation, each flash memory device implements a multi-chip stacked die package with eight dies (four dies per channel and two channels). Each flash card implements 64 channels (32 channels per FPGA, 2 FPGAs per Fe).

Working model embodiments may implement a 4K byte logical block size or 4K page. Each 4K page of flash may include an additional 64 bytes of associated metadata. In one embodiment, a software unit is a LUN which includes 4 planes×4 logical-pages-per-flash-page×4276 erase blocks× 256 pages. Therefore, overall there are 256 LUNs (2*32*4) per Flash Card and the working model will include 24 flash cards in a fully-populated system.

An erase block is a collection of flash pages that must be erased together. A flash block is thus a multiple of the flash page size (e.g., 256K or 512K) and consequently in the working model embodiment described herein an erase block contains 256 64 KB pages.

4.2.3.1 Architectural Overview

Figure 20:
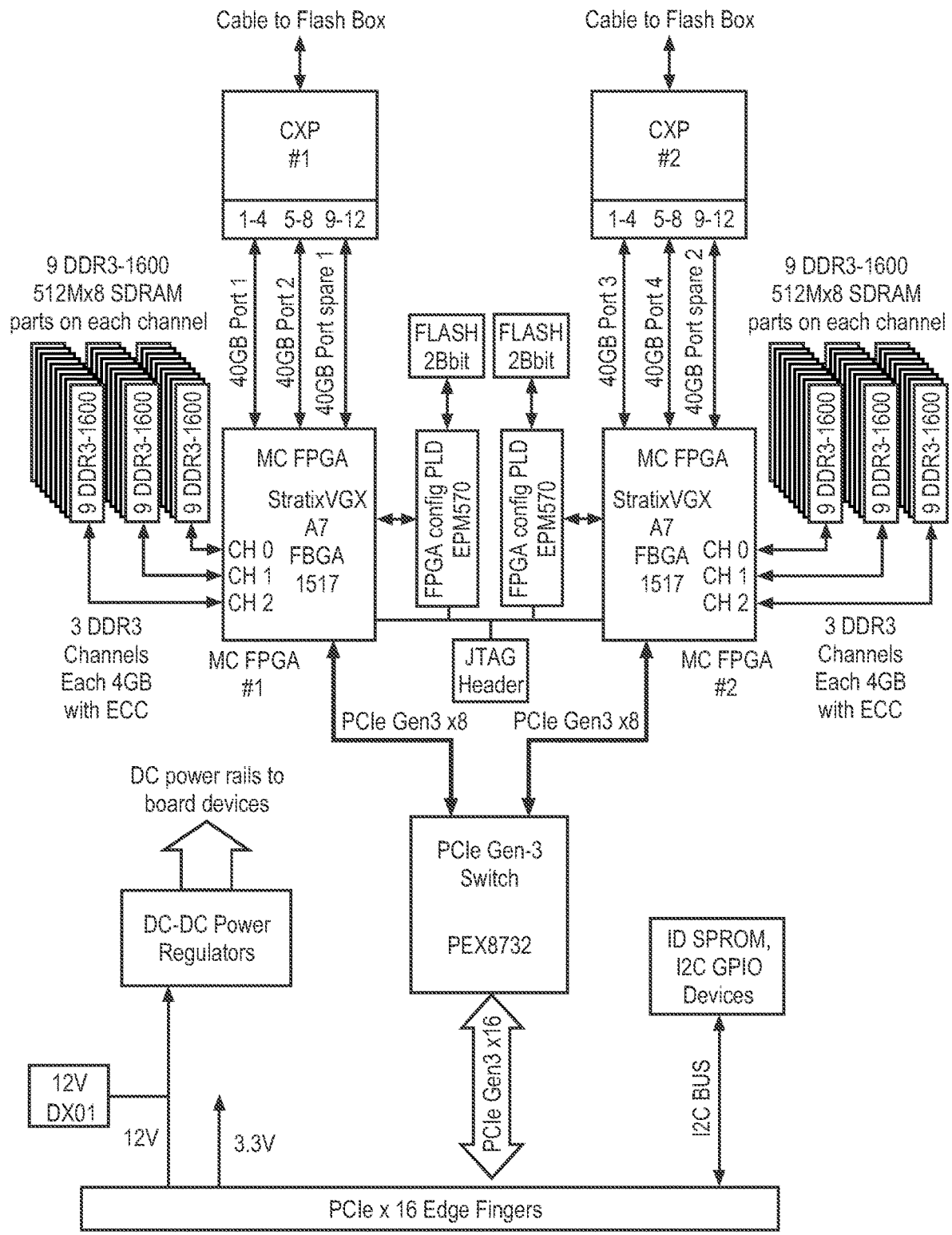
FIG. 20 illustrates an implementation of the memory controller in accordance with one working model embodiment.

FIG. 20 illustrates an implementation of the Memory Controller, in accordance with one working model embodiment. The Memory Controller (see 2.2.5.1) manages control messages between the XEONs (CPUs) and the Flash Controllers (see 2.2.5.4). Furthermore, the Memory Controller buffers flash pages associated with the control messages and access requests by the CPUs. In one embodiment, the Memory Controller implements a single logical connection with variable payload sizes. There may be inbound and outbound pages buffered by a given Memory Controller at any one time.

This distributed memory design illustrated in FIG. 18 lends itself well to implementation using an FPGA or ASIC chip architecture, which may include memory instances distributed throughout the device die. A 128-bit data path from the branch will be carried through the FIFOs (not shown here) and into the "top" interface of the branch FIFOs. In one embodiment, there is a clock domain change between the interface and the branch. This clock domain change is implemented at the "bottom" interface of the branch FIFOs.

PCIe-MC Card is a full-height, full-length PCIe gen-3×16 add in card. This card may be plugged into a server platform, such as the Hewlett Packard DL5S0 (or other vendor) Server. For example, the PCIe-MC Card may be plugged into an available PCIe x16 slot and may be connected to a Flash Box through CXP cables. The following list summarizes features of this card:

1. A PCIe-gen3 switch PEXS732 with one x16 host (Server) and two xS devices (FPGAs), non-blocking, transparent mode has been used to split PCIe x16 port into two xS ports. Hardware strapping will be done to initialize the PEXS732 switch in this configuration without any software involvement.

2. It has two Memory Controller (Me) FPGAs, each FPGA provides two 40GE ports to Mellanox switches on Switch Cards in the Flash Box. Three 40GE ports have been connected from each MC FPGA to CXP module out of which only two are planned to connect to Flash Box and third port is left spare for any future use.

3. Each FPGA has three DDR3 memory controller channels. Each channel is equivalent to 4 GB size DDR3 module (S-byte data and I-byte of ECe) and supports 1333 Mbps rate. DDR3—1600 parts have been installed, making it possible to support up to 1600 Mbps in implementations where the FPGA is able to support this data rate.

4. Total DDR3 bandwidth on each FPGA is ~32 GB/s when running at 1333 Mbps. This will be ~3 SGB/s for FPGA implementations configured to run at 1600 Mbps. PCIe bandwidth to each FPGA is SGB/s in both Tx and Rx directions simultaneously.

5. This Board will power up and self-initialize without any software requirement once 12V and 3.3V power is applied to it from the Server. On power up, both FPGAs are configured by an EPM570 EPLD and with 2 GB of configuration flash attached to these. The status of this board will be displayed on LEDs for any debug purpose and will also be provided through 12C to the Server.

6. Configuration flash can be upgraded in field by software. This will be done through PCIe interface to FPGA from the Server.

7. Passive, 3 meter CXP cables are used for the electrical connection. Active optical CXP modules will be supported for longer cable lengths. S. For the PCIe xS slots with physical width of x16, MC FPGA #2 and its support circuitry, such as power regulator, Configuration flash, EPLD, DDR3 SDRAMs and CXP #2 can be removed in the BOM. This can be done as a half bandwidth, low cost version board to fit on an xS slot with x16 physical width on server motherboard.

4.2.3.2 Switch Cards

Figure 21:
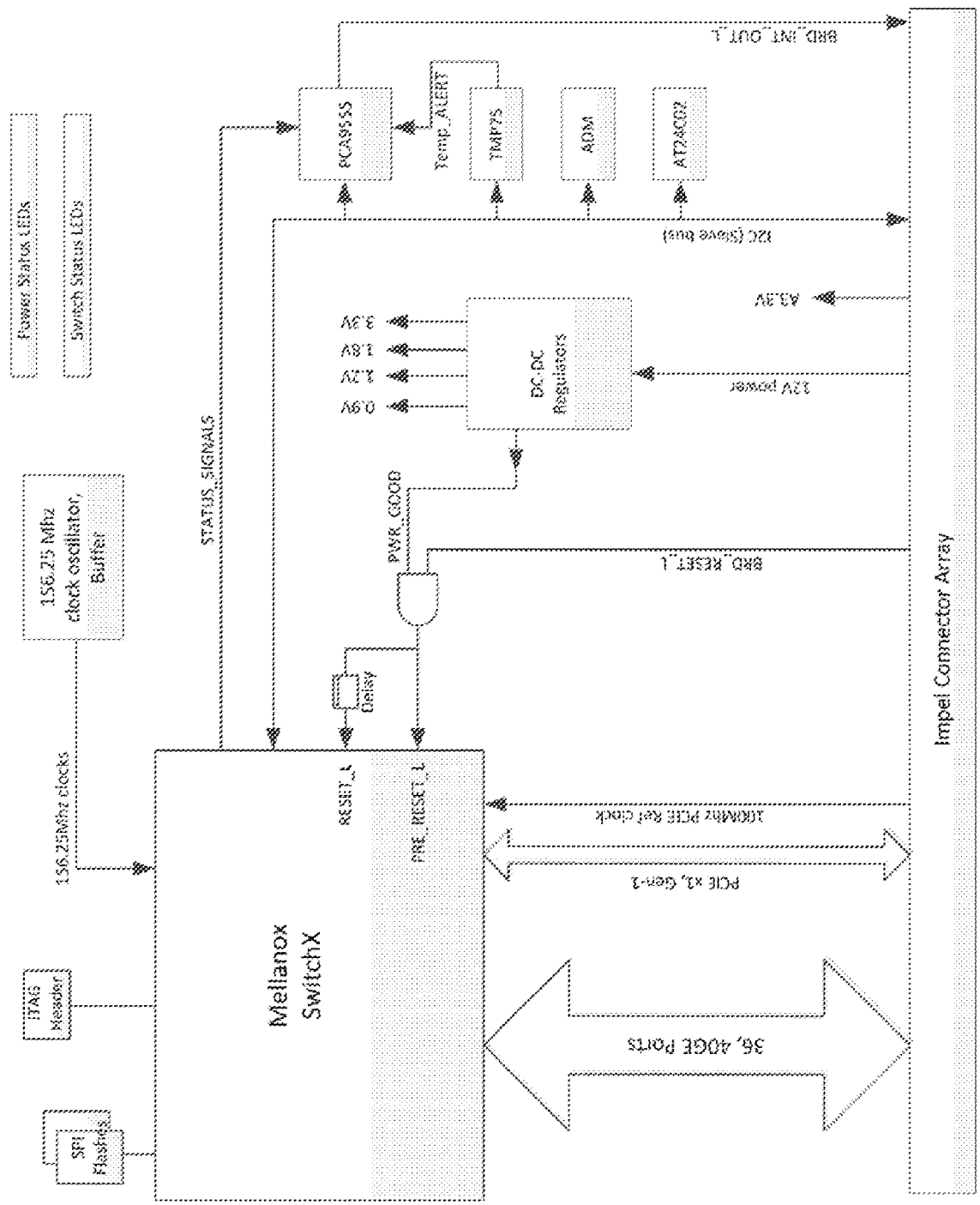
FIG. 21 shows examples of switch cards according to certain embodiments of the invention.

As can be seen in FIG. 1, the Memory Controllers use Ethernet switching to send data to the Flash Cards. Each Switch Card does Layer 2 switching of 36, 40GE ports. These 40GE (4×10GE) ports are interlinked between the Memory Controller FPGA (on PCIe MC Card in the Server) and the Flash Cards. Each Switch Card also provides 40GE Replication ports for backup. In some embodiments two layers of Switch Cards (total 4 Switch Cards) are configured to connect 6 Memory Controller Cards to 24 Flash Cards. In other embodiments, S1L and S2L are completely absent, S2R is a regular switch, and S1R is replaced with a Bypass Switch Card. FIG. 21 shows examples of switch cards according to certain embodiments of the invention.

4.2.3.3 Interfaces

In one embodiment, the data-path interfaces implement flow control according to a conventional 4-wire (START, END, VALID, READY) flow control protocol. This flow control technique may be applied, for example, to data paths described herein as having 128 bits. This interface technique may be used to interface certain design subsystems to standard high-speed interface modules, such as an Interlaken block, both sides of various FIFOs, and the like. This technique can provide flow control for traffic into the multiplexors as well. In one embodiment, this interface flow control technique is used for all the blocks in the Memory Controller. While two FIFO types are shown above both may implement the 4-wire (START, END, VALID, READY) interface technique, although 2 different Ready signals could be used to select which queue to hold from the following block.

Figure 22:
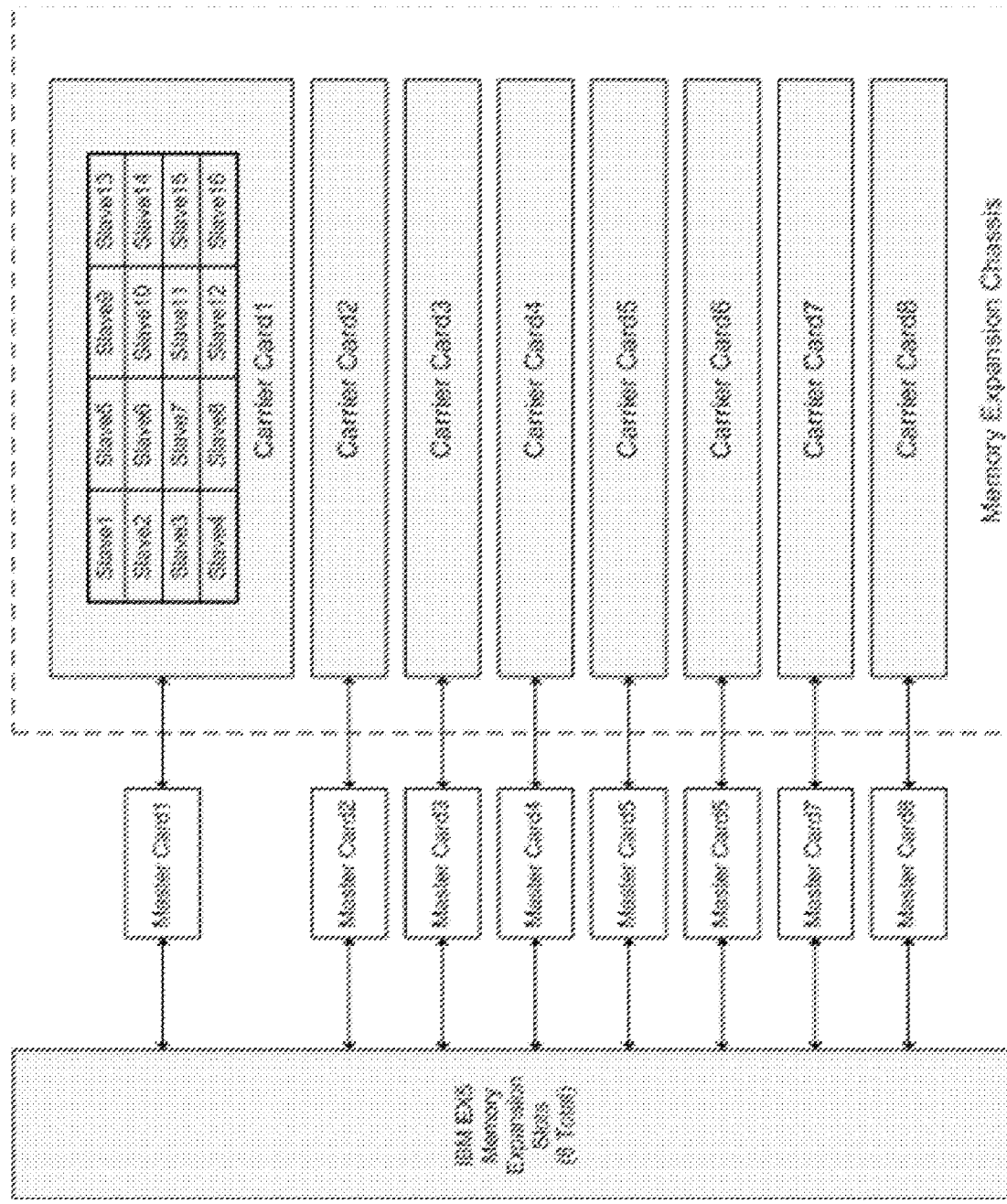
FIG. 22 illustrates a root architecture, in accordance with one embodiment.

FIG. 22 illustrates a root architecture, in accordance with one embodiment. As shown, a host system memory expansion slot is coupled to eight master cards, otherwise referred to herein as memory master controllers or root controllers. Each MMC has been implemented using an Altera Stratix-V FPGA. Each such FPGA includes 48 serial links that may each operate at 12.8 GB/s. Each serial link employs a serializer-deserializer (SerDes) for efficient use of I/O pins. Three such links may be coupled to each of two or more flash controllers (FCs), with each FC further coupled to sixteen flash memory devices. In certain larger configurations, each of eight MCC is coupled to sixteen FCs, and each FC is further coupled to sixteen flash memory devices. See also section 2.2.5.2.

Each MMC may be coupled to the host through a memory access interface such as Intel's Quick Path Interconnect (QPI), ARM's static memory interface (SMI), PCIe, or any other technically feasible memory interface. While a host system from IBM is illustrated, any technically feasible host system may be implemented.

4.2.3.4 Data Movement and Command Execution

Figure 23:
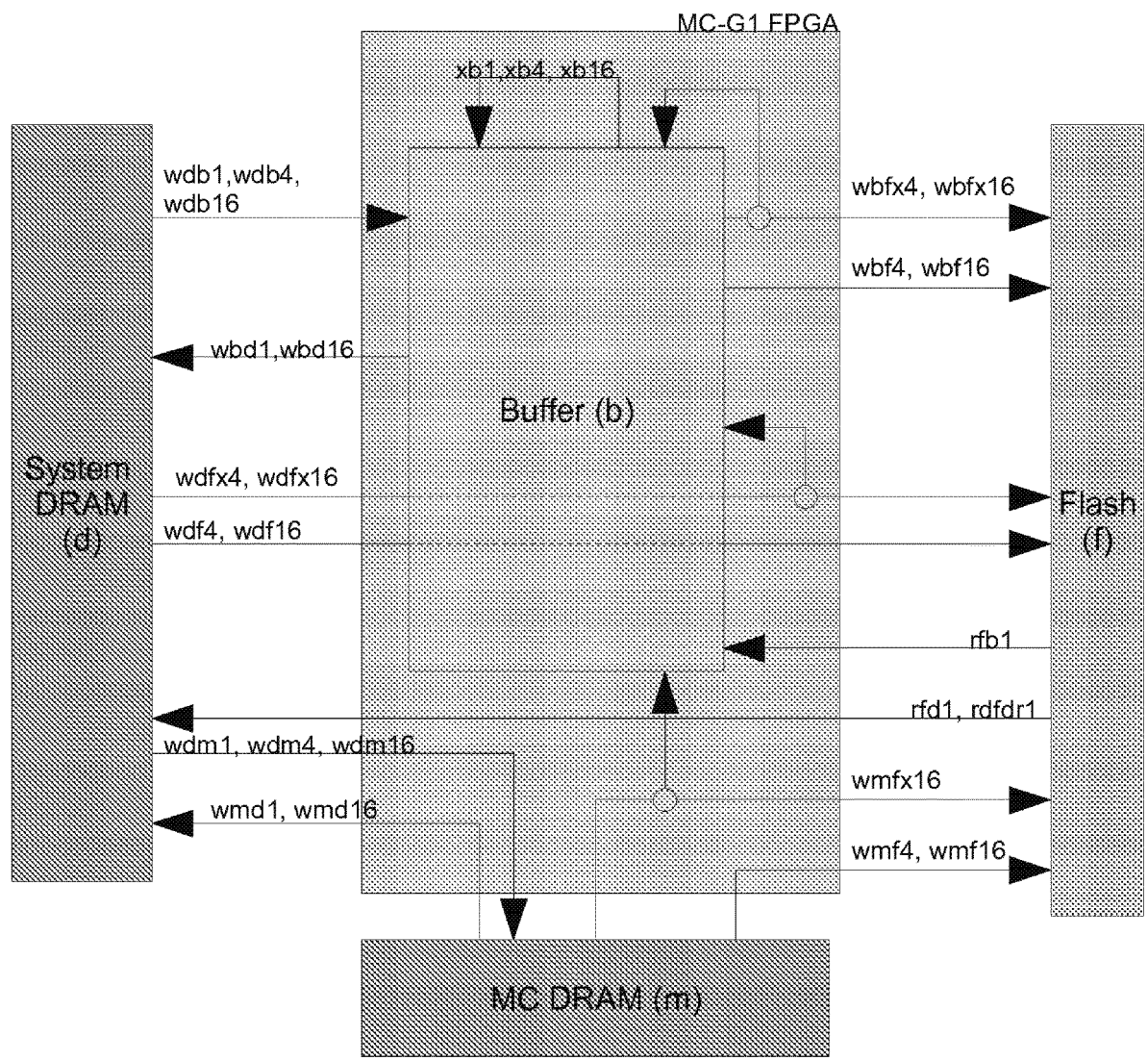
FIG. 23 shows memory controller commands according to one embodiment.

In one embodiment of the invention, the memory controller includes a "local cache" composed of RAM chips that allow the caching (buffering) of data coming from and going to the leaves. The memory controller implements a microengine that utilizes a simple data movement model as seen in the following diagram (FIG. 23). The command syntax and semantics are further described in the section 4.3.8 Mailbox Commands.

4.2.4 Flash Controller

The Flash Controller is coupled to the bottom of the memory controller and each Flash Controller controls one flash channel and the operation of the flash device on that channel.

4.2.4.1 Architectural Overview

Figure 24:
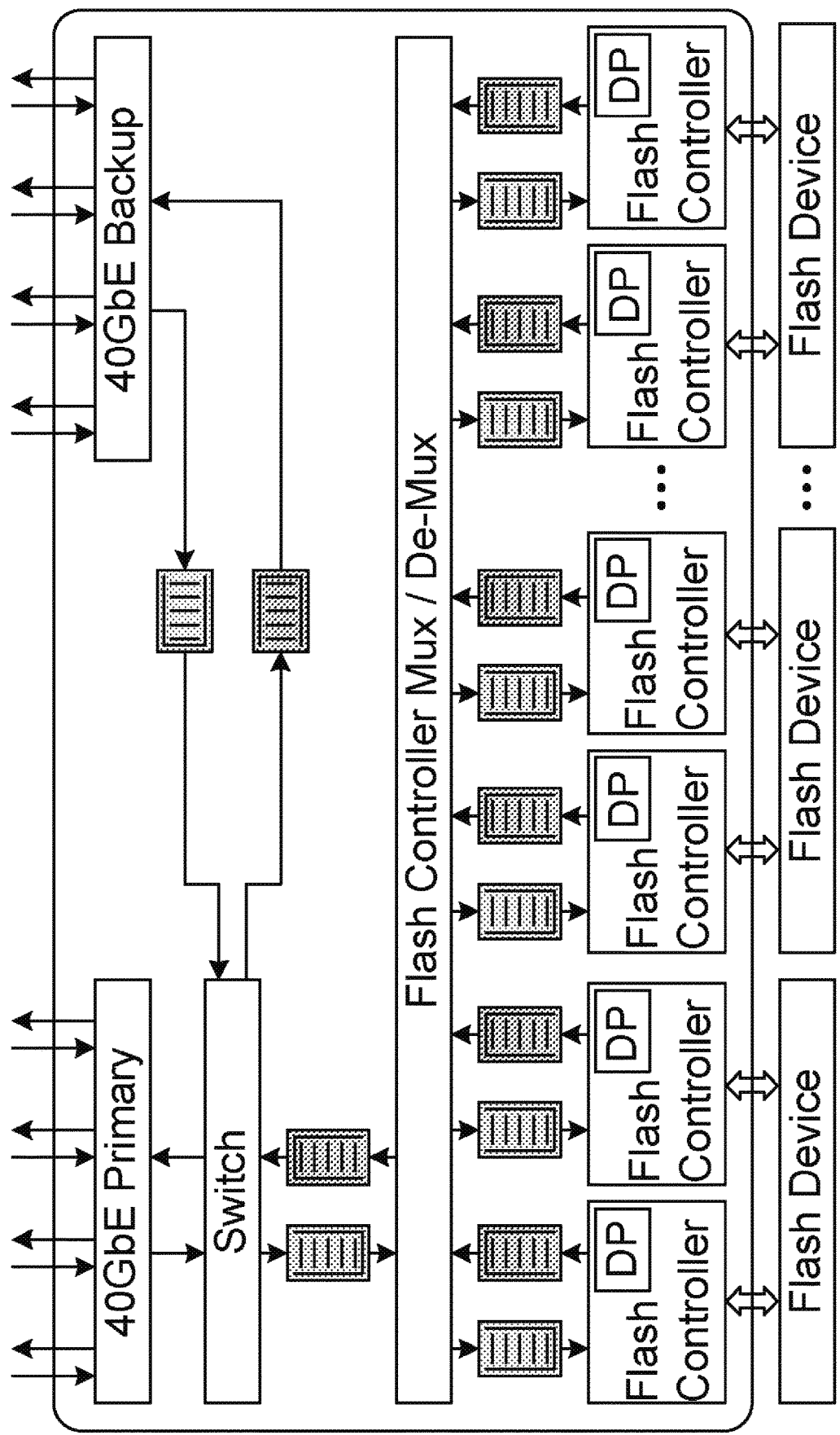
FIG. 24 illustrates a flash controller architecture, according to a working model embodiment.

FIG. 24 illustrates a flash controller architecture, according to a working model embodiment. As shown, each memory controller card is connected to 24 Flash Cards. Each Flash Controller Card has 32 Flash Controllers implemented on one FPGA. Each Flash Controller communicates with one 8-bit flash channel. Each flash device has two channels, with 4 LUNs per channel. So each flash controller controls the 4 LUNs it communicates with on the channel, as shown below.

4.2.4.2 Solid State Memory Targets

In one working model embodiment, each instance of a flash memory device is implemented using a corresponding instance of a commercially available flash memory device having Toshiba™ part TH58TFTODfK. This device has 4 targets, each with 2 LUNs. Consequently, there are a total of 8 LUNS per part that can be simultaneously accessed. With 4 Planes per LUN and 16K (plus metadata} pages, a 64 KB (plus metadata) data page can be written in one operation. The Toshiba device groups 256 of these pages into blocks that must be individually erased in order to program data onto the pages.

Each package has eight dies (four per channel across two channels). Each flash card has 64 channels (32 channels per FPGA, 2 FPGAs per Fe). The logical block size of a device built using these parts is 4K. Each 4K page stored on flash has an additional 64 bytes of metadata. A software unit is a LUN that is 4 planes of 4 logical pages per flash page. A LUN has 4276 erase blocks of 256 pages. There are 256 units (2*32*4) per Flash Card and in one embodiment there is a total of 24 flash cards in the system.

4.2.4.3 Leaf Memory Controller

The Leaf Memory Controller connects to the Memory Controller FIFOs (shown as red, yellow, green and blue). In this working model the leaves are constructed from "Flash" memory chips. Pages being written are stored in the Write Page Buffer Memory when they arrive at the Flash Controller and are read by the Channel Scheduling and Control block when the data needs to be sent to the flash channel. Pages being read from the flash are stored in the Read Page Buffer Memory and are then sent to the memory controller cards as appropriate.

4.2.4.4 Flash Controller

The Flash Controller is split into 5 main sections:
  Command Parser and Processing
  LUN Controller FIFO
  LUN Controller
  Channel Scheduling and Control
  Data Protection

4.2.4.4.1 Command Parser and Processing

Figure 25:
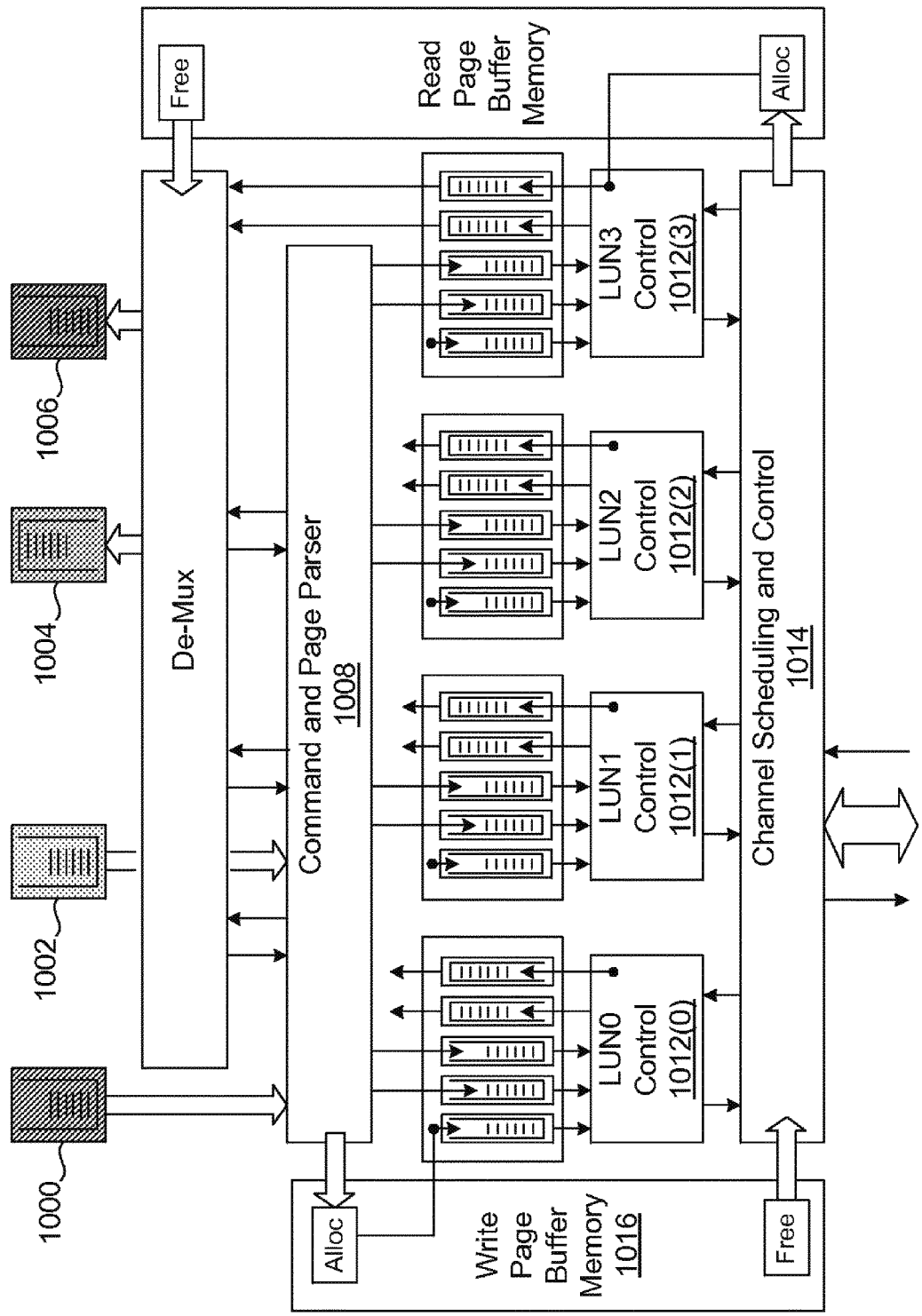
FIG. 25 shows a flash controller according to one embodiment.

Commands to the Flash Controller are parsed in a number of places in this design. These include:
  The Credit Based Flow Control
  The Command Parser
  The LUN Controller
  The channel scheduler
  The De-Mux block at the top of the Flash Controller In one embodiment a Credit Based Flow Control scheme is used. Note that Credit Based Flow Control relates to buffer space allocation and management, which may span arbitrary end-to-end paths, while the 4 wire flow control technique discussed previously relates to per clock data transactions on a specific interface. The Credit Based Flow Control block may receive CREDIT commands from the MMC. These commands are used as a NOP command just to carry buffer fullness information from the MMC to the MSC. The Credit Controller will remove these commands from the data stream. That block is shown in the main MSC block diagram on the MSC Design page. Substantially all other blocks that parse commands are shown in the Flash Controller block diagram, shown in FIG. 25 below:

In one working model embodiment, a Command & Page Parser comprising a command parser block will look specifically for UPage 4k5" and UWrite 4k5" commands in a data stream. A UPage" command will cause a number of things to happen. First, a buffer will be allocated from the write Page Buffer Memory and the address of that buffer will be placed into a page queue for the addressed LUN. Then the remainder of that page will be transferred from the input FIFO into the memory buffer that was allocated. Finally, the UPage" command will be removed from the data stream by the command parser block.

The command parser block may be configured to check write commands with a state machine. For example, if two pages arrive followed by a write 1-page command, an error has occurred and may be detected by the state machine. In that case a FREE_BUFFER command will be inserted into the command queue and the LUN controller will free the buffer rather than leave it allocated and unused. Once a correct write command is detected it is placed into the write queue. All other commands go into the "other" queue, except FREE_BUFFER commands, which also go into the write queue.

The LUN controller knows which commands are destined for the flash and which it can deal with directly. The LUN controller can deal directly with WRITE_ERROR, PING and FREE_BUFFER. All other commands have some flash interaction and are processed by a channel scheduler. The LUN controller also knows which commands affect the buffer allocation from the read buffer memory or the buffer freeing in the write buffer memory and completes those functions. The channel scheduler parses the opcode for read, write and execute commands. These are the main commands. RESET_LUN and RESET_MSC are also understood as they do a reset LUN operation on the flash device. The channel scheduler will issue suitable read and write commands to the flash and move the data between buffers.

Completed commands are passed into a done queue by the LUN controller along with buffer addresses for the read commands. The De-Mux block shown above in FIG. 25 passes the completed commands into the appropriate MMC FIFO. The De-Mux block is also able to interpret the opcode in each command as well. A read complete will have parallel page address information in the LUN FIFO. The De-Mux block has to generate the PAGE commands of the correct form for transportation of flash pages to the appropriate MMC.

4.2.4.4.2 LUN Controller FIFO

Figure 26:
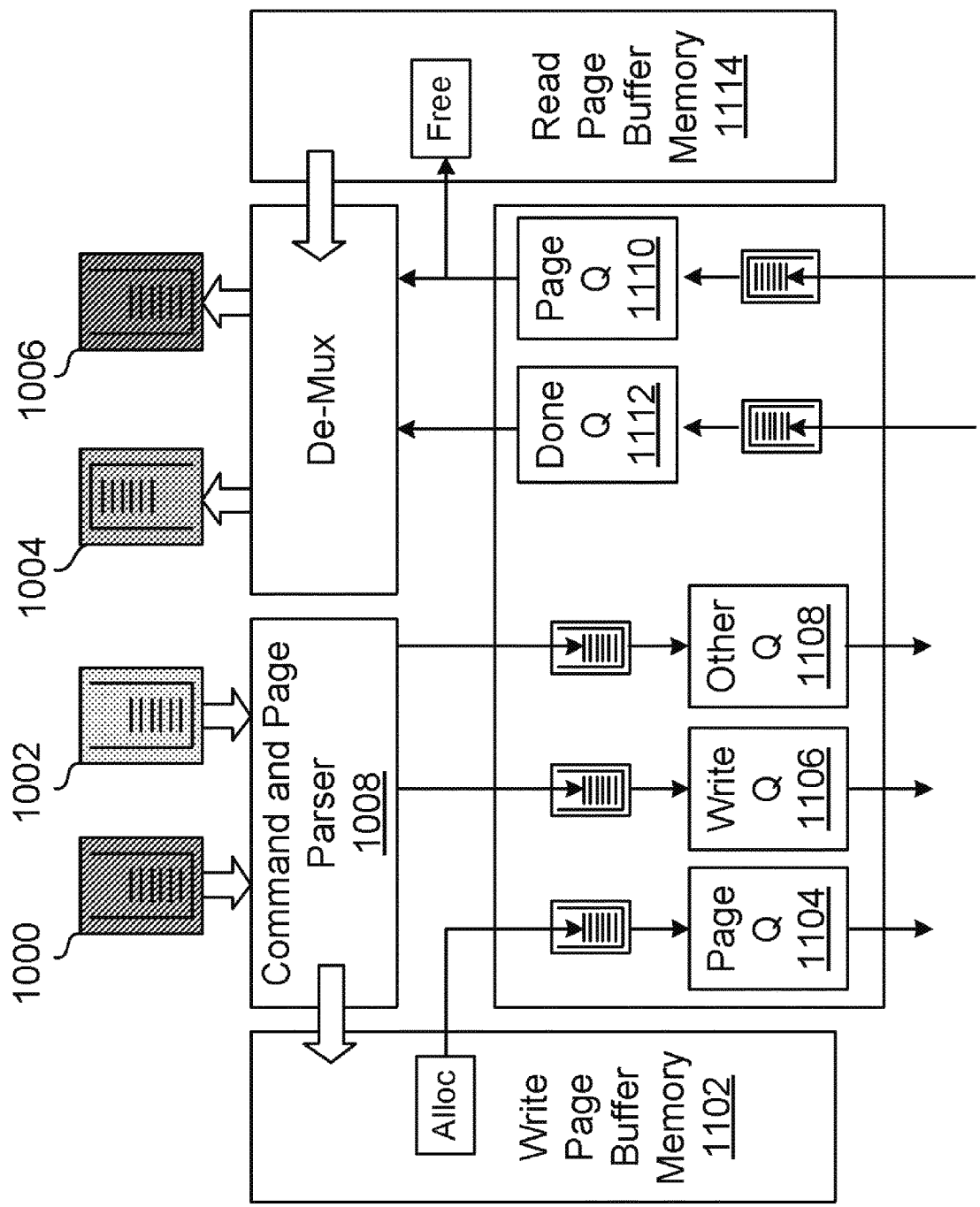
FIG. 26 shows a logical unit (LUN) controller according to one embodiment.

Commands are parsed into two groups and placed onto two queues, a write queue and a queue for all other commands. All data pages have been placed into the Write Page Buffer and the address of the buffer is passed into the page queue. Separating the writes from the other commands allows read commands to be prioritized over write commands. The queues may be structured as shown below in FIG. 26:

In the return direction, i.e. from the flash Device to the MMC, all commands for which there is a response are placed in the done queue in order of execution. Any page data, i.e. read pages, have associated data placed in the Read Page Buffer and the address of that buffer is passed in the page queue.

4.2.4.4.3 LUN Controller

Figure 27:
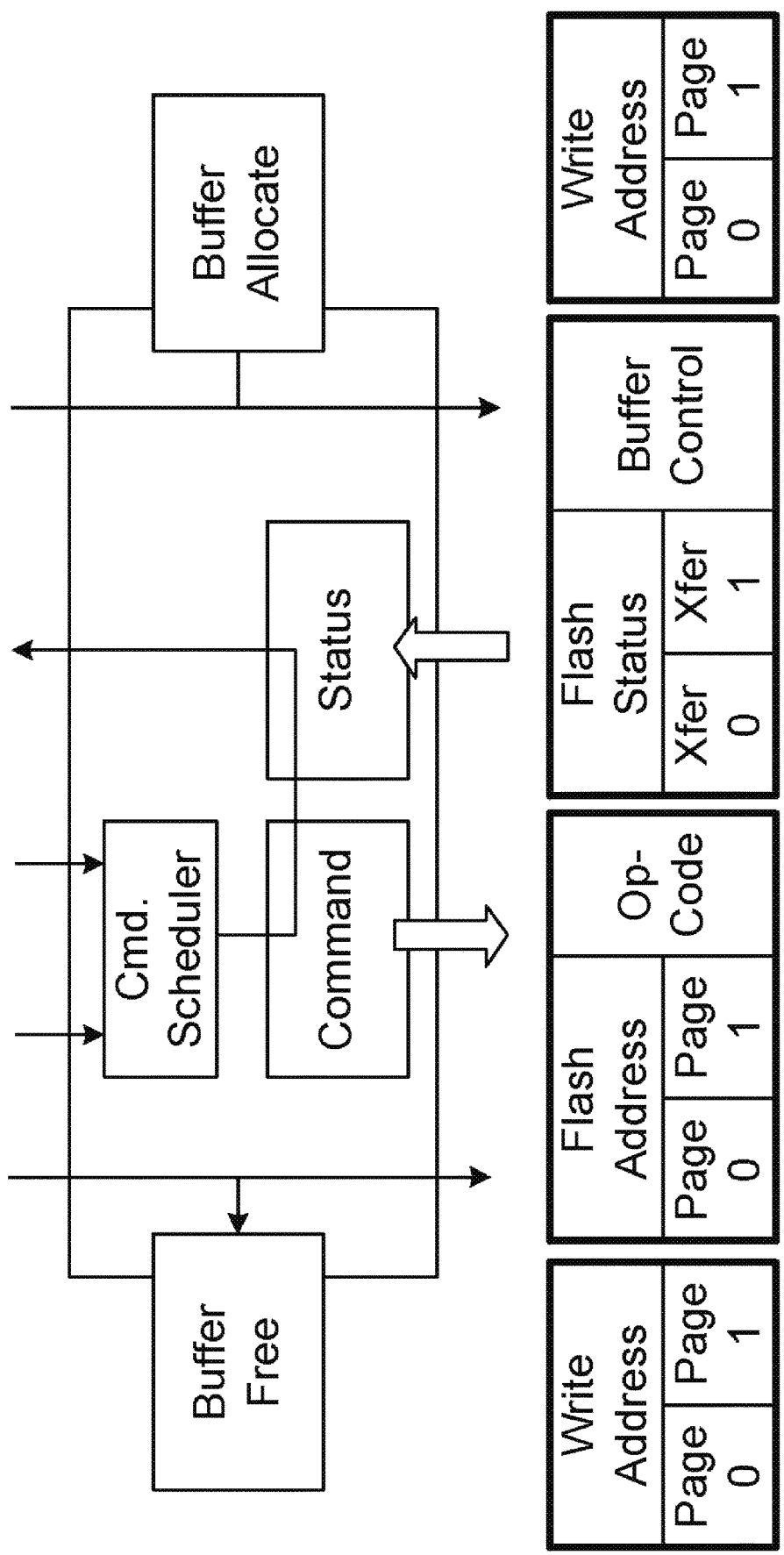
FIG. 27 illustrates a LUN controller, in accordance with a working model embodiment.

FIG. 27 illustrates a LUN controller, in accordance with a working model embodiment. As shown, the LUN Controller is coupled directly to the LUN FIFO.

The LUN Controller executes two major groups of commands:

1. Commands that go to the Flash Device
2. Commands that don't go to the Flash Device For example, a PING command does not go to the flash device. Instead, a ping command is fully executed in the LUN controller. A PING command arrives at the LUN Controller through the command scheduler and is sent directly to the done queue in the LUN FIFO. WRITE_ERROR and FREE_BUFFER are also fully handled in the LUN controller. Substantially all other commands have some interaction with the flash device.

A RESET MSC command will reset all the buffers in both the read and write buffer memories and abort any commands in progress. This command will also issue a RESET_LUN command to the flash device. A RESET_MSC command should only be executed when no other commands are in progress.

In general, the LUN controller will "present" a command to the Channel scheduling controller. The command should be a valid command, comprising an opcode, 0, 1, or 2 flash addresses, and a read or write buffer address. In the case of a write command, the memory location specified in the write address will be used to write to the flash at the flash address. In the case of a read command, the flash address will be used to read a page and it will be written to the buffer specified by the read address.

The LUN controller will hold the read, write and flash addresses and the opcode (shown at the bottom of FIG. 27) until the channel scheduler has passed the command over the flash channel and has a result. After the command executes within a target flash device, the status from the flash device may be passed into the LUN controller and the LUN controller should then write associated status bits into a return message and retire the command. Once the command is complete, the channel scheduler will also indicate how many buffers should be freed (in the write case) or how many buffers should now be allocated (in the read case). Finally, the command scheduler selects which command queue should be read and the next command is presented to the channel scheduler for execution in the flash device.

4.2.4.4.4 Channel Scheduling and Control

The Channel scheduler has two main operations: 1) Flash device initialization; and 2) Multiplexing the command requests and data transfers from the four LUN controllers. All commands and data targeting a given flash device are transferred over a standard 8-bit flash channel to the flash device. Alternatively, non-standard channels having a different number of data bits may also be implemented. An initialization procedure includes an initial RESET_LUN instruction to the flash device and then commands to begin operating the flash channel in a high speed synchronous transfer mode (the flash comes up in a lower-speed asynchronous mode). An initialization ROM in the FPGA will be used to direct commands over the interface in command mode. Once all four LUNs are initialized, the main command-polling loop is started. In general a READ STATUS ENHANCED command is used to determine if a LUN is idle and to determine if a prior command has been completed. When addressed to a specific LUN, this command may cause all other LUNs to be unable to drive data to, or read data from, the 8-bit data bus. If a LUN in the flash device is idle and a command targeting the LUN is available, the command is sent to the LUN. In the case of a write, the data is also transferred to the LUN over the channel.

Figure 28:
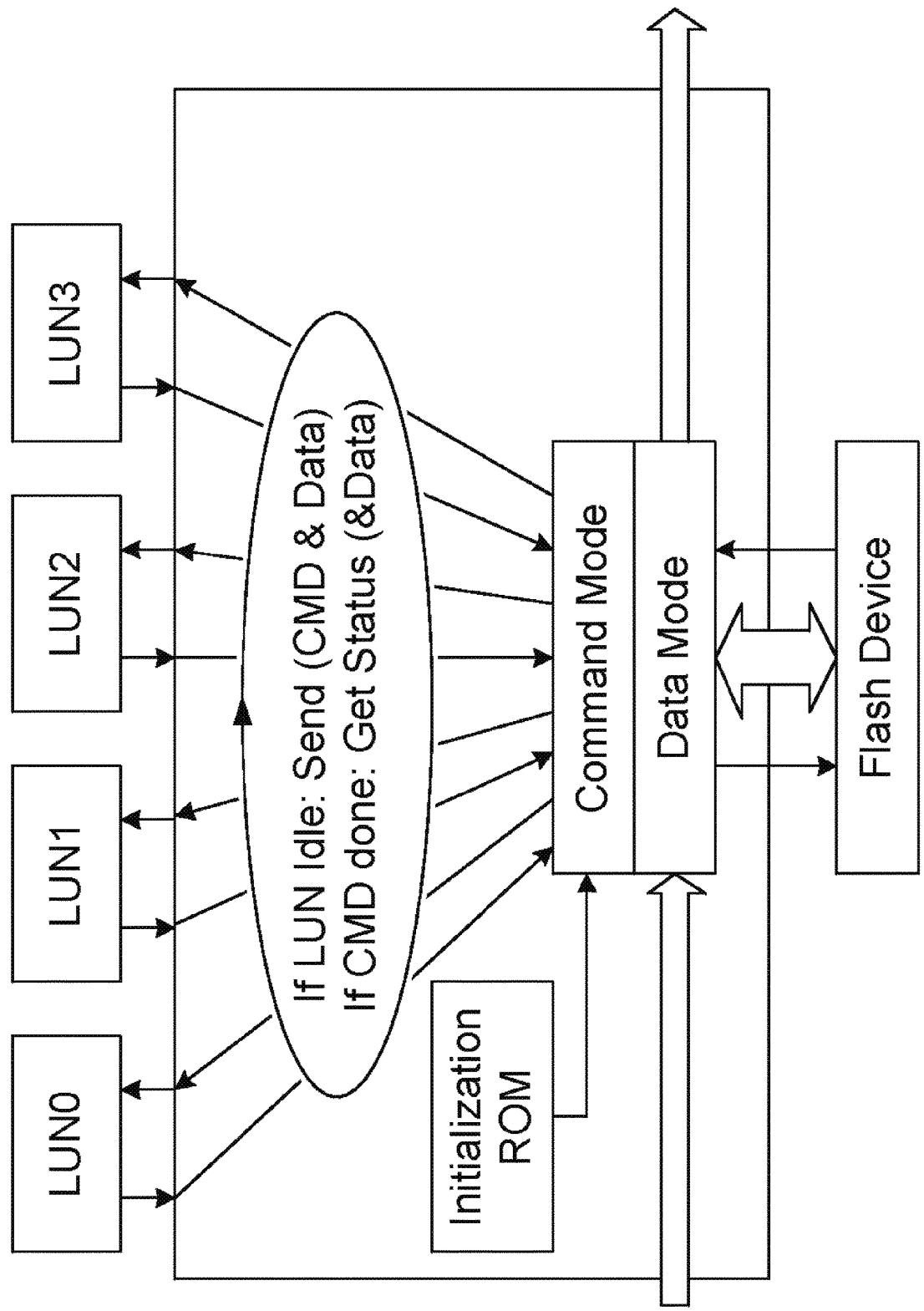
FIG. 28 shows a flash interface according to one embodiment.

Once a command is in progress, the internal flash BUSY status is polled with the READ_STATUS_ENHANCED command. Once a command is complete, the status returned from the command is returned to the LUN controller. In the case of a read command, the data is read from the flash device over the channel and is sent to the read page buffer memory. In the case of an erase, no page data needs to be transferred over the flash channel. FIG. 28 shows a flash interface according to one embodiment.

4.2.4.4.5 Data Protection

Data Protection is done in three steps: 1) Add protection parity bits to the original data; 2) Process the data bits and parity bits to see if there are any errors. A syndrome is generated to indicate which bits are in error; and 3) Correct the errors that were found (if any) and recover the original data bits often, the last two steps are combined around a FIFO. In general, the data is broken into blocks.

Correction of the data requires the data block and the information about which bits to correct. Often, the block has "gone by" when the "bits to adjust" information becomes available. The structure of the Data Protection Logic is shown below in FIG. 29.

Figure 29:
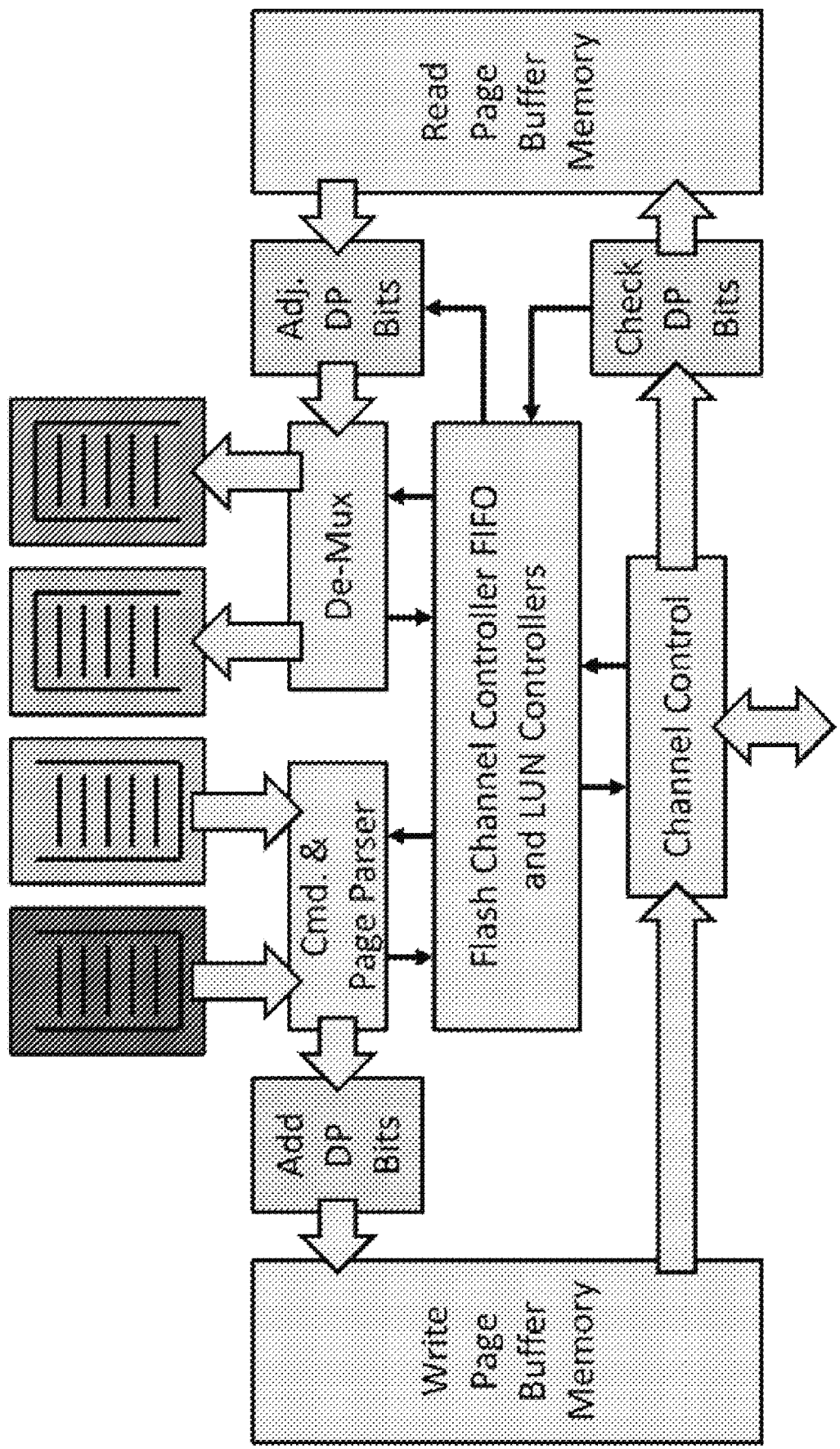
FIG. 29 illustrates three data protection logic modules for implementing data protection within the flash controller.

FIG. 29 illustrates three data protection logic modules for implementing data protection within the Flash Controller. The data protection modules may implement any technically feasible data protection technique. In one embodiment data protection is implemented with a BCH code that uses a 512 byte data protection block. In another embodiment an additional 104 bytes of data protection information can correct up to 64-bits in error in the block and detect almost every error that cannot be corrected.

The Add DP Bits logic accepts a 4 k byte page as the page is being written by the Page Parser and inserts an extra 104 bytes for every 512 bytes of data. As pages are written, every 512 bytes of data grows to 616 bytes of data after the 104B parity bytes are included. When the Add DP Bits logic needs to write to memory, it can pause the flow of the page data and cause the input FIFO to back up a little. The pause makes the insertion of the parity bits quite straightforward. The flash pages in the write page buffer are now protected and can be written out to flash. At a later time, when a read operation is performed on the pages from flash, protected pages are read from the flash and are passed through the Check DP Bits logic. This logic passes the bytes directly into the read page buffer, but also uses the data bytes and the parity bytes to generate a syndrome indicting where any errors are in each block. The syndrome information may be passed through a queue (not shown) in the LUN controller along with the buffer address. When the flash page data is read from the read page buffer, the correction specified in the syndrome can be applied to the 616 byte blocks and they can be sent to the De-Mux logic as 512 byte corrected blocks. In another embodiment, if the syndrome is significantly larger than expected, the FIFO approach may be used.

4.2.4.4.6 Interfaces

The input to the flash controller is the 4-wire handshake along with 16-bits of data. The 4-wires are START_BIT, END_BIT, VALID and READY, which signals in the other direction. The bottom of the flash controller is coupled to a flash device, and different flash devices may require different embodiments of flash controller logic.

4.2.5 System Baseboard (SBB)

The System Baseboard (SBB) attaches via eight connectors on the bottom side to four root interface boards in the computer chassis. Four Memory Module Baseboard (MMBB) cards plug into connectors on the topside of the SBB. Other than power distribution, the SBB is simply an interconnect mechanism for the purpose of simplifying the connection to the computer chassis.

4.2.6 Carrier Card

In one embodiment a Carrier Card serves as the baseboard for sixteen branches. There is one carrier card per root and up to eight per system. In one embodiment the SBB provides power distribution to the carrier cards through suitable connectors and redundant hot-pluggable power supplies also dock to this board.

4.2.7 Branches

Figure 30:
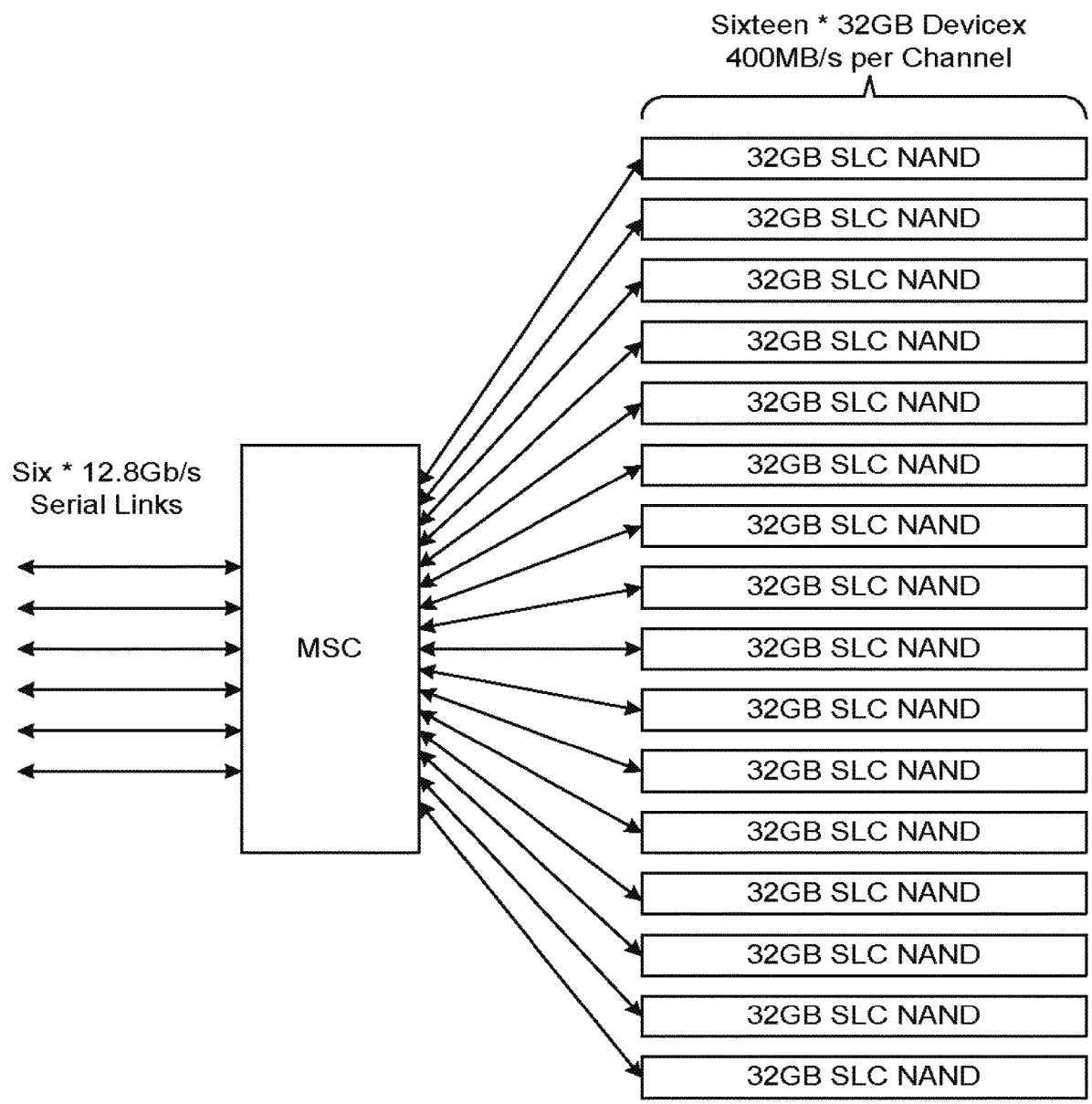
FIG. 30 shows a branch card block diagram according to one embodiment.

In one embodiment a branch card is designed to be a field replaceable unit (FRU). As illustrated below in FIG. 30, the branch card comprises a single leaf controller and sixteen solid-state devices.

4.2.8 Enclosure

An enclosure for a memory complex (Flash Box) may be configured to be mounted in a standard 19" equipment rack. Power supplies and fans sufficient to power and cool the unit are included, as is EMI shielding.

4.2.9 Power Supplies

Off-the-shelf 12V power supplies able to run on either 220 VAC or 110 VAC may be configured to power the memory complex. The 12V supply rails are distributed as appropriate and regulated down to appropriate lower voltages. Local Voltage Regulators (VRs) and Low-Dropout Regulators (LDOs) may provide the required voltage regulation. The use of 12V to power the unit will make eventual support for battery backup early write termination (EWT) simpler. An Uninterruptible Power Supply (UPS) operates at the level of the AC input.

4.2.10 Memory Buffer 4.2.10.1 logical View

Figure 31:
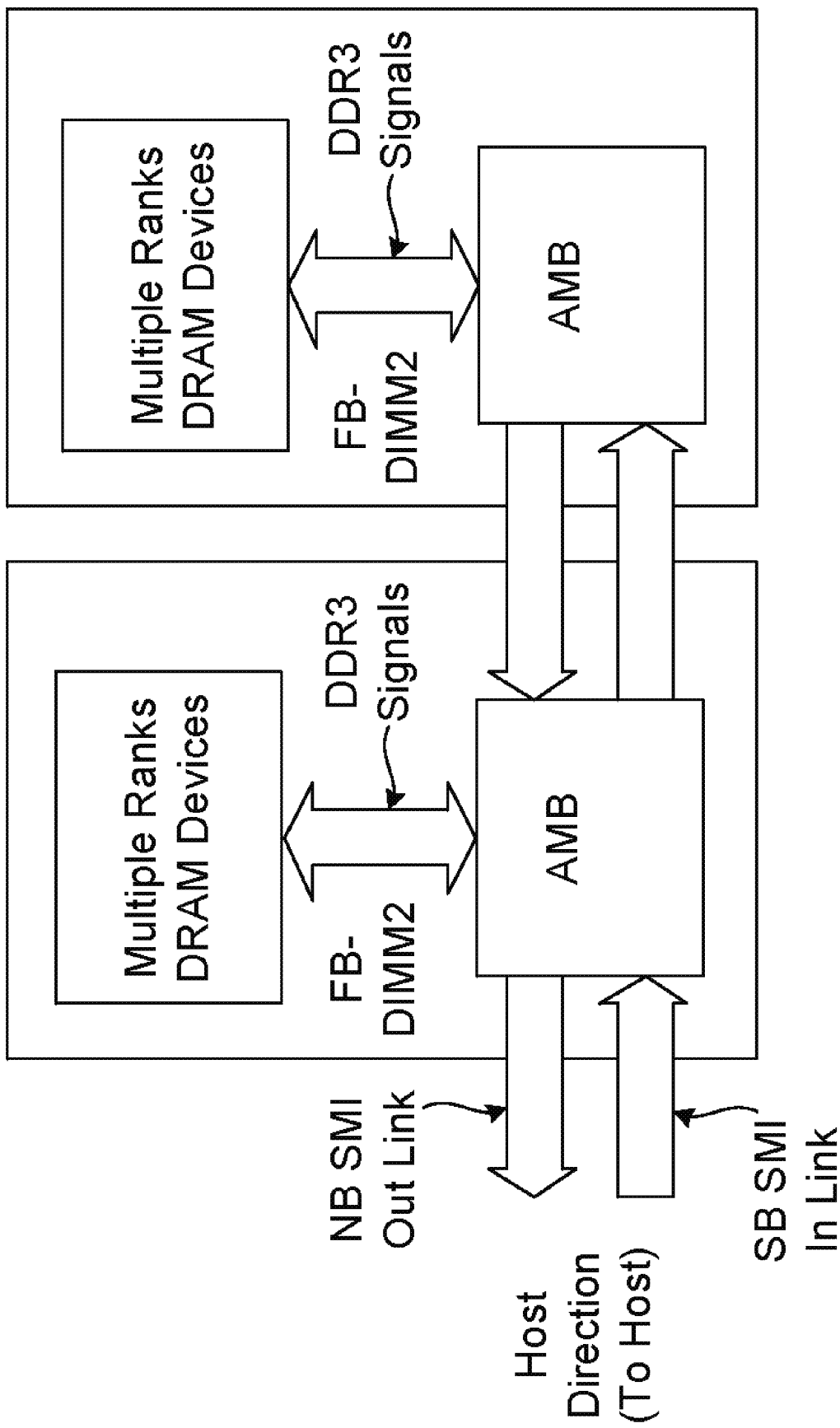
FIG. 31 shows the logical view of the memory buffer as two independent AMBs according to one embodiment.

In one embodiment, a memory buffer (e.g. an Intel Jordan Creek Scalable Memory Buffer 2) configured to operate in accordance with the JEDEC FBDIMM AMB as described in JESD82-20A is implemented in conjunction with DRAM memory. FIG. 31 shows the logical view of the memory buffer as two independent AMBs each operating a pair of DDR3 RDIM Ms. (Unlike the JEDEC AMB, the Jordan Creek does not support daisy chaining. Thus, one Jordan Creek chip is required for each of the two SMI2 buses.)

4.2.10.2 Root Complex View

Figure 32:
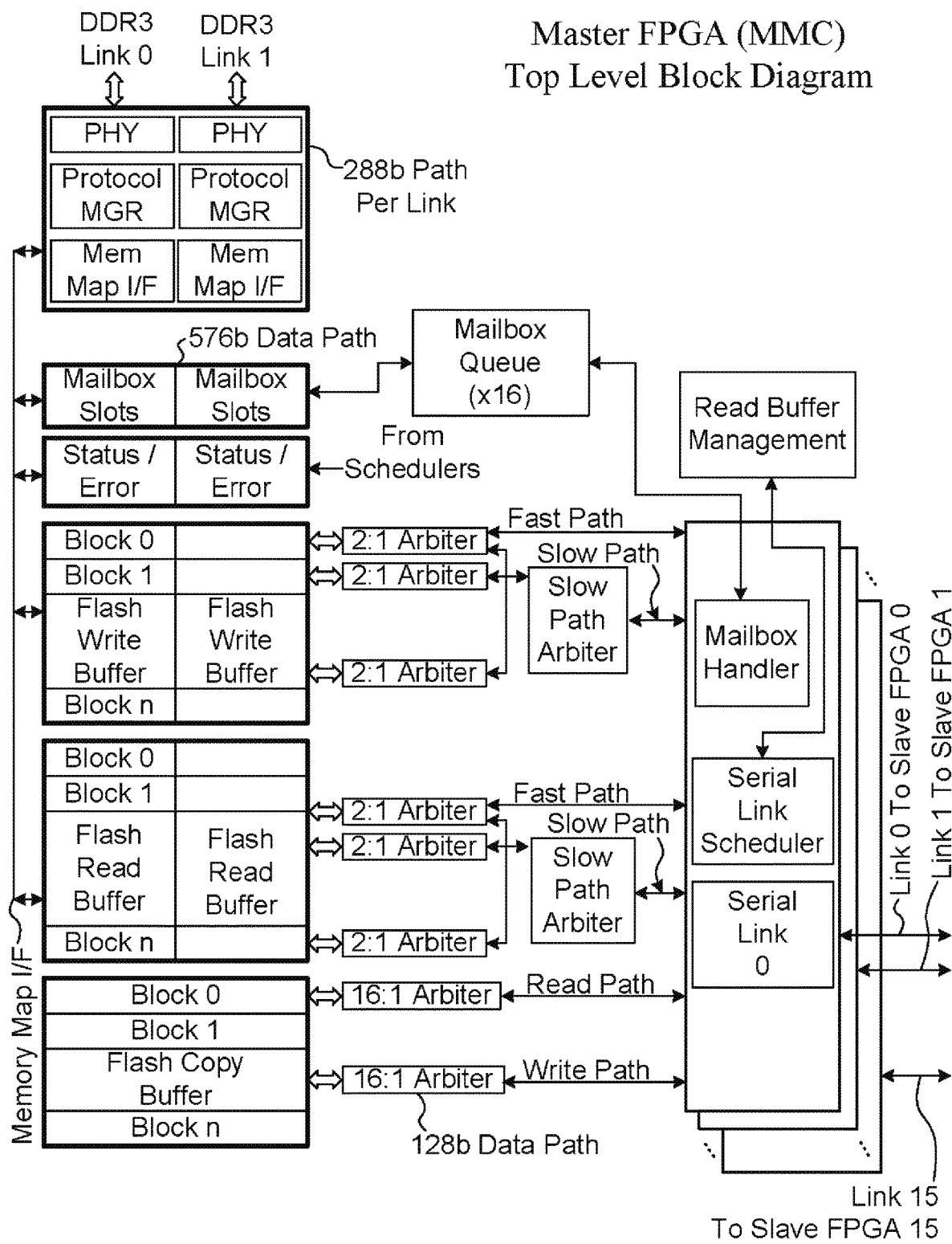
FIG. 32 illustrates a root complex according to one embodiment.

FIG. 32 illustrates a root complex. The root complex, combined with the branches and leaves described herein, creates a distribution network for blocks of data that are written in to and read from the pages of the solid-state memory (e.g. flash memory) in the leaves.

Figure 33:
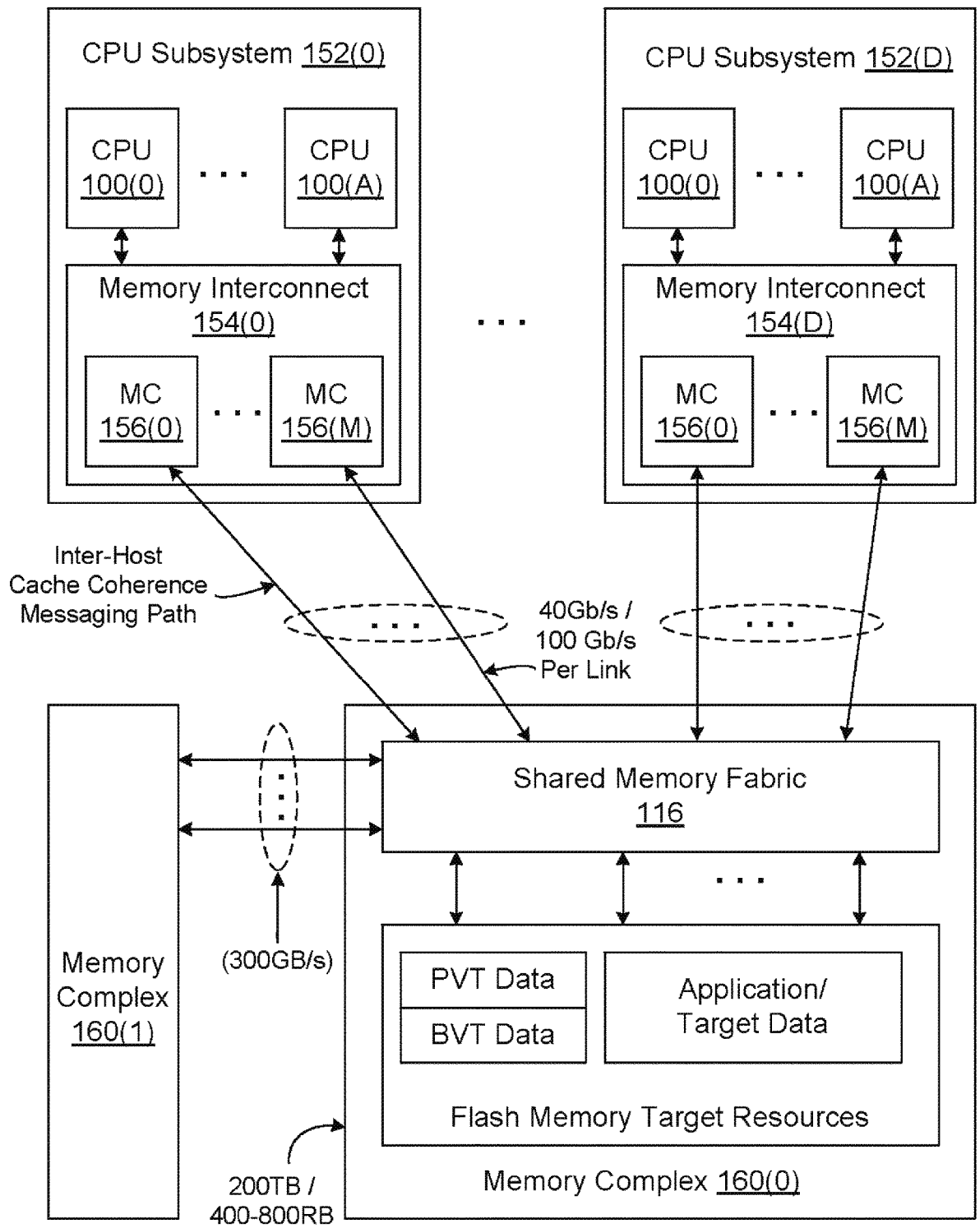
FIG. 33 illustrates a multi-host system configured to implement cache coherence using a data network for transmitting cache coherence messages between hosts, in accordance with one embodiment.

FIG. 33 illustrates a multi-host system configured to implement cache coherence using a data network for transmitting cache coherence messages between hosts, in accordance with one embodiment. In some embodiments a DMU is present in the memory complex either on the switch cards or on a separate card interconnected with the switch cards (see FIG. 18). In other embodiments the DMU is present in the flash memory target.

4.3 System Software Architecture 4.3.1 Architectural Overview

Figure 34:
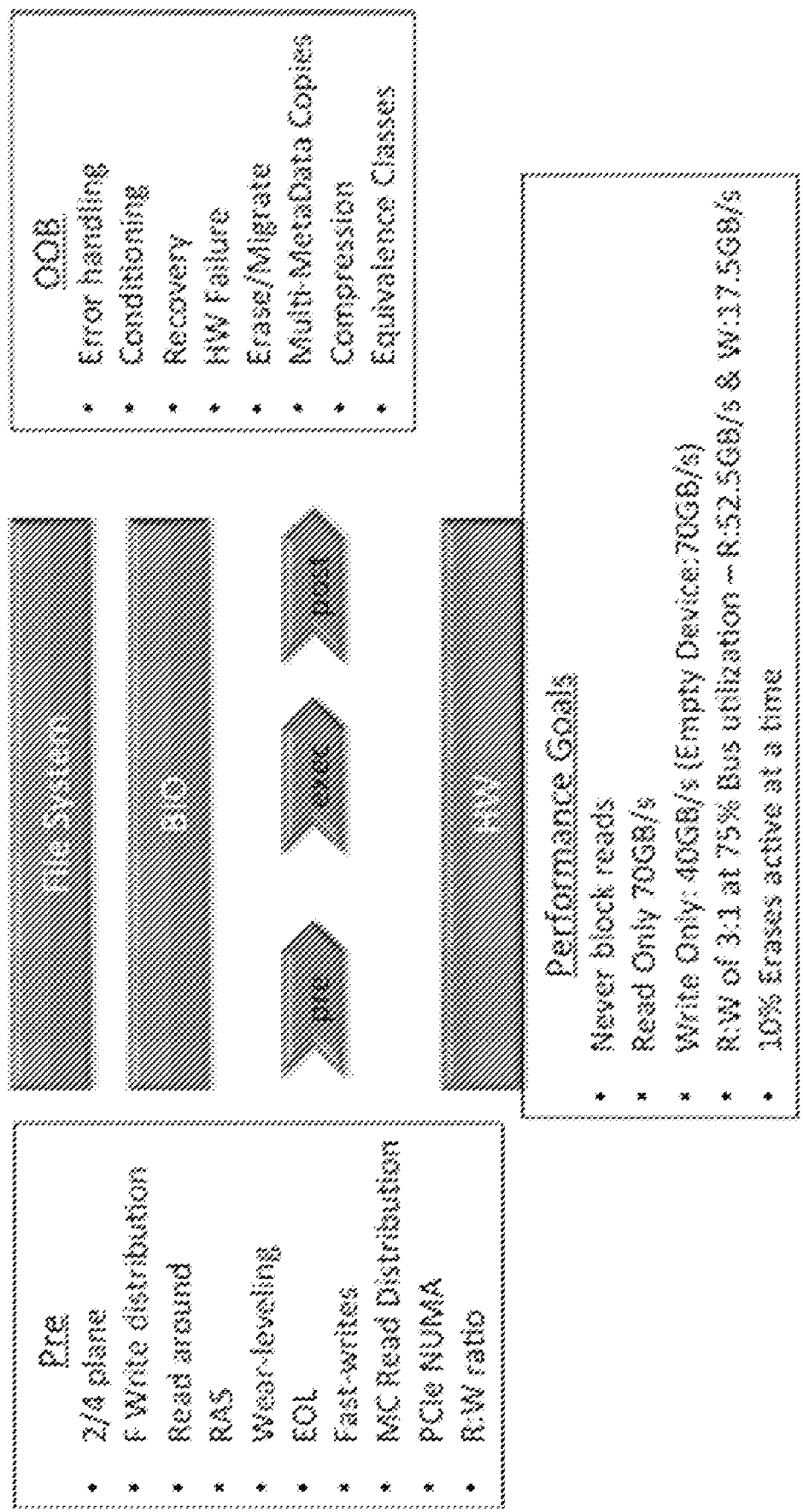
FIG. 34 is a conceptual illustration of a software system architecture, in accordance with a working model embodiment.

FIG. 34 is a conceptual illustration of a Software System architecture, in accordance with a working model embodiment. The Software System provides interfaces to applications that enable parallel operation of the memory system in multi-threaded, multicore environments. Not all applications need to use the same interfaces. Some applications may use Asynchronous Input/Output (AIO), some applications may use Direct Input/Output (Direct), some applications may use Memory Mapped Input/Output (Memory Mapped), and other applications may use File System Input/Output. Still other applications may use proprietary device drivers or block device drivers.

4.3.2 Write Distribution

Figure 35:
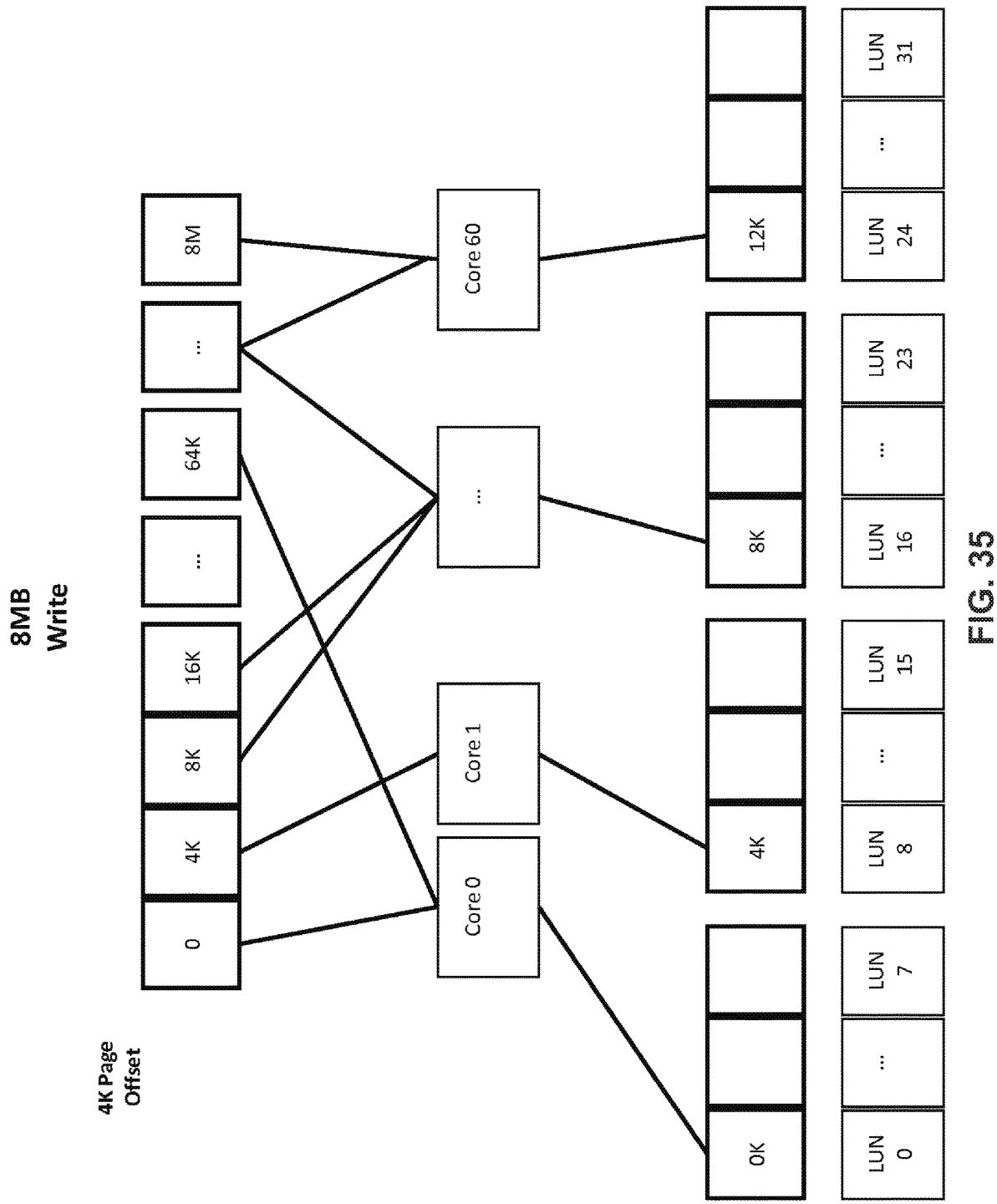
FIG. 35 illustrates write distribution, in accordance with a working model embodiment.

FIG. 35 illustrates write distribution, in accordance with a working model embodiment. Write distribution is fundamental to parallel operation of the system. Data must be distributed in such a way that reading the data will utilize the parallel structure of the system. Many cores can simultaneously read and write data efficiently only if the corresponding movement of the data does not generate contention for scarce resources such as interconnections carrying memory data and LUNS within memory devices.

As shown, an 8 megabyte (8 MB) write is distributed over a number of different LUNS in different memory devices.

More specifically, write distribution of the 8 MB of data associated with an application program is illustrated. System software would divide the 8 MB write request from the application program into 4 kilobyte (4 KB) chunks and distribute them in a round-robin fashion across the 60 cores in the processor package (chip). Each 4 KB chunk is put on an {open' Protection Stripe (PS) by the software on each core. Each PS accumulates chunks up to a total of 7*64 KB.

The accumulated data is then written 64 KB at a time in sequential mode and 7*64 KB at a time in parallel mode. If the data has a 3:1 read-write ratio, only 1 write is scheduled per Protection Stripe to allow reads to be reconstructed using the PG. Reconstructing data to complete a read is referred to herein as performing a read around. The read around technique is discussed briefly in 4.3.8.7.

4.3.3 Reclamation and Erasing of Flash Memory

Figure 36:
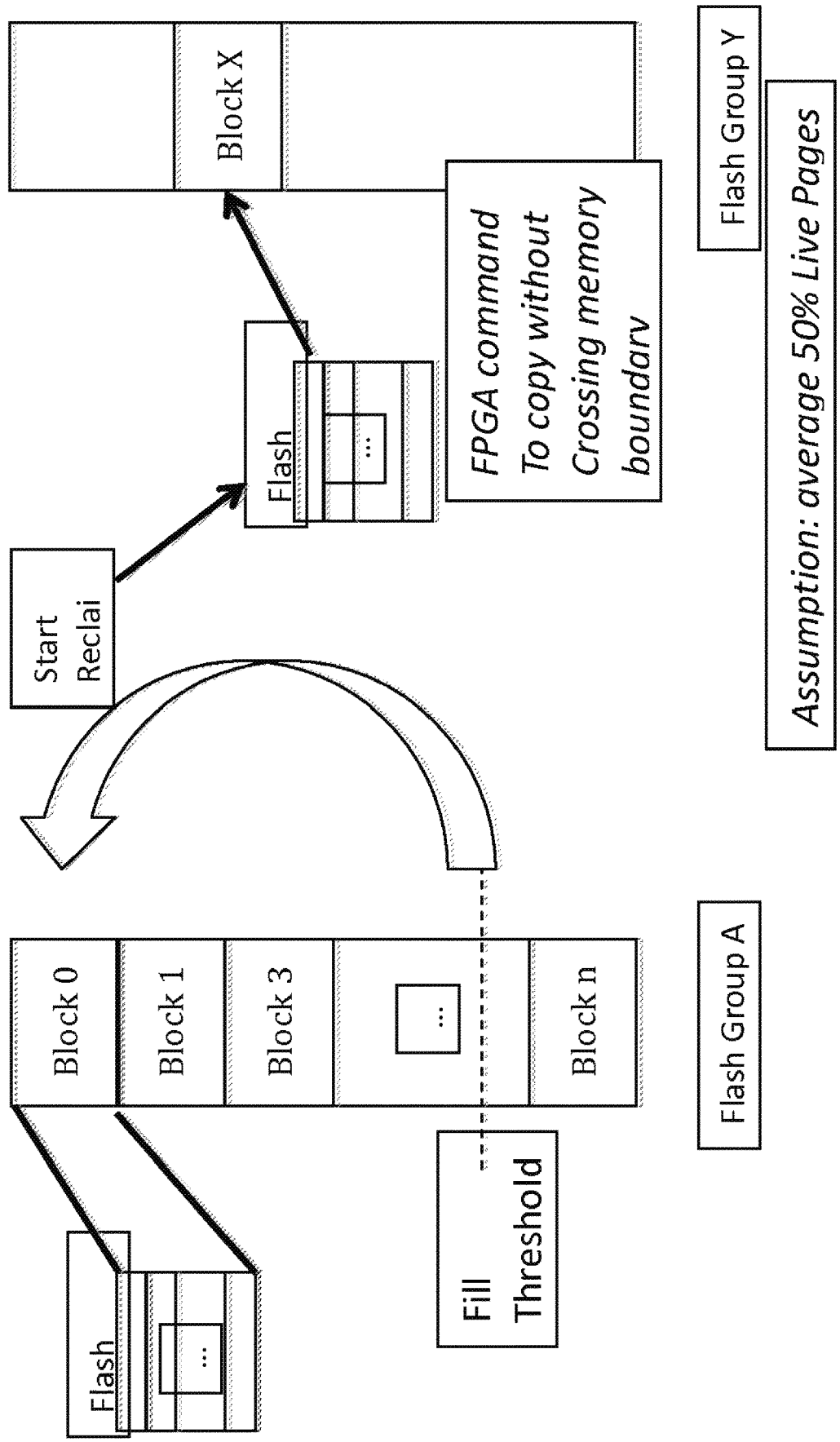
FIG. 36 illustrates a basic reclamation and erasure technique, in accordance with one embodiment.
Figure 37:
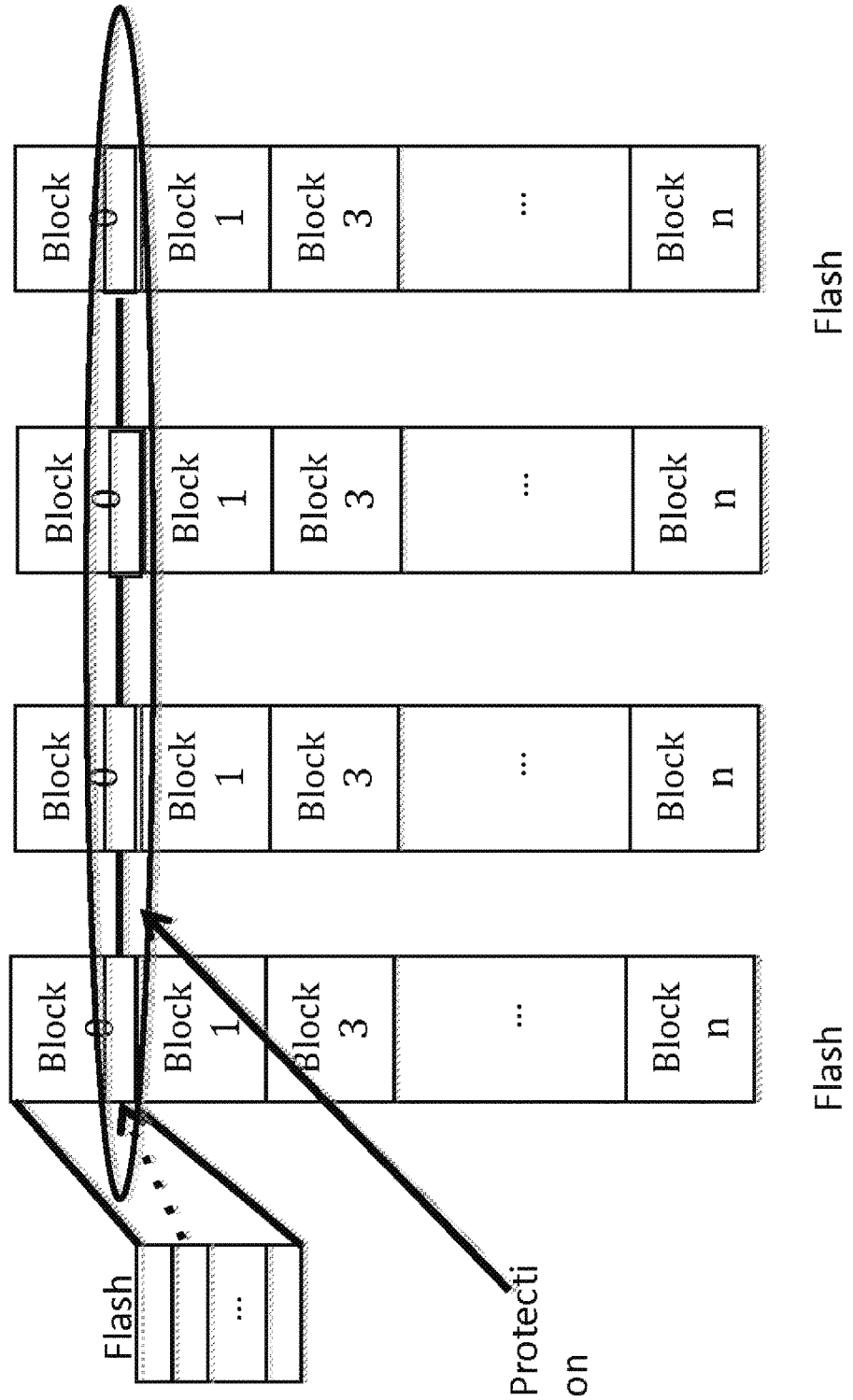
FIG. 37 shows protection groups according to one embodiment.

FIG. 36 illustrates a basic reclamation and erasure technique, in accordance with one embodiment. Because Flash devices must typically erase an entire block prior to writing individual pages within the block, reclamation is implemented to ensure a ready and available supply of appropriately erased pages and blocks. System software should support the reclamation ("garbage collection") off reed pages scattered among different blocks by compacting valid data associated with certain pages into erased blocks. A subsequent (second) write to the same logical page therefore always occurs to a newly erased physical page, leaving original data residing in a physical page to never be read again in a state referred to herein as "dead". A "dead" page is free to be erased during reclamation and subsequently reassigned. Unless dead pages are reclaimed, the supply of erased pages will ultimately be depleted and the system will not be able to accept any new data to be written. FIG. 37 shows protection groups according to one embodiment.

4.3.4 Basic Reliability and Serviceability (RAS) Considerations

In order to recover from failures of individual subsystems, boards, controllers, and chips, redundancy must be built into the data as it is ingested, processed, and stored. In addition, the data must be distributed (see 4.3.2) onto separate physical devices to avoid loss caused by the device's failure.

4.3.5 Equivalence Classes

Figure 38:
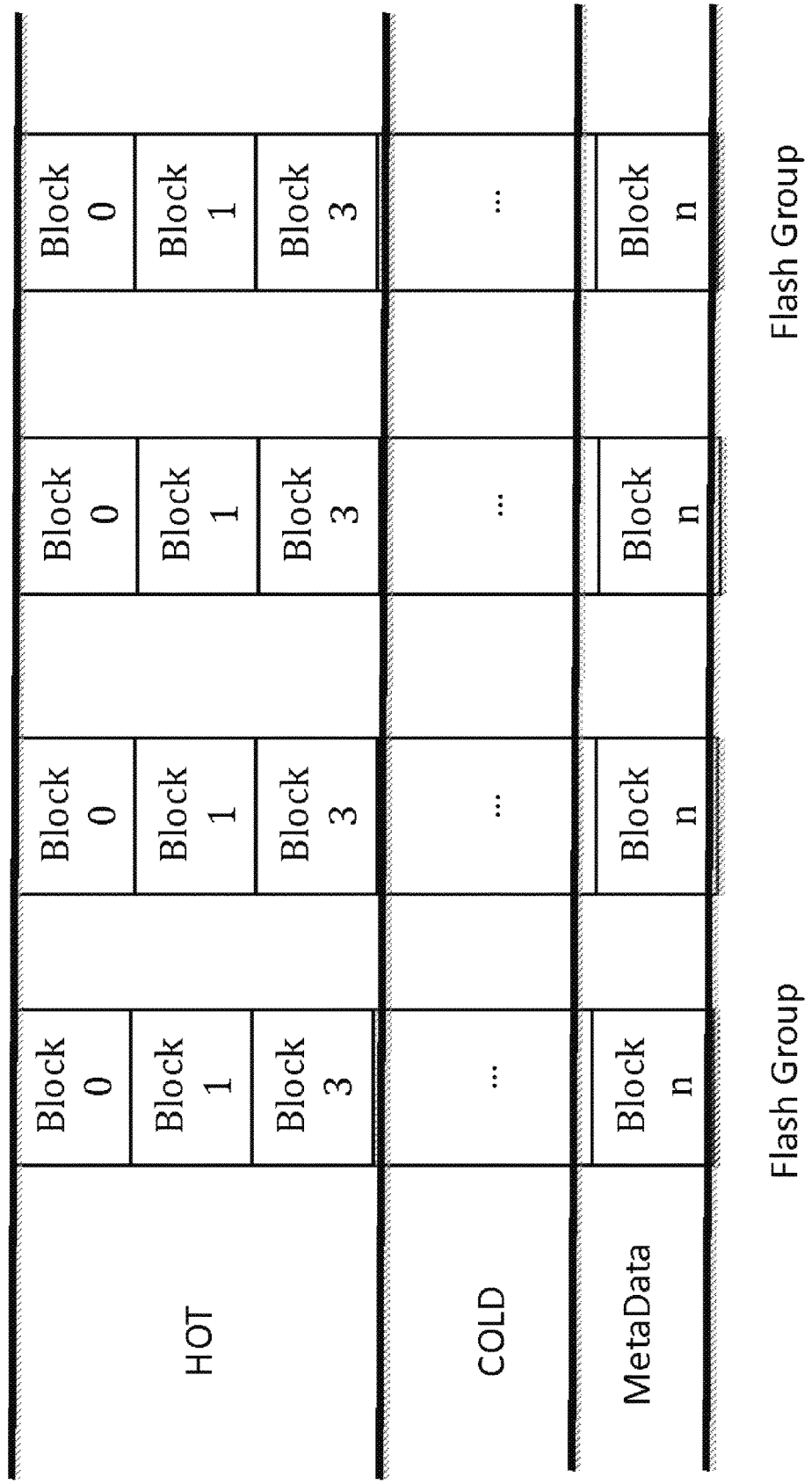
FIG. 38 illustrates the concept of equivalence classes, in accordance with a working model embodiment.

FIG. 38 illustrates the concept of Equivalence Classes, in accordance with a working model embodiment. The goal of Equivalence Classes is to minimize write amplification caused by erasing flash pages. Equivalence classes may be used to characterize and classify Flash Data Pages according to modification access metrics. For example a page that is modified frequently may be classified as "hot" while a page that is rarely modified may be classified as "cold". Such classification may be used to determine which pages should be erased as part of reclamation (garbage collection). Reclamation procedures may be implemented as software algorithms or in dedicated logic circuits. In one embodiment, high-level equivalence classes are characterized as follows:

1) Flash pages may be placed in Equivalence Classes that classify data pages as HOT or COLD; Equivalence Classes may contain Protection Groups that further contain Flash Pages.

2) A list of HOT protection groups may be ordered based on the number of "live" pages in the group. To achieve this, a value referred to herein as a Write Amplification Factor (WAF) may be calculated for all protection groups.

3) Erase operations may be applied to Whole protection groups (for Erase Groups that contain multiples of protection groups) on the HOT list. When Protection Groups in the HOT list reach a certain threshold they will be moved to the COLD list.

4) When the portion (percentage) of flash pages in the HOT list hits a low threshold, the Protection Groups with the lowest WAF will be put on the HOT list. Similarly, the COLD list may also be ordered according to WAF values.

4.3.6 Data Structures

4.3.6.1 Page Virtualization Table (PVT)

A Page Virtualization Table is a multi-level table that contains the translation of a logical page to a flash page. The table is initialized during a system startup phase (e.g. driver startup) and stores an entry for each logical page in the system. The number of entries is generally equal to the logical size of the block device in pages. Each entry in the PVT stores a logical page number, the corresponding flash page number, a sequence number and a bit to indicate if the page is valid or trimmed. The PVT may be reconstructed from flash memory by reading the metadata portion of every flash page when the driver is loaded.

4.3.6.2 Block Virtualization Table (BVT)

The block virtualization layer abstracts physical block addresses from the driver stack and provides a virtually contiguous range of flash block addresses. The first initialization of the device identifies and stores any factory marked bad blocks. The BVT excludes these blocks and creates a virtually contiguous range for the physical addresses. During the course of normal operation, more unusable blocks may be identified and more blocks may become unusable over time and be subsequently identified. A block virtualization layer of the software system remaps virtual blocks residing on failed physical blocks to new physical blocks. Conceptually, the BVT is below the PVT and translates a flash virtual block number to a physical block number. The virtual page number includes the virtual block number and the page index in the flash block. In one embodiment, the PVT uses 42 bits to store a flash virtual page number (FVPN). If the FVPN is represented as a block, page index tuple, then 32 bits are used for the block number and 8 bits are used for the page index. These 40 bits of page address cover 2.5 PB of virtual space. This fits easily within the 42 bits available allocated for virtual page numbers in the PVT.

4.3.7 Protection Groups (PGs)

A Protection Group is a collection of erase-blocks that are written in a way that allows recovery of the application's data. The protection group includes a parity page that has the exclusive-or (XOR) all the data pages in the group. The Protection Group data structure holds the flash virtual block addresses of these N+1 mUlti-plane erase blocks. PG related statistics are also stored in the PG data structure. For instance, a failure to read-around a write or erase.

4.3.7.1 Protection Group Table

The Protection Group Table holds all the Protection Groups and is indexed by Core ID and Protection Group number.

4.3.7.2 Protection Group Lists

A number of PG lists are used to track Protection Groups. For instance, all the open Protection Groups are in a list.

4.3.7.3 Protection Stripes

All the data in a Protection Group on the same plane and at the same page offset forms a Protection Stripe. The data isn't protected until the parity page is written. These partially filled Protection Stripes are tracked with a Protection Stripe data structure.

4.3.7.4 Erase Block Table

Erase counts and related statistics that apply to individual erase blocks in the Erase Block Table may be kept, for example, within an Erase Block Table.

4.3.8 Mailbox Commands

The Mailbox architecture in a working model embodiment may use a DMA engine MCFPGA to post commands and receive completions. Each core will have a work buffer and a completion ring buffer where the AP posts the mailbox requests and the MCFPGA completes them.

4.3.8.1 Full List of Mailbox Commands:

In one embodiment, the following commands will be used to implement multiple use cases interfacing with the Master Controller FPGA (MC-FPGA) and Flash Controller FPGA (FCFPGA).

1. READ_PAGE: reads one page.
2. WRITE_TO_BUFFER: write into MC-FPGA staging buffers*.
3. WRITE_TO_FLASH: write from staging buffers into flash.
4. WRITE_TO_FLASH_WITH_XOR: write from staging buffers into flash with XOR**.
5. WRITE TO DRAM: write into overflow DRAM***.
6. READ_COPY: read from a flash location into staging buffers (for migration/copy commands).
7. ERASE: Erase a block of pages.
   WRITE and COPY commands use staging buffers to stage data before writing into Flash.
       XOR is performed only when data is written into flash (not done when writing into staging buffers or DRAM).
       Overflow DRAM helps to stage data when staging buffers are busy_

READ: A Read command always reads one 4K page. The destination for the read will be one system address specified in the mailbox command. In Gl, a FPA is 16K so the offset into the 16K page will be specified in the MB command. Each 4K flash page will have 64B of metadata. The Read operation can be for the data portion page or the metadata portion of the page. A data read consumes 4096B and a metadata read consumes 64B. If the target flash page address is compressed, then the mailbox request will have another field that will indicate which compressed index needs to be retrieved.

WRITE: When originated by software this command is always a WRITE4 that will write 4 logical pages (16 KB) to 1 plane. The write command is split into separate commands. One is to DMA the user data to the write buffers and the next command is to move the data from the write buffer to flash. Parity computation is done if RAS is enabled.

COPY: The Copy command is a READ_COPY that brings the data from flash to copy buffers in the master, followed by a WRITE_COPY to migrate the data to the target FPA. As with writes, the copy sequence is different when RAS is enabled.

ERASE: A flash LUN (a unit in software) has 4 planes. The Erase command will erase all 4 planes at the same time. There is also an erase that is used when a bad block has been replaced. In addition, there is an erase command that can take four FPA's allowing a four-plane erase to be processed even if some of the blocks have been replaced. In further embodiments, the commands are augmented to include data movement to and from a local cache of RAM implemented on the memory controller card (see 4.3.8).

4.3.8.2 Flash Page Numbering

Figure 40:
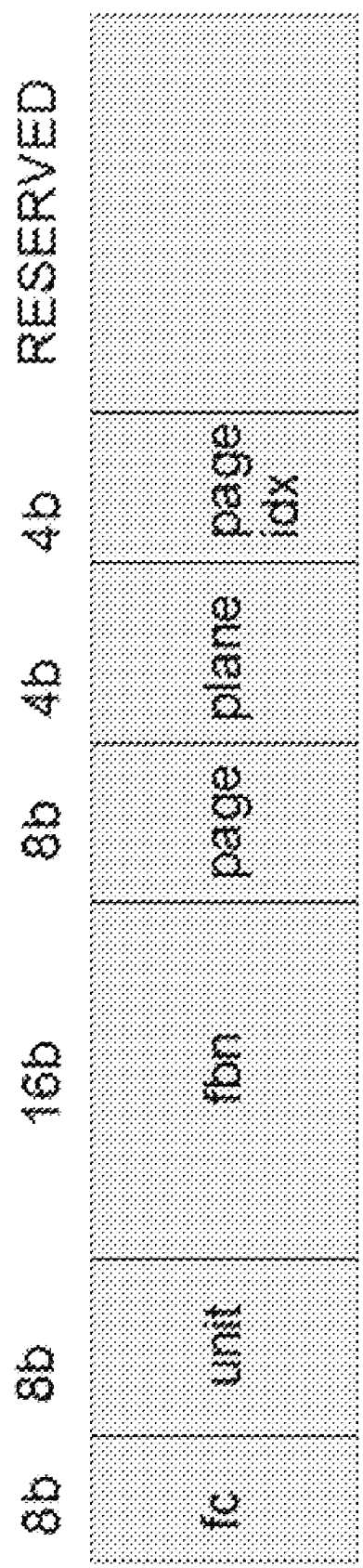
FIG. 40 illustrates one flash physical page numbering scheme that explicitly encodes physical topology according to one embodiment.

In one embodiment, a flash page number is made to be self-describing, which may preclude a sequential page numbering format. Instead, a physical page number will have the physical topology of the device explicitly encoded. FIG. 40 illustrates one flash physical page numbering scheme that explicitly encodes physical topology:

Fe: Flash Card [0-48]
Unit: Unit Index relative to the flash card [0-255]
FBN: Flash Block Number [0-4199]
Page: Page number in relative to the block [0-255]
Pin: Plane number [0-3]
Idx: Page index in block [0-3]

Within an erase block, pages may be numbered according to the diagram of FIG. 41. Logical page positions may be numbered within a physical page before being moved to the next (new) plane. Numbering across all the planes should be performed before moving to the next page offset.

The physical page number itself will not be exposed outside the topology and the block virtualization layer. Protection group, write distribution and erases will only deal with virtual block numbers. When a request is sent to the FPGA, a flash page number will be converted to a flash page address format that includes the channel, logical unit number and target. The rest of the fields will be passed in as is in the mailbox. Keeping unit numbering consecutive in software makes it easy to represent the topology at the added cost of having to compute the logical unit number, channel and target when programming the mailbox.

4.3.8.3 Protection Groups

A protection group might contain any number of blocks. In one embodiment, a Protection Group includes four blocks that provide protection from loss of a single page, erase block or Flash Controller card. Three of the blocks hold data while the fourth holds the parity of the other three blocks. This allows recreation of the data if any of the four blocks fail. This technique is very similar to RAID4 and RAID5, except that data is beneficially not striped across all the available units at once.

A Protection Group is the fundamental unit of validity count tracking. A number of valid logical pages may be recorded in a per Protection Group data structure. This validity count is useful in performing Garbage Collection (described below).

A Protection Group may comprise many Protection Stripes. A Protection Stripe may include four (3+1) physical flash pages at the same page offset and the same plane number across the four erase blocks of a Protection Group. In the diagram above, the four orange rectangles depict pages and/or blocks that are part of the same Protection Stripe. Protection Stripes can be partial or complete. Partial stripes are not fully protected as not all pages have been written (particularly the parity hasn't been written). Complete pages have had all data and parity written. Write Distribution techniques may be aware of whether Protection Stripes are partial or complete and attempts to complete partial stripes to minimize the time data is not protected. The protection stripes will span across the decay sets (hardware that fails and can be replaced independently, in our case Flash Controller modules) depending on what protection policy is chosen. In one working model embodiment, an option is provided to enable or disable RAS in the system. With RAS enabled, the stripe will be 3+1 (3 data pages and 1 parity page) by default (other sizes up to 15+1 can also be implemented). Parity data will be computed in the MC FPGA and the WRITE-4 will be posted to the hardware. If RAS is disabled, a 4+0 option (4 data pages with no parity) may be selected and this will also be posted as a WRITE-4 to hardware. Switching between RAS on and off is a destructive change and therefore switching between the two will not be a dynamic option.

4.3.8.4 NUMA Affinity

NUMA affinity refers to the practice of accessing data that is physically located on memory which has the least performance penalty induced by the non-uniformity of the memory architecture as seen by the core executing code. In particular, two performance issues dominate working model embodiments:

1. For optimal READ performance, the data should be transferred using Direct Memory Access (DMA) to the node that has the user buffer, in order to minimize the QPI traffic between nodes.

2. Zero contention for locks. Apart from the performance issues, there is one additional performance issue: 1. To minimize queuing delay for READs.

In one embodiment, a software driver module allocates READ operations (i.e., mailboxes) on any of the 60 cores in order to minimize the queuing delay for READ operations. However, the completion (DMA transfer) of the READ data will always be done on the node where the destination READ buffer resides. To achieve this, there will be one completion queue per core and the destination completion queue will be on the same N UMA node as the destination user buffer. Consequently, there will be no lock contention on the completion queue.

Each unit in software will keep a PCQ of requests where the incoming requests land. A timer or timed work queue thread may be implemented to manage incoming requests, the work queue thread being configured to de-queue the operations from the PCQ and establish corresponding mailboxes to execute the requests. Each unit will need a list of requests that have been posted to hardware. This list will be monitored to see if a request needs to be timed out.

In order to eliminate locking associated with the PCQ on which a request arrives, a corresponding mailbox on the request target (node on which destination buffer resides) and on the completion queue belonging to the core on which the completion will be received from hardware. This will be accomplished by allocating the operation (op) structure on the core on which the completion queue resides.

4.3.8.5 Write Distribution

Write distribution (see 4.3.2) or "WD" components are responsible for distributing write requests in a way that leverages the available concurrency of the underlying hardware. Write requests may be staged in the WD layer. WD may spread the requests to CPU cores and may be responsible for batching logical pages into one physical page worth of data (16K). WD may consult RAS to determine which flash page number to write (which may be selected from an open protection group). RAS may keep a list of open protection groups and partial protection stripes where the writes may be posted.

In one embodiment, protection groups are created when the driver is installed. There may be multiple active protection groups open for writes. This approach to defining protection groups may help spread the write operations across all the available devices and avoid hotspots during read. For example consider a case where an 8M block was written. Based on how the hardware groups associated pages, it is possible that some the pages may land in the same 16K page. When the page is eventually read, a read-ahead issued to the next page may need to stall since the unit is busy processing the first read.

For maximum throughput, write requests are spread across as many cores, protection groups and units as possible. If the application stops writing (or has a period of read-only traffic) partial protection stripes may be left in the open protection groups. To dynamically control whether to spread writes maximally, or to attempt to fill partial protection stripes, the original application's request length can be passed as a hint down to the RAS protection group flash page number allocation function.

4.3.8.6 Bad Block Handling

In one embodiment, bad memory is tracked at the erase block level and not at the individual page level. Bad block data will be stored persistently in a corresponding metadata region. Bad block data may also be stored on a separate storage device. During new device initialization, factory bad block information may be read and used to construct an initial set of bad blocks. In addition, a short burn-in period may be performed to find any other blocks that are initially bad. After this burn-in period, read and write error rates should be tracked for erase blocks faults, and any blocks may be marked as bad if an associated error rate exceeds some threshold. Furthermore, rewrite counts should be tracked for erase blocks, and blocks that exceed the expected lifetime may be retired. Before a block can be retired, the content of the block needs to be migrated. However, each block belongs to a protection group, so based on the liveliness (relative activity rate) of the data in the block, all the blocks in the protection group may need to migrate, rather than allocating a new block and migrating all the pages and associating the new block with the protection group.

4.3.8.7 Read-Around Erases and Writes

Maximum read latency increases when incoming reads get caught behind an Erase or Write being executed on a target unit. To alleviate this problem, a read-around technique may be implemented providing Protection Groups to reconstruct requested data rather than waiting for the target unit to complete a pending operation. Using the computed parity of the protection group and the other N−1 pages in the protection group, the original page targeted by a READ command may be reconstructed. System software may control when to compute the page using the Protection Group versus when to just queue a read directly to the unit.

With 3+1 RAID read around for one unit that is busy with a long operation (such as an erase) may be implemented. If two or more units in a Protection Group are busy in this configuration, read around may not be an option for a specific request while the two or more units are busy. Several techniques may be implemented to improve the chance that a read-around can be used. For example, a write distribution pattern of locations to write will be organized such that no self-inflicted conflict occurs until many other units are busy. For instance, a second 16 k of data (one write-4 command) may be held back from a specific Protection Group until all other Protection Groups assigned to the same core have one write or erase command queued. Requests may be preferentially scheduled to units in a given Protection Groups to increase opportunities to do read-around operations. In one embodiment, scheduling may be implemented according to pseudo random assignment, which has the advantage that it can be easily computed at driver install time and gives sufficient read-around opportunities. A direct mapping may also be implemented. The direct mapping may better serve specific engineering needs such as bring-up and debugging.

4.3.8.8 Wear Leveling

Wear leveling is the process where blocks are managed in a way such that they all wear out at about the same time (for "normal" wear leveling), or where field replaceable units (FRUs) are purposely unevenly worn so that only a single FRU needs to be replaced at a time (scheduled wear out).

4.3.8.9 Dynamic Wear Leveling

Wear leveling mechanisms are generally broken down into two classes. Those which occur without moving valid data (called dynamic) and those mechanisms where valid data is moved (static). In one working model embodiment, dynamic wear leveling may be implemented by maintaining a per core list of protection groups with free space. This will be sorted by erase count such that the Protection Group with the least wear will be selected first. This provides some wear leveling for "free", but only provides even wear for erase blocks (and Protection Groups) that cycle through the free list.

4.3.8.10 Static Wear Leveling

Static wear leveling enables evening out wear that is not corrected by dynamic wear leveling. With static wear leveling erase blocks with low wear may have resident data moved off so the erase blocks can be written with new (and hopefully "hotter" data). Static wear leveling increases write amplification so this technique should only be performed if dynamic wear leveling is not keeping things even enough.

In one embodiment, static wear leveling is not initiated until the average wear is 50% (or any other configurable value) of the expected life of the flash devices. Erase counts should be recorded along with some variance parameters that enable calculating standard deviation in a low cost incremental fashion. Periodically, e.g., every 50 erase operations (configurable) if the least worn protection group is two (configurable) standard deviations below the average, that least worn group may be selected for cleaning rather than the least valid group that normal greedy garbage collection would select. Using standard deviation as a determining metric allows the aggressiveness of wear leveling to adjust to the work load such that workloads that cause uneven wear cause a higher standard deviation in erase counts and cause wear leveling to even the wear more often.

4.3.8.11 Scheduled Wear Out

As devices become more worn they become more unreliable. If the devices are worn perfectly evenly they all become less reliable at the same time. More than one failure cannot be recovered using 3+1 parity protection. As an alternative to wearing out all blocks evenly a particular field replaceable unit may be targeted to receive more wear than other units. The intention would be for each device to be worn out and replaced in turn to avoid a catastrophic, simultaneous failure and to facilitate more orderly preventive maintenance. It is still ideal for blocks within a FRU (an FC card) to be worn evenly so that each FRU provides maximum practical life. When a particular device nears the end of its expected life (e.g., 90 or 95% of expected life) allocation associated with wear leveling may bias write distribution to favor one of the FCs over the others. Writes may be assigned to protection groups using the victim FC until all such PGs have an active write before assigning a write to another Fe. This will bias wear toward one FC while still allowing full performance and leveling of wear across the remaining FCs and within the victim Fe.

4.3.8.12 Mailbox Handling

In one embodiment, requests that come to the system will be placed in a per core circular buffer that is read by the hardware. Software will need to keep track of the requests outstanding in a per unit basis (this could be the current op structure itself). On request completion the request may be marked as done and removed from the list. If a request times out, the request may be reissued. If the original request comes back eventually, it will be dropped in favor of the newly issued request.

4.3.9 Garbage Collection

In one embodiment, a simple and robust algorithm for garbage collection implements a greedy algorithm. A greedy algorithm may always select an erase block (or Protection Group in our case) with the least number of valid pages. The literature indicates that this algorithm is optimal for a uniform random workload. It also performs reasonable well for other workloads.

The uniform random workload has no locality. It seems likely that expected workloads will exhibit varying degrees of locality. It is possible that an algorithm that correctly classifies data as hot or cold, and then chooses Protection Groups to GC based on their "hotness" may perform better than a simple greedy algorithm for non-uniform workloads. On the other hand, it may be more sensitive to the workload type than greedy.

A simple variation of greedy is to just separate the Protection Groups used for application writes from those used for Garbage Collection. The presumption is that the valid data left in a PG at the time of GC is cold as it has been written less often than the invalid pages (which must have been written at least once more for it to become invalid). The application is treated as "hot" as it obviously is being written currently. Separating hot and cold data will tend to cause the Protection Groups holding hot data to become very invalid (as all the pages are more likely than average to be overwritten) and for the cold data to stay very dense (as none of the pages are likely to be invalidated). This gives a bimodal distribution, which is ideal from a garbage collection efficiency perspective. The simple greedy variation treats all Protection Groups equally once they are filled. Other schemes, such as equivalence classes, treat hot and cold Protection Groups separately.

4.3.10 Erasing Threads

In one embodiment, each core executes an erase thread. The erase thread is configured to migrate data out of an entire protection group before erasing the erase blocks within a protection group. Units can be members of protection groups owned by different cores. To prevent contention on units by different erase threads and to minimize the amount of time that copy buffers are waiting for data during migration, erase threads should allocate all copy buffers and reserve all units before beginning a migration. Reserving target resources will prevent dead locks. The portion (percentage) of units doing erases simultaneously per second to achieve 13 GB/s (assumption that write throughput is 13 GB/s) is 0.46% (around 30 units).

4.3.11 Garbage Collection (GC)

In one embodiment, erases are executed all the time and all blocks are erased equally. This will work for sequential WRITE workloads. However, this algorithm does not differentiate between the non-sequential nature of some WRITE workloads where some blocks are re-written more often than others. Alternatively, a 'greedy' algorithm may be implemented using Equivalence Classes (explained below). Note that the greedy algorithm may allow for natural arrangement of protection groups into equivalence classes.

4.3.12 Equivalence Classes

The goal of organizing stored data into Equivalence Classes is to minimize Write Amplification when Erases are executed. Equivalence classes are used to characterize and classify Flash Data Pages into those that get modified a lot (Hot) and those that don't change very much (Cold). This classification is useful when deciding which pages should be erased as part of the Garbage Collection (GC) algorithm in the driver software.

4.3.12.1 Equivalence Class Design

The High-level design of Equivalence classes is as follows:

1. Flash pages will be placed in Equivalence Classes that classify data pages as HOT or COLD. Equivalence Classes that contain Protection Groups (see 4.3.4, 4.3.5, 4.3.7) which contain Flash Pages.
2. The HOT list will be ordered by which Protection Groups have the lowest number of 'live' pages. To achieve this, software will calculate a value called the Write Amplification Factor (WAF) for all protection groups.
3. Erases will happen on WHOLE protection groups (or Erase Groups that contain multiples of protection groups) that are in the HOT list. When Protection Groups in the HOT list reach a certain threshold they will be moved to the COLD list.
4. When the percentage of flash pages in the HOT list hits the low-threshold, the Protection Groups with the lowest Write Amplification Factor (WAF) will be put in the HOT list. Hence, the COLD list also needs to be ordered by WAF values.

4.4 Data Migration

The migration process supports erasing flash blocks, which by nature contain 'live' pages (pages that are still valid for reading) and 'dead' pages (data that has been written over). The migration process collects these live pages and moves them to another flash location. The migration process causes 'write amplification' (WA), i.e., the number of writes to flash, which has a direct impact on the life of the flash. Therefore, reducing WA reduces write wear and results in improved system life. Operating on blocks that have the smallest number of live pages (Le. The most dead pages or unwritten pages) decreases write amplification. One of the ways to accomplish this is by using Equivalence Classes (see 4.3.5). The process of migrating live pages from one location in flash to another location in flash is described herein. The goals of this migration process are:

- Control the Ratio of Migrate operations to other operations (Read, Write, etc.).
- Separate the migration operation from the Erase operation—they can be run at different times allowing blocks to be prepared for the Erase operation separately.
- Optimize the Migration operations so that the hardware can parallelize migrate-reads from multiple LUNs (Logical Units) and migrate-writes to multiple LUNs

4.4.1 Architectural Overview

A Protection Group (PG) is a set of Block Groups protected with an erasure code. A Block Group is a group of Erase Blocks from each plane of a Unit (e.g. LUN) from the same block offset. A Migration thread runs independently of the Erase process creating an Erase-ready list of blocks, whose live data pages have been moved to another flash location. In one embodiment, (without Equivalence Classes), the migration thread implements a simple Round-Robin algorithm to pick a Protection Group that needs to be migrated. The Migration thread queues operations to the I/O scheduler depending on the number of free flash blocks (starts when a low-threshold is hit and accelerates when approaching a high-threshold). Each core may execute one Migration thread; the Migration thread being configured to have access to all the protection groups (PG) that are owned by that core.

4.4.2 Migration Implementation

In one working model embodiment, the Migration thread implements a simple round robin across all PGs. The Migration thread picks 3 PGs as the number to migrate in order to parallelize migrate reads from 16 LUNs at a time. The Migration thread may perform the following steps:

1. Schedule up to 16 parallel Read operations from 3 'open' PGs from 16 different LUNs. This will read 16 flash pages of 4 KB each and write these into 16 MC-FPGA buffers allocated by the migration thread.
2. Since one LUN can write up to 16 4 KB pages at a time (Write 4 planes of 16 KB), write out all 16 pages with one Write operation.
3. Go back to step #1. The Migrate thread will build a list of sixteen 4 KB pages to be Read by selecting the valid pages from the 3 'open' protection groups. The flash pages can be at any offset in the block in the PG. These sixteen 4 KB pages may be read in parallel by the I/O scheduler into the MC-FPGA buffers after which they will be written to flash as one 4-plane write of 16 KB*4=64 KB of data (4 pages of 16 KB each).

The I/O scheduler will instruct the FPGA to calculate an incremental parity on one flash page (16 KB) and store the XOR value into one MC-FPGA buffer. This process is repeated 7 times to get a whole protection stripe (PS) of 7*16 KB. At the end of reading a full protection stripe on 4 planes, there will be 16 MC-FPGA buffers holding the parity of the 4 completed protection stripes. These 16 MC-FPGA buffers containing 4 planes of 16 KB pages of XOR values will then be written out to the flash in one write.

The above process is repeated 256 times. The total number of write operations into flash is 7*256*4 planes*16 KB pages (one whole PG worth of data) and 256*4 planes of 16 KB parity data pages. NOTE: The migration thread can use up to 64 MC-FPGA buffers to store interim data for the above operations.

4.4.2.2 Migration Scheduling

In one working model embodiment, the Migration thread will wake up on nominally 10 ms intervals and check to see if a migration operation is needed. One of at least 2 scenarios is determined from this check:

1. If the number of free flash pages is below a certain low threshold (this number will be configurable), the migration thread will schedule up to 10 ms worth of migration (calculation below) based on a 3:1 read:write bandwidth (Le. based on the bandwidth calculated by the I/O scheduler).
2. If the number of free flash pages is greater than the low threshold, the Migration thread will schedule enough migration operations (calculation below) to reduce the number of free flash pages below the low threshold. Note: The migration thread will query the I/O scheduler for the read bandwidth experienced on this core.

In other embodiments, different migration scheduling intervals and schemes may be implemented with the goal of maintaining available space for new writes.

4.4.2.3 Ratio of Migration Operations to Write Operations

In one embodiment, the ratio between Migrations and Writes is equivalent to the write amplification (e.g. 2:1 migrate:write).

4.4.2.3.1 Number of Read, Write, and Migration Operations to Schedule:

The number of blocks moved ("migrated") has to be greater than or equal to the number of blocks erased at any instant. In the steady-state case, the Erase bandwidth has to equal the Write bandwidth.

4.4.2.3.1.1 3:1 Read-Write Scenario

The above steady-state case may exist where there are reads (as well as writes and migrates) in the input given to the I/O scheduler. The I/O scheduler may estimate (or measure) the bandwidth required to perform a set of reads and may send all the reads first. The I/O scheduler then calculates the write bandwidth necessary to obtain a ratio of 3:1 (read:write ratio). The I/O scheduler also calculates the migration bandwidth necessary to obtain a ratio of 1:2 (write:migrate-write i.e. the write-amplification bandwidth). The I/O scheduler then sends the required number of write and migrate operations calculated from these bandwidth numbers. In an exemplary scenario:

If the read-bandwidth is 54 GB/s, the Write Bandwidth will be 18 GB/s and the WriteAmplification bandwidth (Migrate-Write) will be 36 GB/s.

For this write bandwidth, the number of blocks that need to be erased is $(18*1024*1024*1024)/(256*16*1024)=4608$ blocks per second.

The number of blocks that require migration is $(36*1024*1024*1024)/(256*16*1024)=9216$ blocks/second.

The number of blocks that require migration per core per second is $9216/60=154$ (assuming 100% valid pages per block).

The number of migrate-read operations per core per second is $(154*256*16*1024)/(4*1024)=157,696$ per second.

The number of write-to-flash (with XOR) operations per core per second is $(154*256*16*1024)/(16*4*1024)=9,856$ per second.

4.4.2.3.1.2 100% Write Scenario

Steady-state may prevail where, for a long period of time, there are no reads, i.e. only writes are requested. This situation is detected when the number of bytes to be written in the Write Queue of the I/O scheduler is greater than or equal to a certain write queue threshold (a configurable value). In this scenario:

For a Write bandwidth of 40 GB/s, the number of blocks that need to be erased is $(40*1024*1024*1024)/(256*16*1024)=10,240$ blocks per second.

The Migration bandwidth needed is 40 GB/s*$2$ (write amplification)=80 GB/s.

The number of blocks that require migration is $(80*1024*1024*1024)/(256*16*1024)=20,480$ blocks/second.

The number of blocks that require migration per core per second is $20480/60=342$ (assuming 100% valid pages per block).

The number of migrate-read operations per core per second is $(342*256*16*1024)/(4*1024)=350,208$ per second.

The number of write-to-flash (with XOR) operations per core per second is $(342*256*16*1024)/(16*4*1024)=21,888$ per second. Note: The I/O scheduler may schedule Write and Migrate operations until a corresponding Write queue depth is increased to a write queue threshold.

4.4.2.3.2 Conclusion:

The number of reads possible per second is $(1000*1000)/70*(32$ MC-FPGA buffers in parallel)=457142 reads. The number of writes that need to be started per second is $457142/16=28571$ (16 4 KB buffers go into 1 LUN).

The number of writes possible per LUN per second is $1000/1.5=667$.

The number of LUNs busy doing Writes per second: $28571/667=43$.

Given the above numbers and since reads and writes are scheduled in parallel (see mailbox commands below), both of the above scenarios can be satisfied.

4.4.3 Mailbox Commands

A set of mailbox commands are defined for operations performed by certain components of working model embodiments. PAGE_COMPLETE: FPGA has taken data out of buffers but may not have written to flash as yet. WRITE COMPLETE: FPGA has written data to flash. For every cycle:

1. READ from flash from 16 LUNs in parallel—these will be written to 16 MC-FPGA buffers. These buffers constitute 64 KB of data. I/O scheduler will wait for READ COMPLETE.
2. Write-to-flash with XOR for 7 buffers to 1 LUN in flash.
   a. XOR will be written to 1 MC-FPGA buffer to a specific page offset in the block (Migrate thread will keep track of page offset within the block).
   b. I/O scheduler will wait for PAGE_COMPLETE.
3. Write-to-flash with XOR for next 7 buffers. Repeat Step 2 with XOR. I/O scheduler will wait for PAGE COMPLETE.
4. Repeat Step #1 for another 14 LUNs in parallel. This will start after PAGE_COMPLETE (does not have to wait for WRITE_COMPLETE).

4.4.3.1 Metadata Handling

When migrating pages from one flash virtual page number (FVPN) to another, metadata belonging to migrated pages needs to follow the pages. The appropriate commands and methodology to do this is covered in 4.3.8 (see FIG. 39). In one embodiment, a system software (Graphite) driver will not modify the metadata belonging to a flash page when moving that page from one flash page number (FVPN) to another. This metadata will contain the FVPN but will not contain the flash physical page number (FPPN). When the system comes up, all physical flash pages are read in order and will reconstruct the mapping between FVPN and FPPN at that time. The advantage of this optimization is that metadata need not be modified when doing migrates and therefore there is no need to recalculate the XOR (Parity) for the metadata portion when moving the metadata.

4.4.3.2 Equivalence Classes

Equivalence Classes control which Protection Groups are eligible and/or prioritized for an Erase operation. 'Cold' PGs are not eligible for Erase because they have the most 'live' pages while 'hot' PGs have a relative abundance of invalid pages (pages whose data has been changed and written to some other page). These 'cold' and 'hot' lists will be used to keep track of which PGs are eligible for Erase (and Migrate) operations. For more details, refer to 4.3.5.

4.4.3.3 Erases

In certain working model embodiments, erases (erase operations) are scheduled when the free space (amount of flash free in the whole system) reaches a certain low threshold. A high threshold may also be defined and when free space is above the high threshold, bandwidth made available to Write operations may be allowed to burst to a certain higher level than otherwise. Two levels of Erase scheduling may be implemented, opportunistic and aggressive, with one of the two levels selected for execution when the free list reaches the low threshold and high threshold respectively. After the Migration thread finishes processing a PG, it will put the PG on the Erase list for the Erase thread to perform its task.

4.4.3.4 Interfaces

The Migrate thread uses the following interfaces:
I/O scheduler: io_sched_queue_migrate_operations (struct dlist*op_list}—API to queue migrate operations into the I/O scheduler.
io_sched_get_read_bw(void}: gets the current read bandwidth on this core.

4.5 Software Components

Software components of a working model embodiment may include, without limitation: (1) an application program implemented to perform specialized tasks associated with very large data sets, (2) database systems implemented to perform both general database operations and specialized database operations unique to very large data sets, and (3) systems software and operating systems modules, including low-level (e.g. device level or driver level} hardware specific modules.

4.5.1 Application

Certain applications such as a business Intelligence application, a fraud detection application, a programmed trading application, a molecular interaction modeling application (e.g., protein-protein modeling), or other any other technically feasible application requiring large datasets, and therefore a large available memory image, may be implemented in accordance with a working model embodiment. In addition, the application may require random access to data and high read/write ratios. These applications may provide operators with a high degree of computational efficiency and resulting economic advantage. Other applications that require fast, often real time, response such as social networking, massive player on line gaming, and real time data mining will have similar requirements for extremely large memory images for data being examined or otherwise processed.

4.5.2 Database

A relational or object database with datasets approaching 100 TB or more may be implemented in accordance with a working model embodiment. These large datasets are not feasibly processed using DRAM based memory systems and cannot be processed in a reasonable time using disk-based systems. Consequently, certain embodiments advantageously enable otherwise unfeasible computational tasks to be efficiently executed.

4.5.3 Operating System

In general, a modern operating system may be configured to operate in conjunction with a working model embodiment. The operating system should be able to efficiently manage many execution threads simultaneously accessing the same dataset. For example, the operating system should be able to efficiently manage 1000 processing cores, each generating one or more 16 KB read request in a 1 microsecond window and generating in excess of 16 TB/s of memory bandwidth.

4.5.4 System Software Components

See the architecture above (4.3).

4.5.5 Device Drivers

A block device driver responding to 1 request for a 16 KB block every nanosecond on average will be needed to meet the needs of the 1000 cores. The device driver may execute over multiple parallel threads executing on multiple processing cores to provide sufficient computational throughput to keep up with the requests.

Figure 42:
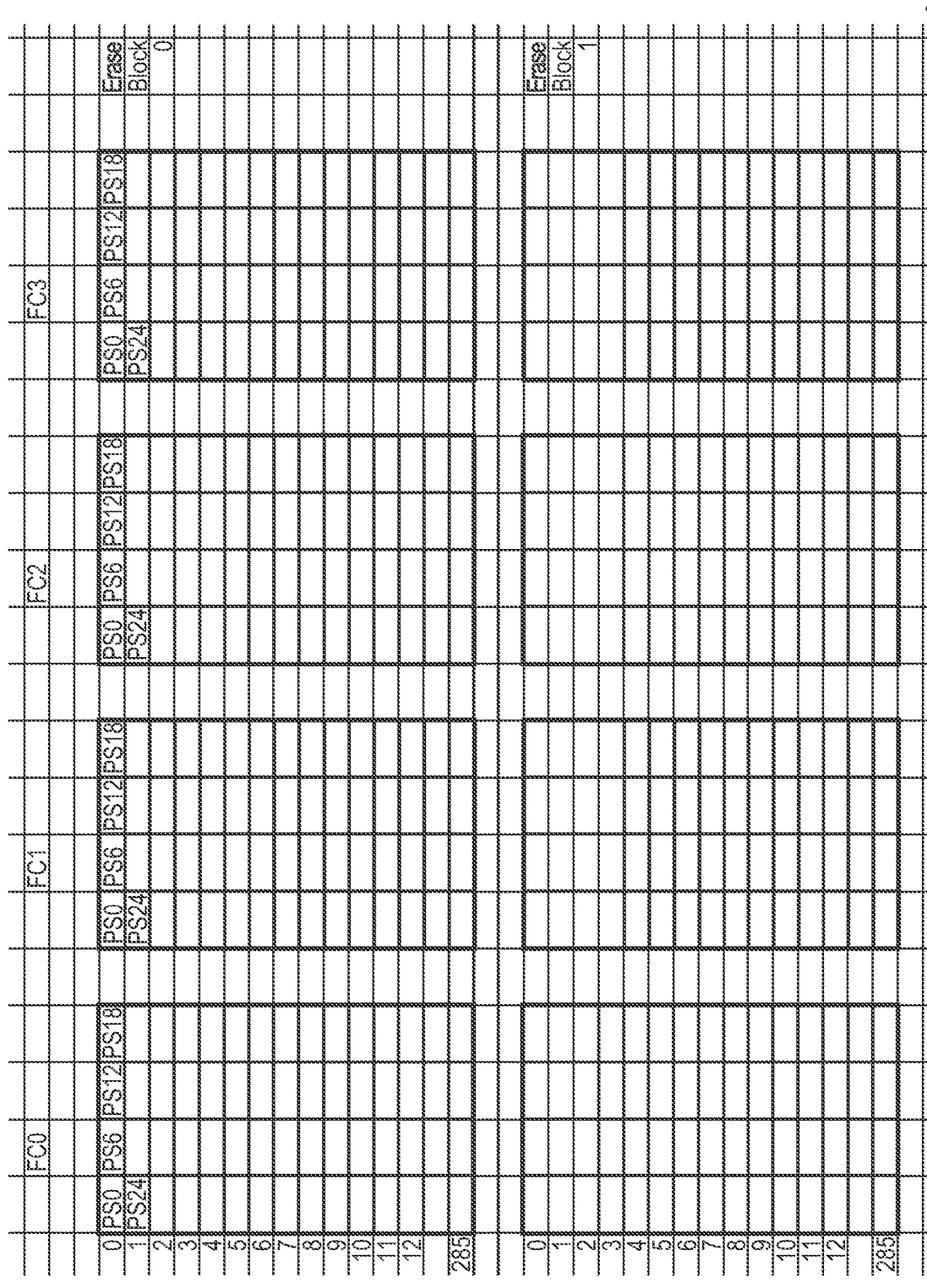
FIG. 42 shows a protection group layout according to one embodiment.
Figure 42:
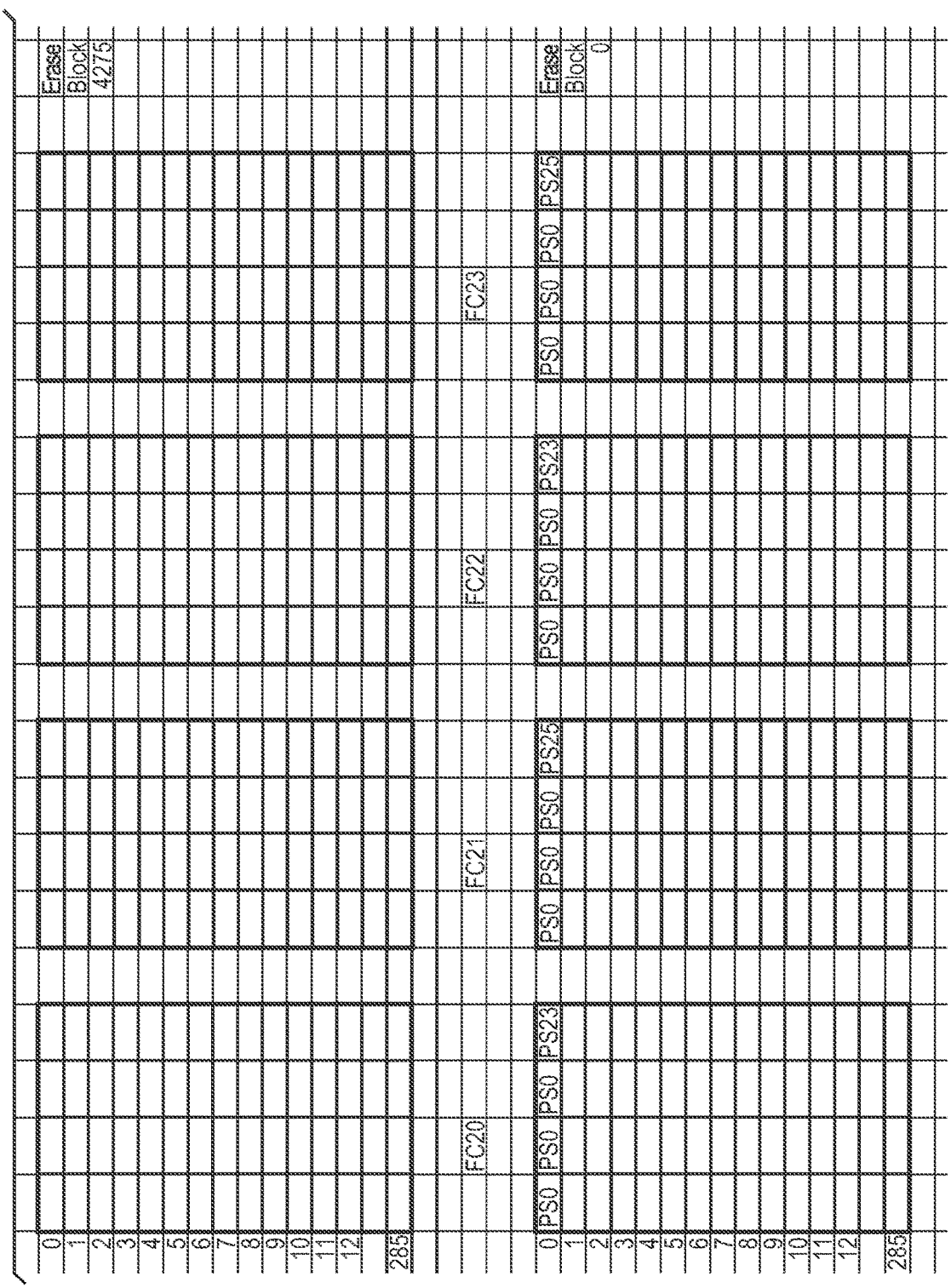
Figure 43:
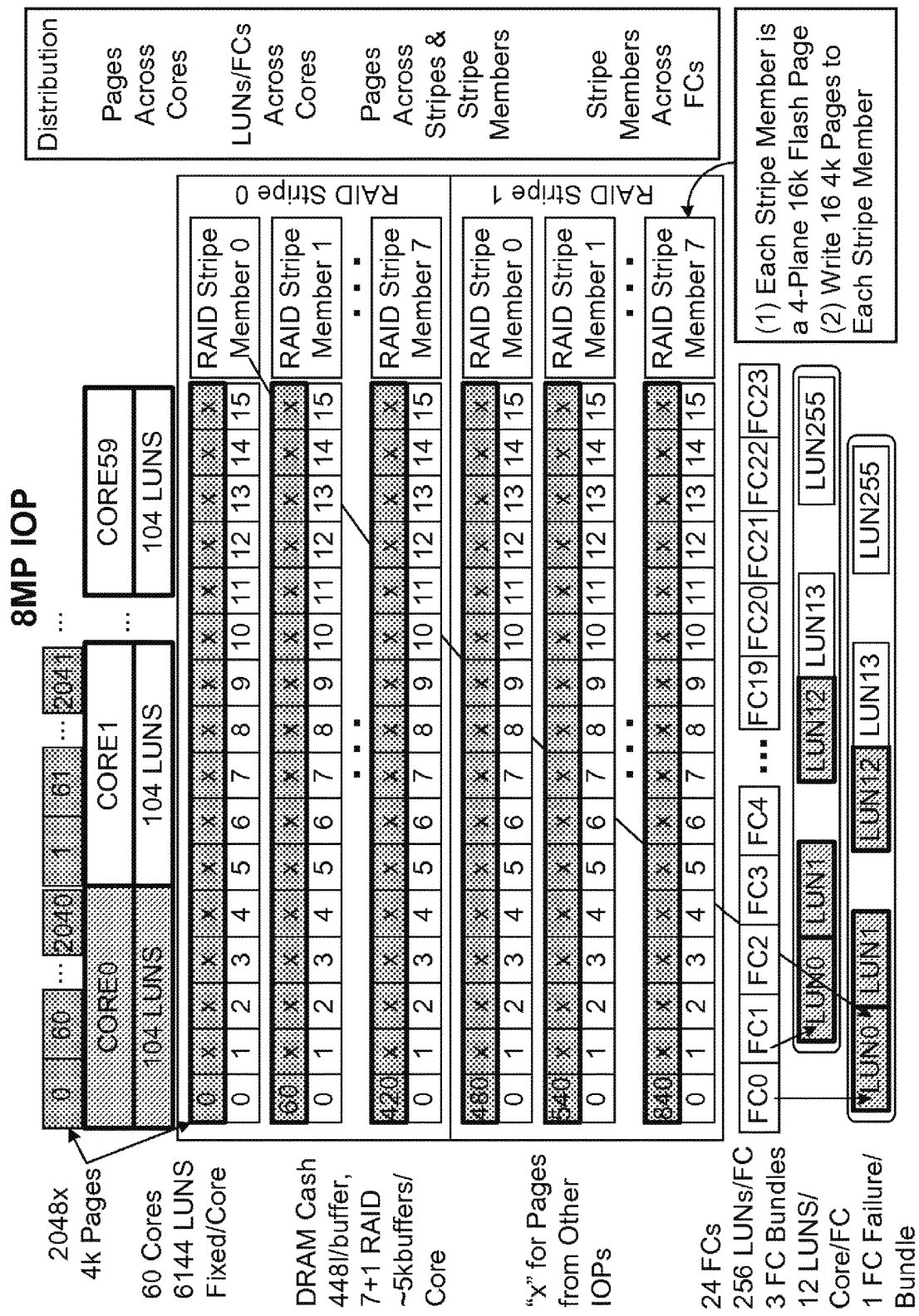
FIG. 43 shows write distribution in a working model according to one embodiment.
Figure 44:
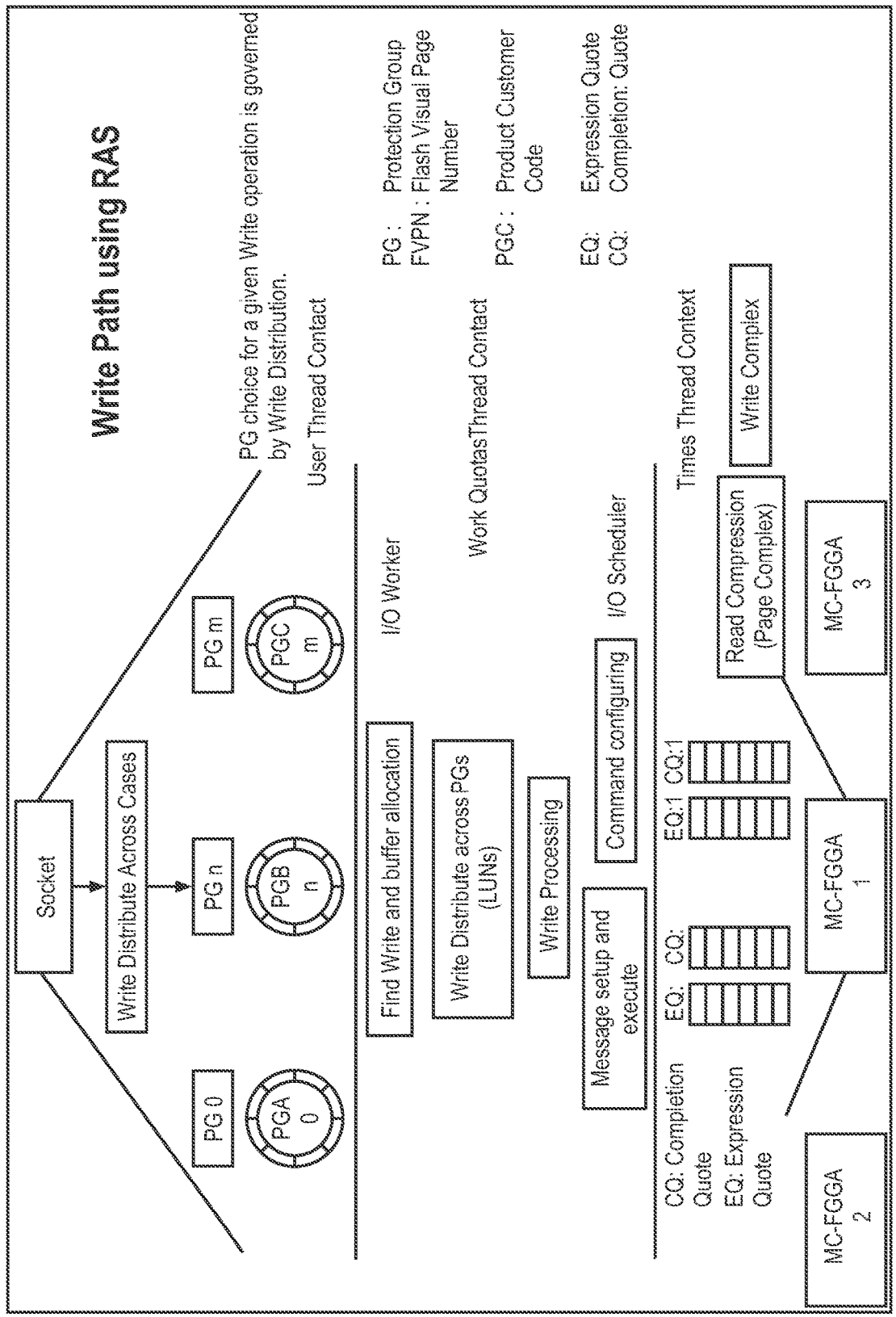
FIG. 44 shows a data protection write path according to one embodiment.
Figure 45:
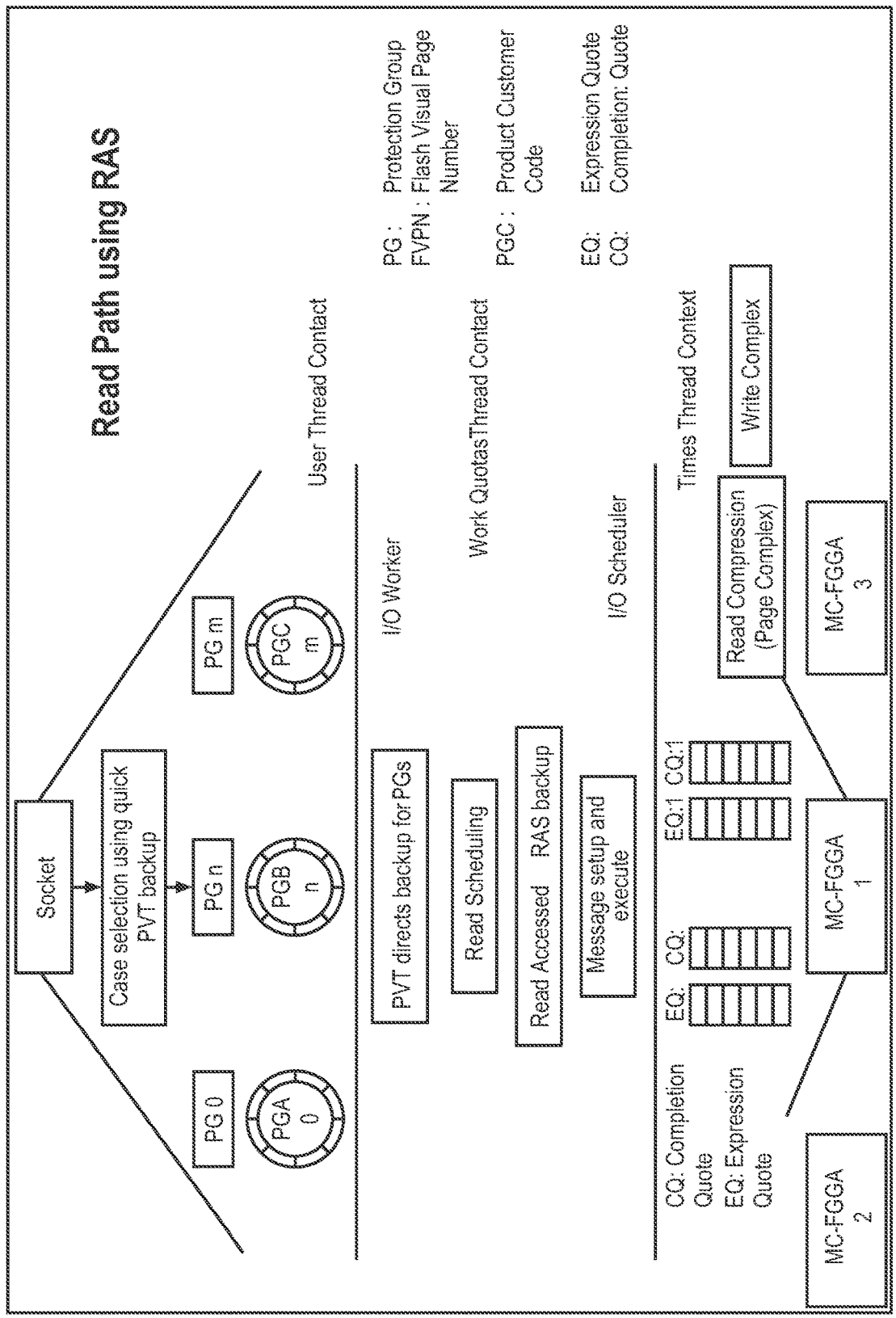
FIG. 45 shows a data protection read path according to one embodiment.
Figure 46:
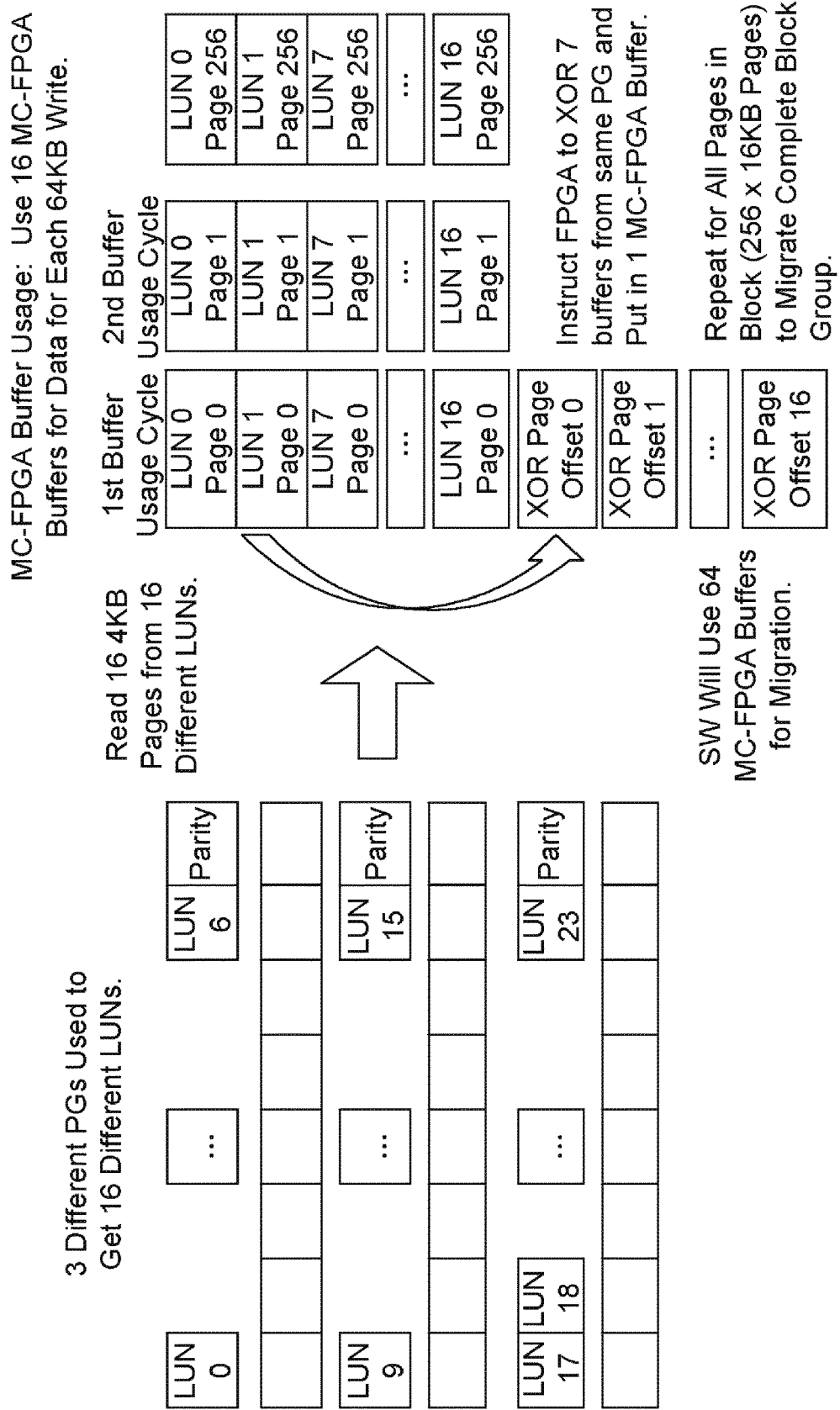
FIG. 46 shows migration pivot according to one embodiment.

4.5.6 Firmware 10,000 solid-state memory devices capable of sustaining a 16 TB/s read rate will be needed to run in parallel in order to meet bandwidth demands of the processing cores. FIG. 42 shows a protection group layout according to one embodiment. FIG. 43 shows write distribution in a working model according to one embodiment. FIG. 44 shows a data protection write path according to one embodiment. FIG. 45 shows a data protection read path according to one embodiment. FIG. 46 shows migration pivot according to one embodiment.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data processing system, comprising:
   a plurality of processing units, each processing unit having one or more processor cores;
   a plurality of dynamic random access memory (DRAM) devices, each DRAM device being coupled to one of the processing unit via a corresponding memory bus interface;

a plurality of memory roots, each memory root being associated with one of the processing units, wherein each memory root comprises
   one or more branches, wherein each memory root further comprises a memory controller to provide an interface between the processing unit and one or more branches associated with the memory root, and
   a plurality of memory leaves to store data, wherein each of the branches is associated with one or more of the memory leaves and to provide access to the data stored therein, wherein each of the memory leaves comprises one or more solid state memory devices; and
a memory fabric coupled to each of the branches of each memory root to allow each branch to access data stored in any of the memory leaves associated with any one of the branches and to allow each of the branches of each memory root to communicate with any of the branches;
wherein each of the branches further comprises a set of queues, wherein the set of queues associated with each of the branch comprises:
   a submission queue to store one or more commands issued by a corresponding processing unit by each of the branches; and
   a completion queue to store a result of executing the commands dispatched from the submission queue;
wherein each of the branches is to provide access to data stored in local memory leaves to a remote processing unit of the plurality of processing units via a remote branch of the remote processing unit over the memory fabric, without having to invoke a local processing unit and in response to a command issued by the remote processing unit and stored in the submission queue associated with the local memory leaves, a local branch of the branches executes the command to access data stored in a remote memory leaf of the memory leaves by communicating the command with the remote branch by selecting a first path via a first branch of the one or more branches, or a second path via a second branch of the one or more branches if the first path fails, without having to invoke an associated processing unit of a branch of the selected path, and
wherein the memory bus interfaces of the processing units are coupled to each other to allow the local processing unit accessing data stored in a remote DRAM device of the remote processing unit, without having to invoke the remote processing unit.

2. The system of claim 1, wherein in response to the command received by the remote branch, the remote branch executes the command to access the data stored in the remote memory leaf and returns a result of accessing the data back to the local branch.

3. The system of claim 2, wherein the local branch stores the result of accessing the data in the completion queue accessed by a local memory controller.

4. The system of claim 1, wherein each processing unit is coupled to its associated memory root via a peripheral component interface express (PCIe) link.

5. The system of claim 1, wherein the memory fabric comprises an Ethernet connection or an Ethernet network.

6. The system of claim 1, wherein each of the processor cores represents a thread processor, and wherein each thread processor is to execute a specific thread.

7. The system of claim 1, wherein memory bus interfaces of the processing units are coupled to each other via a shared memory bus.

8. The system of claim 1, wherein memory bus interfaces of the processing units are coupled to each other via an interconnect.

9. The system of claim 1, wherein memory bus interfaces of the processing units are coupled to each other via a network.

* * * * *